US008395910B2

(12) United States Patent
Alexander

(10) Patent No.: US 8,395,910 B2
(45) Date of Patent: Mar. 12, 2013

(54) BUCK-BOOST POWER CONVERTER CIRCUITS, METHODS AND SYSTEMS

(75) Inventor: William C. Alexander, Spicewood, TX (US)

(73) Assignee: Ideal Power Converters, Inc., Spicewood, TX (US)

( * ) Notice: Subject to any disclaimer, the term of this patent is extended or adjusted under 35 U.S.C. 154(b) by 0 days.

(21) Appl. No.: 13/205,250

(22) Filed: Aug. 8, 2011

(65) Prior Publication Data
US 2012/0033464 A1    Feb. 9, 2012

Related U.S. Application Data

(63) Continuation of application No. 12/479,207, filed on Jun. 5, 2009, now Pat. No. 8,300,426, which is a continuation of application No. 11/759,006, filed on Jun. 6, 2007, now Pat. No. 7,599,196.

(60) Provisional application No. 60/811,191, filed on Jun. 6, 2006.

(51) Int. Cl.
*H02M 3/335* (2006.01)
*H02M 1/10* (2006.01)

(52) U.S. Cl. ............................. 363/17; 363/98; 363/142

(58) Field of Classification Search ................ 363/1, 13, 363/15, 17, 34, 123, 124, 142, 159, 164, 363/98
See application file for complete search history.

(56) References Cited

U.S. PATENT DOCUMENTS 4,410,807 A * 10/1983 Buffington ..................... 307/68
(Continued)

FOREIGN PATENT DOCUMENTS
WO    WO2008/008143 A3    1/2008

OTHER PUBLICATIONS

Yamamoto, S. et al., "Analysis of series-resonant AC link inverter for improving output current," Power Electronics Specialists Conference, PESC '94 Record, 25th Annual IEEE, pp. 965-969 vol. 2, Jun. 20-25, 1994. doi: 10.1109/PESC.1994.373796 URL: http://ieeexplore.ieee.org/stamp/stamp.jsp?tp=&arnumber=373796&isnumber=8548.*
Ehsani et al, "Inverse Dual Converter (IDC) for High-Power DC-DC Applications", IEEE Transactions on Power Electronics, vol. 8, No. 2, Apr. 1993, pp. 216-223.

(Continued)

*Primary Examiner* — Adolf Berhane
*Assistant Examiner* — Fred E Finch, III
(74) *Attorney, Agent, or Firm* — Robert O. Groover, III; John A. Thomas; Gwendolyn S. S. Groover

(57) ABSTRACT

Methods and systems for transforming electric power between two or more portals. Any or all portals can be DC, single phase AC, or multi-phase AC. Conversion is accomplished by a plurality of bi-directional conducting and blocking semiconductor switches which alternately connect an inductor and parallel capacitor between said portals, such that energy is transferred into the inductor from one or more input portals and/or phases, then the energy is transferred out of the inductor to one or more output portals and/or phases, with said parallel capacitor facilitating "soft" turn-off, and with any excess inductor energy being returned back to the input. Soft turn-on and reverse recovery is also facilitated. Said bi-directional switches allow for two power transfers per inductor/capacitor cycle, thereby maximizing inductor/capacitor utilization as well as providing for optimum converter operation with high input/output voltage ratios. Control means coordinate the switches to accomplish the desired power transfers.

7 Claims, 38 Drawing Sheets

Three Phase Motor Drive Embodiment

U.S. PATENT DOCUMENTS

| | | | |
|---|---|---|---|
| 4,616,300 A | | 10/1986 | Santelmann, Jr. |
| 4,730,242 A | * | 3/1988 | Divan .............................. 363/37 |
| 4,942,511 A | * | 7/1990 | Lipo et al. ...................... 363/136 |
| 4,992,919 A | * | 2/1991 | Lee et al. ........................ 363/17 |
| 5,010,471 A | * | 4/1991 | Klaassens et al. ............ 363/160 |
| 5,208,740 A | | 5/1993 | Ehsani |
| 5,363,020 A | | 11/1994 | Chen et al. |
| 5,500,791 A | | 3/1996 | Kheraluwala et al. |
| 5,903,448 A | | 5/1999 | Davila, Jr. |
| 5,977,569 A | | 11/1999 | Li |
| 6,118,678 A | * | 9/2000 | Limpaecher et al. ........... 363/60 |
| 6,370,050 B1 | | 4/2002 | Peng |
| 6,404,654 B1 | | 6/2002 | Wang |
| 6,424,133 B1 | * | 7/2002 | Choi .............................. 323/288 |
| 6,984,965 B2 | | 1/2006 | Viniciarelli |
| 7,057,905 B2 | | 6/2006 | Macmillan |
| 7,499,290 B1 | * | 3/2009 | Mazzola et al. ................ 363/17 |
| 7,786,709 B2 | * | 8/2010 | Lawson et al. ................ 323/206 |
| 2004/0080966 A1 | * | 4/2004 | Chadwick et al. ............ 363/132 |
| 2006/0103341 A1 | | 5/2006 | Steigerwald et al. |

OTHER PUBLICATIONS

Kheraluwala, et al., "Performance Characterization of a High-Power Dual Active Bridge dc-to-dc Converter", IEEE Transactions on Industry Applications, vol. 28, No. 6, Nov./Dec. 1992, pp. 1294-1301.

K. Ngo, "Topology and Analysis in PWM Inversion, Rectification, and Cycloconversion", Dissertation, California Institute of Technology (1984).

Kim, et al., "New Bilateral Zero Voltage Switching AC/AC Converter Using High Frequency Partial-resonant Link", Korea Advanced Institute of Science and Technology, (IEEE 1990).

Rajashekara et al., "Power Electronics", Chapter 30 in the Electrical Engineering Handbook (ed. R. Dorf 2000).

http://en.wikipedia.org/wiki/Push-Pull_Converter.

International Searching Authority, International Application No. PCT/US2007/013552, International Search Report and the Written Opinion, May 19, 2008.

* cited by examiner

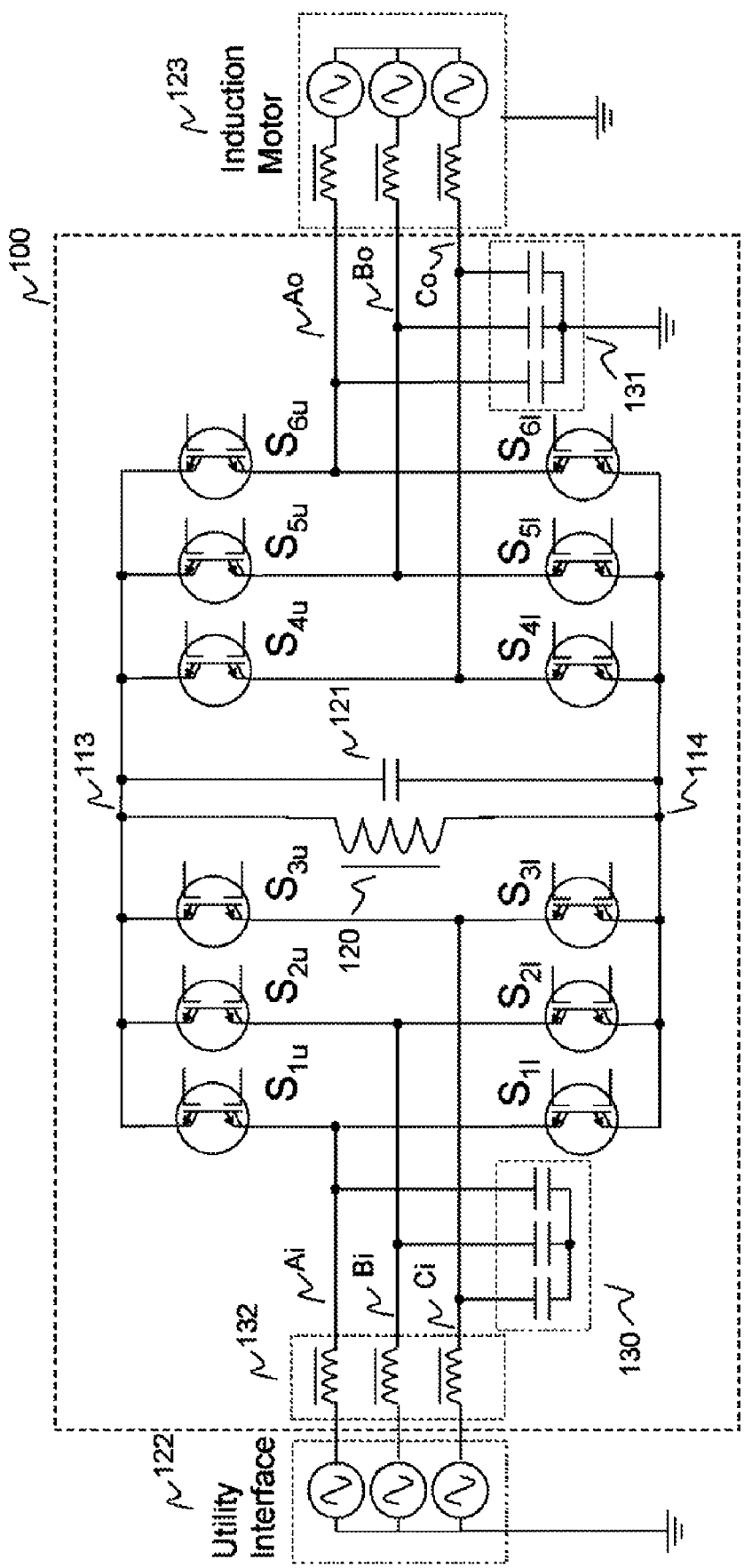
Figure 1 – Three Phase Motor Drive Embodiment

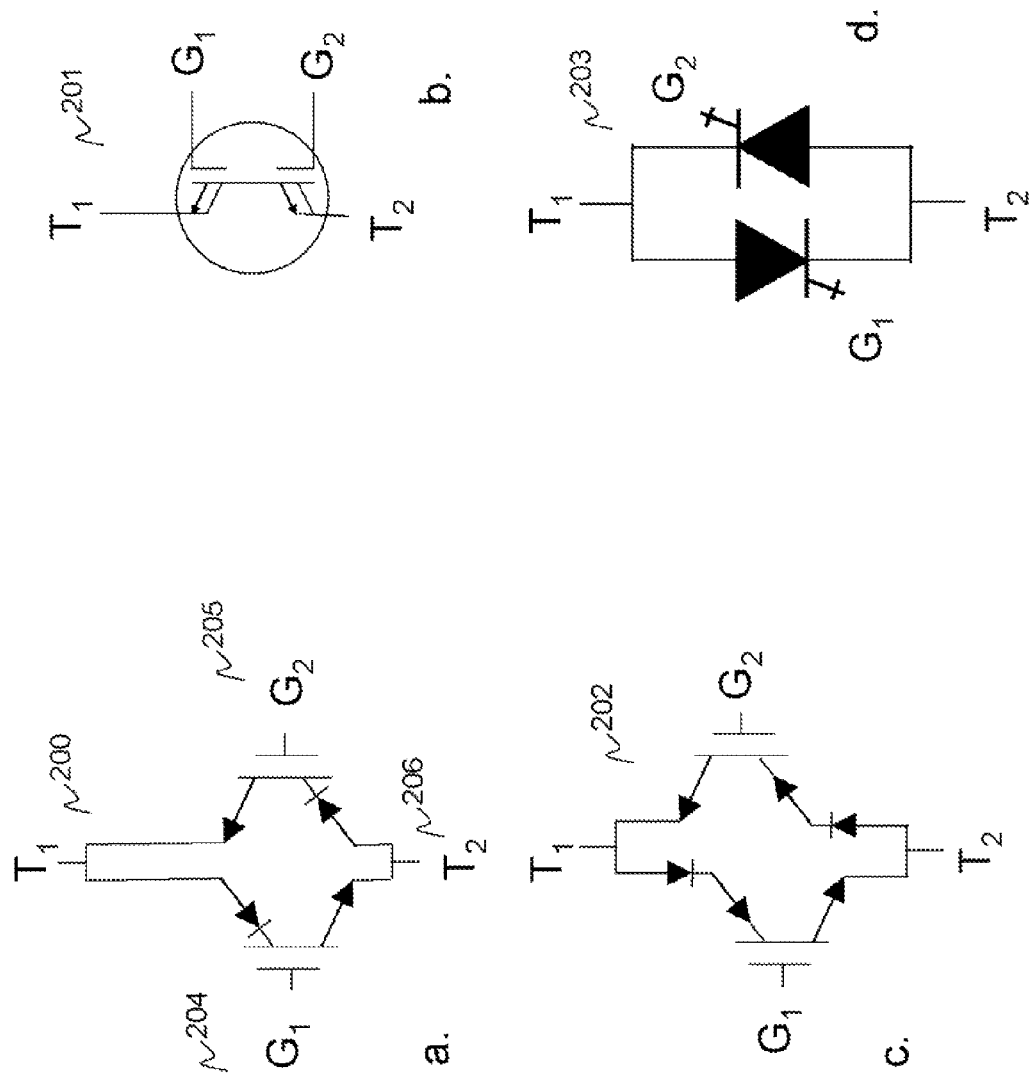

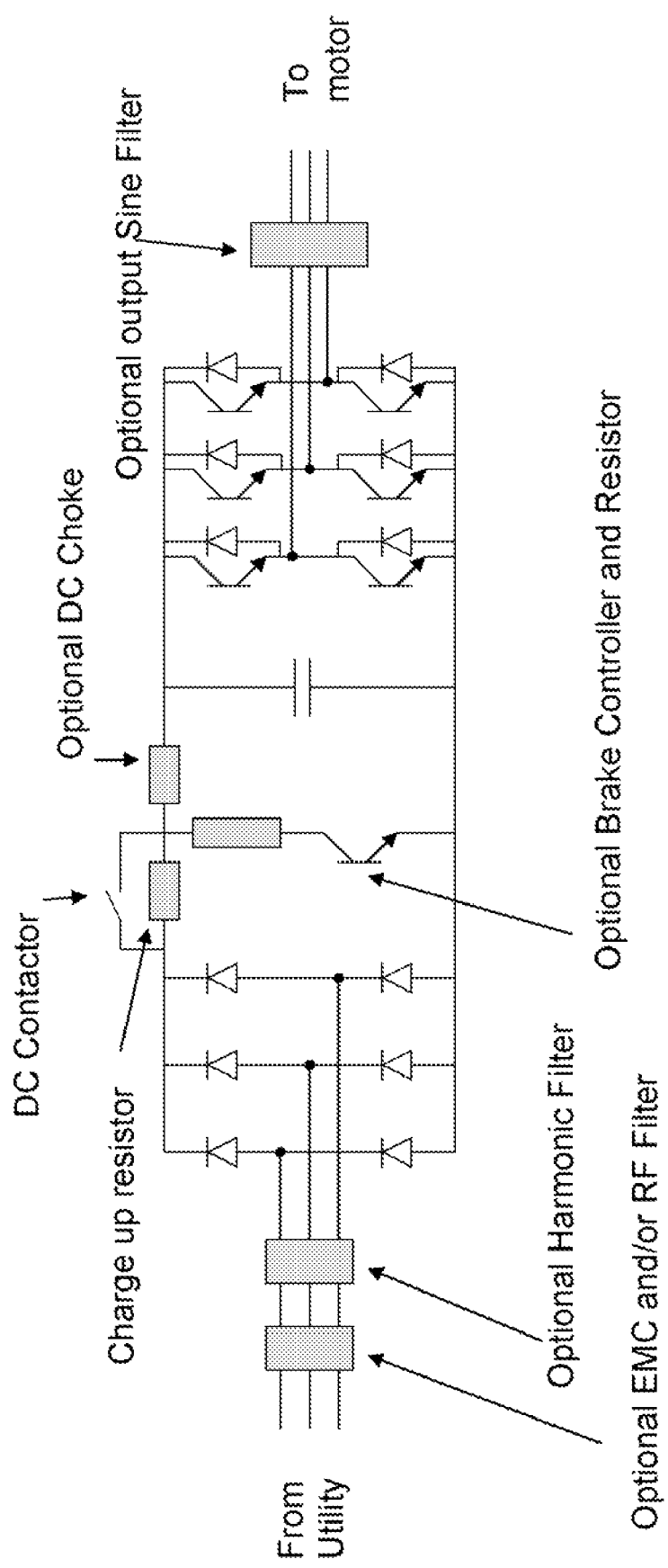
Figure 3 – Prior Art – "Standard Drive" Voltage Sourced PWM Drive

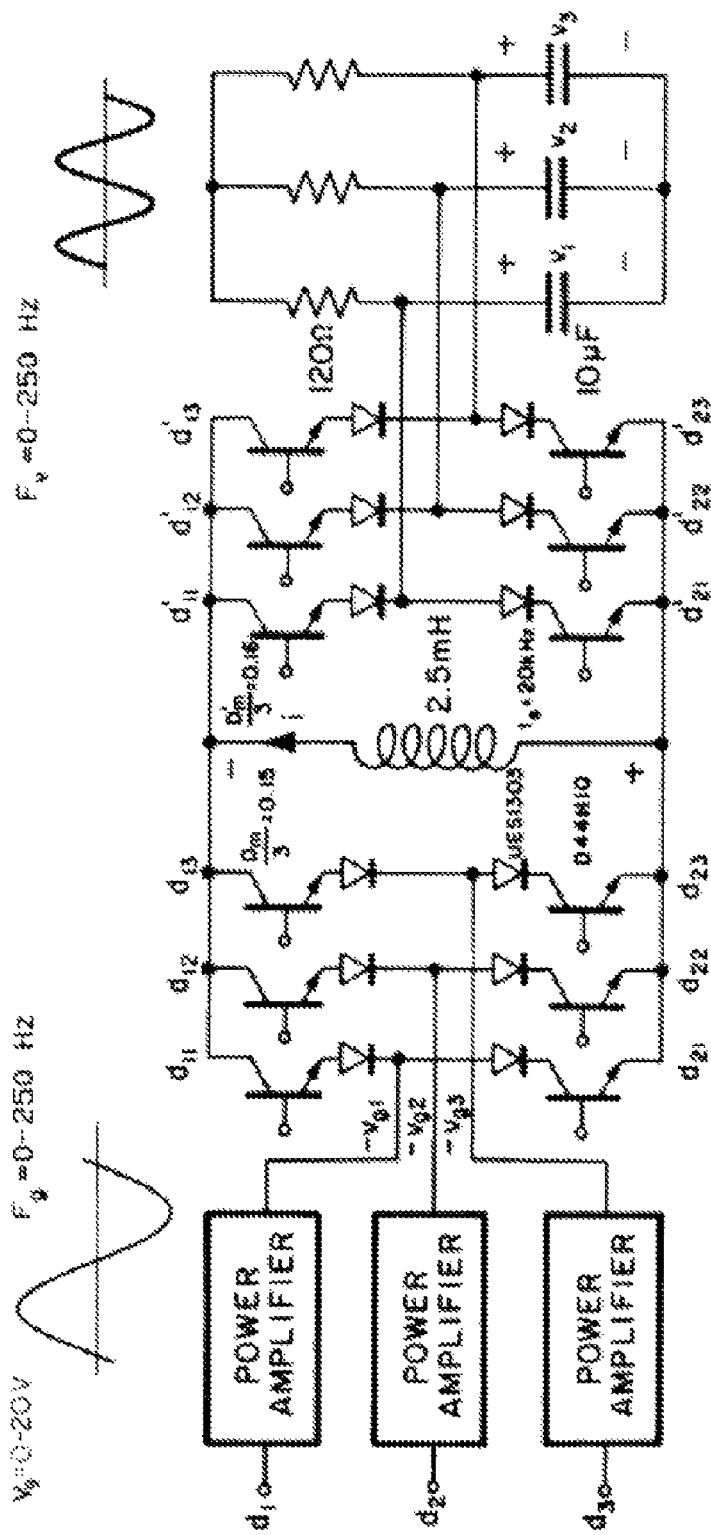
Figure 4 - Prior Art – Figure 10.7 of Reference 1

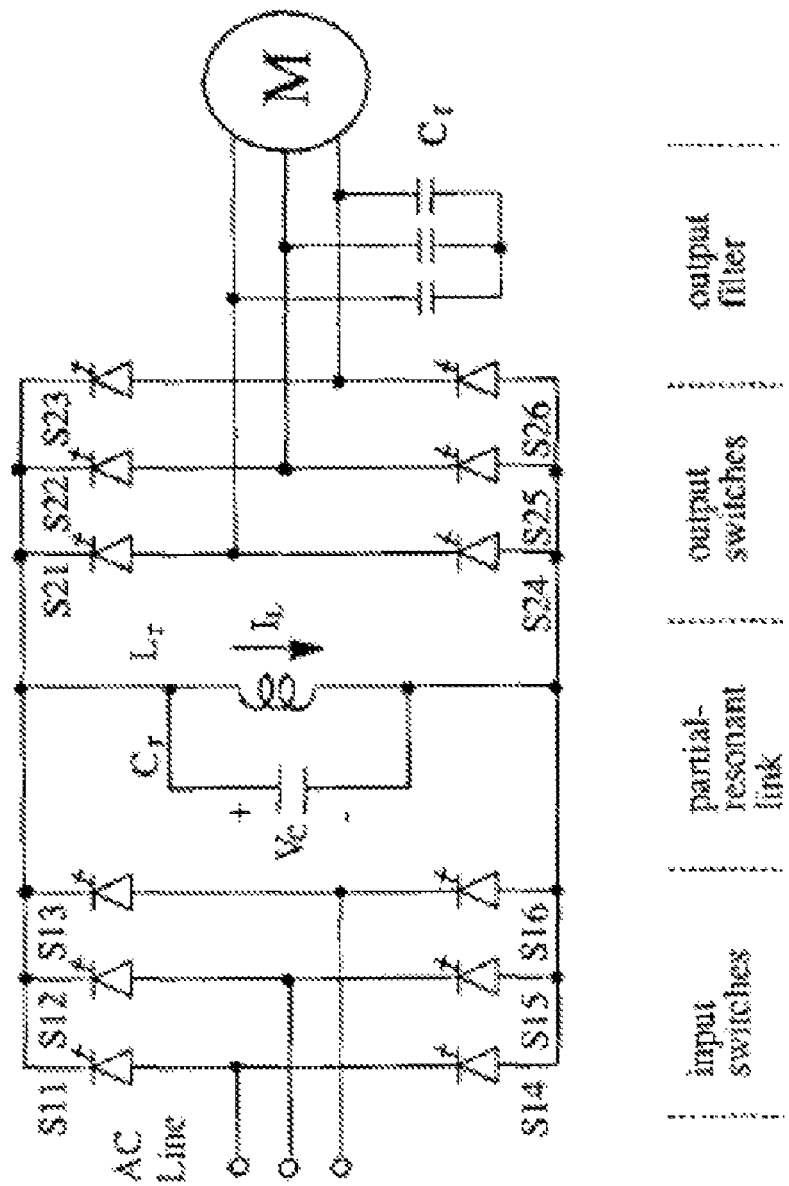
Figure 5 - Prior Art – Figure 1 of Reference 2

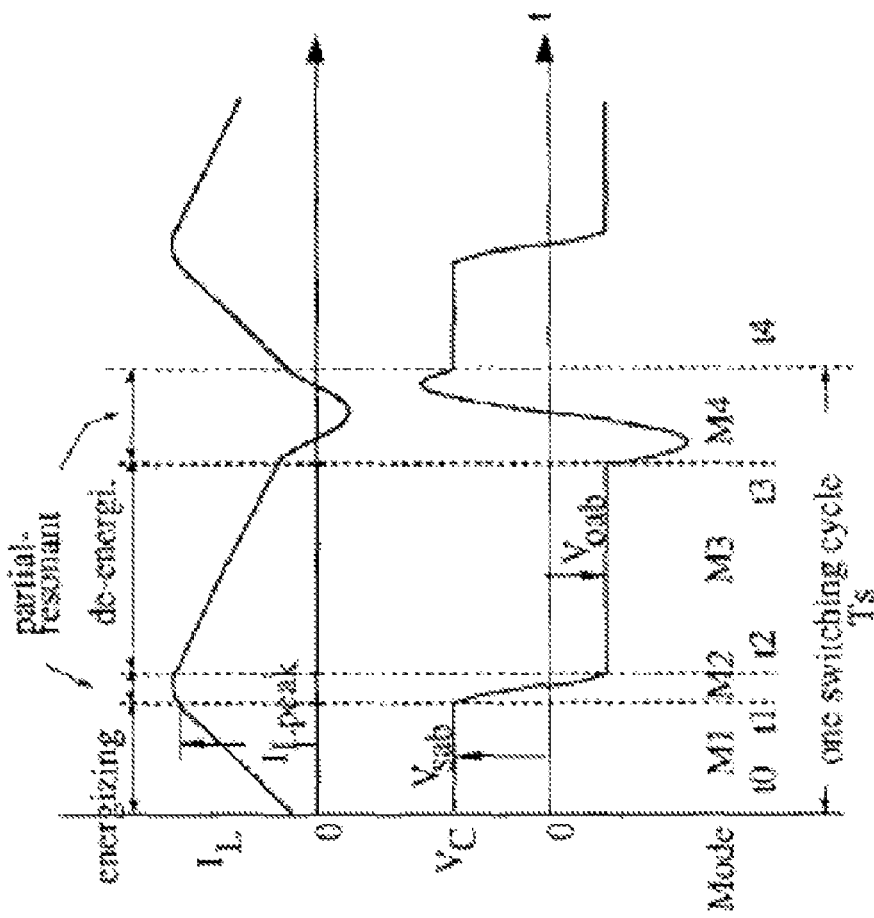
Figure 6 – Prior Art – Figure 2 of Reference 2

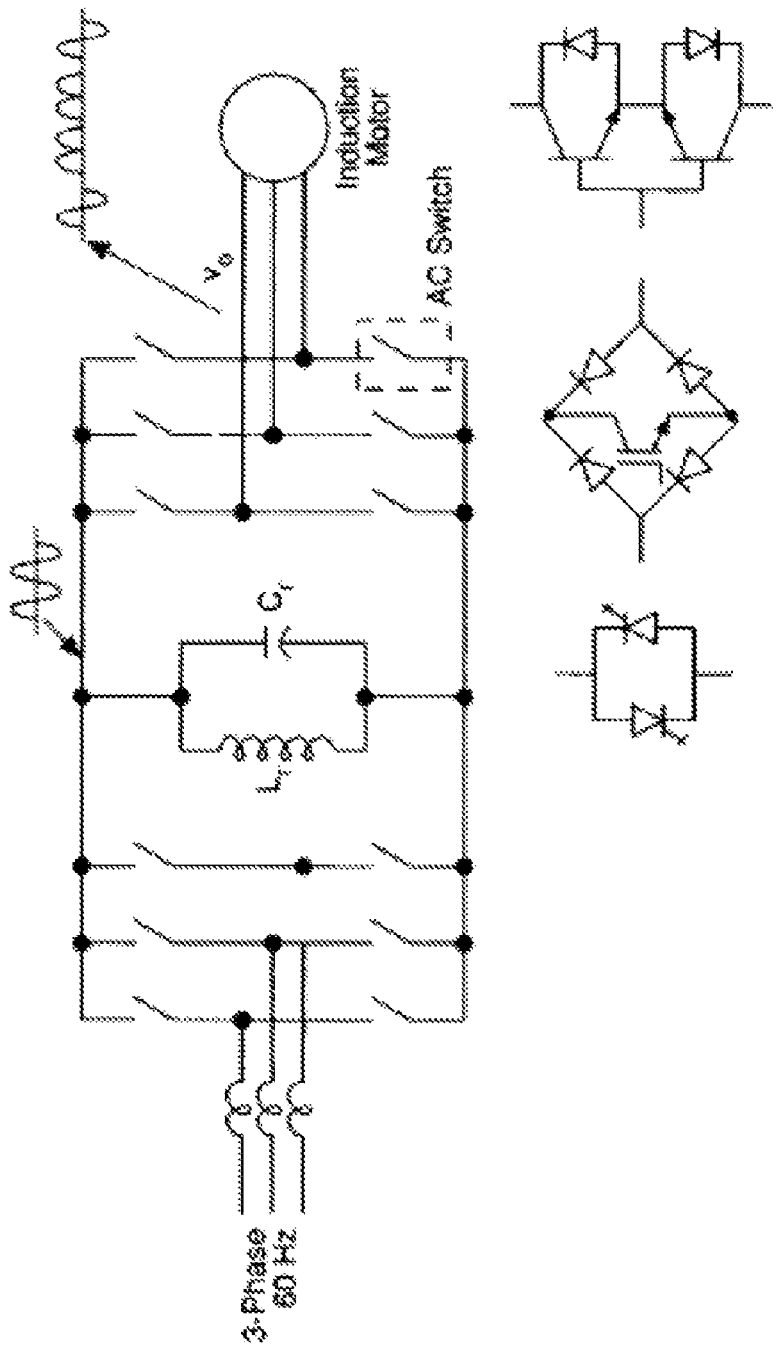
Figure 7 - Prior Art – Figure 30.16 of Reference 3

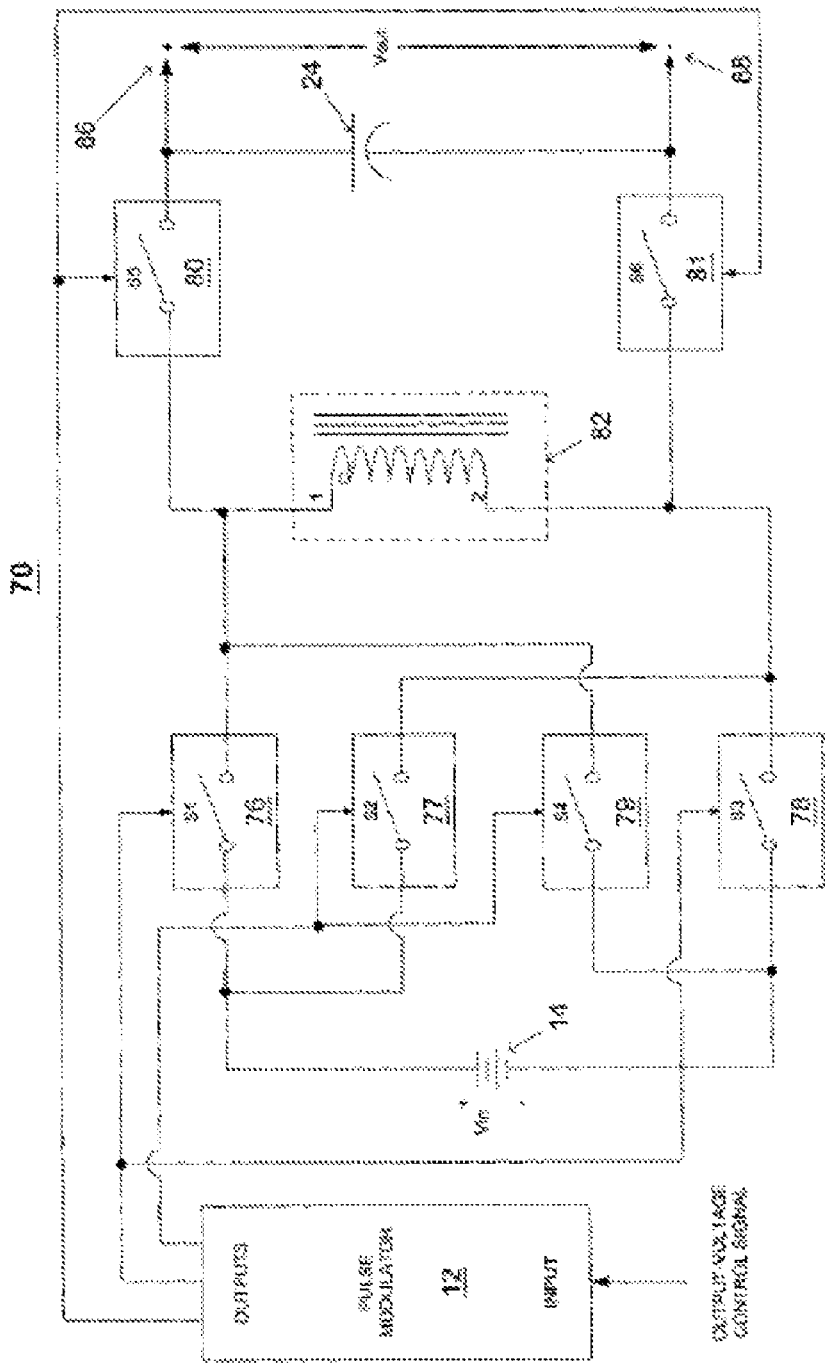
Figure 8 – Prior Art – US 7,057,905

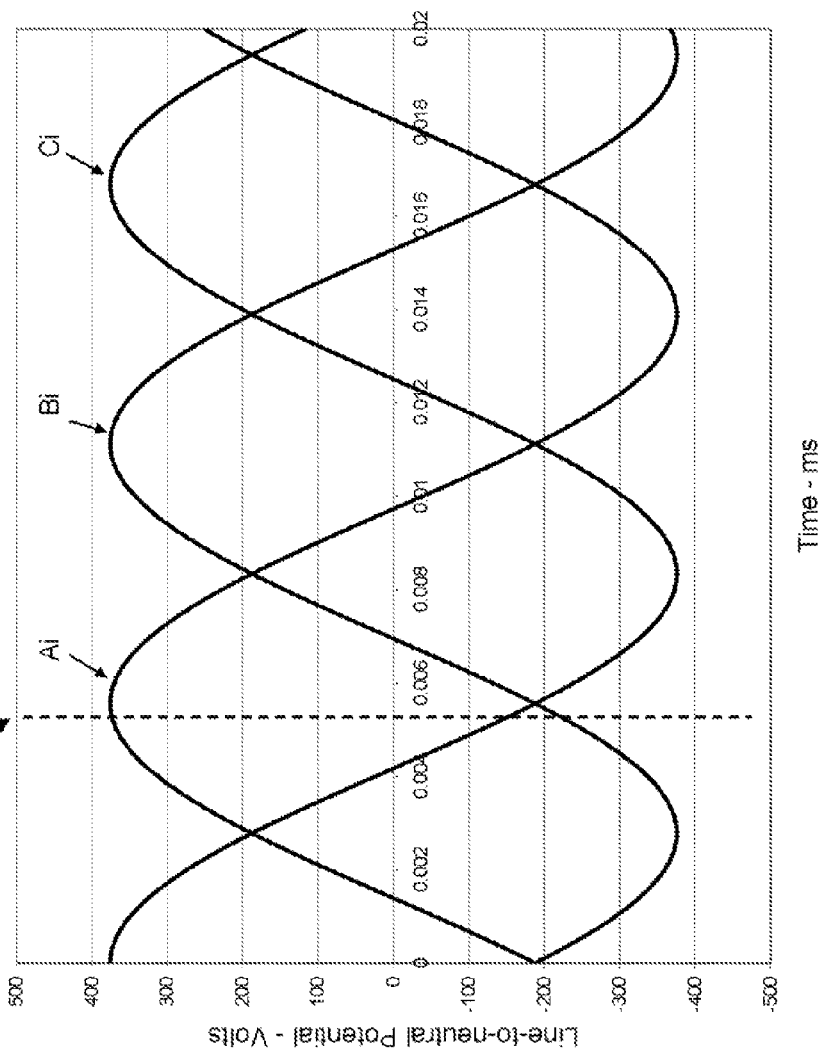
Figure 9 – Input Voltages for Current Flow example of Figs 11,12 &13

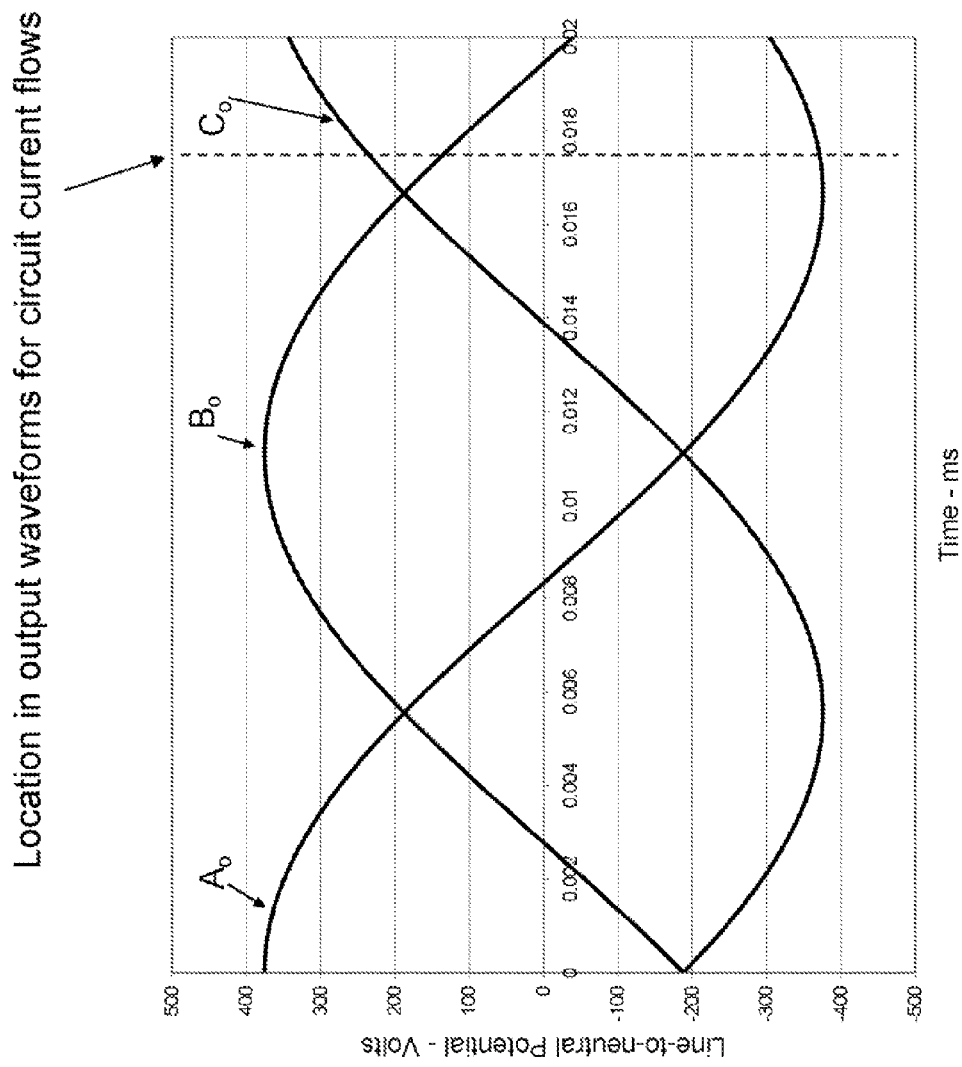
Figure 10 - Output Voltages for Current Flow example of Figs 11,12, &13

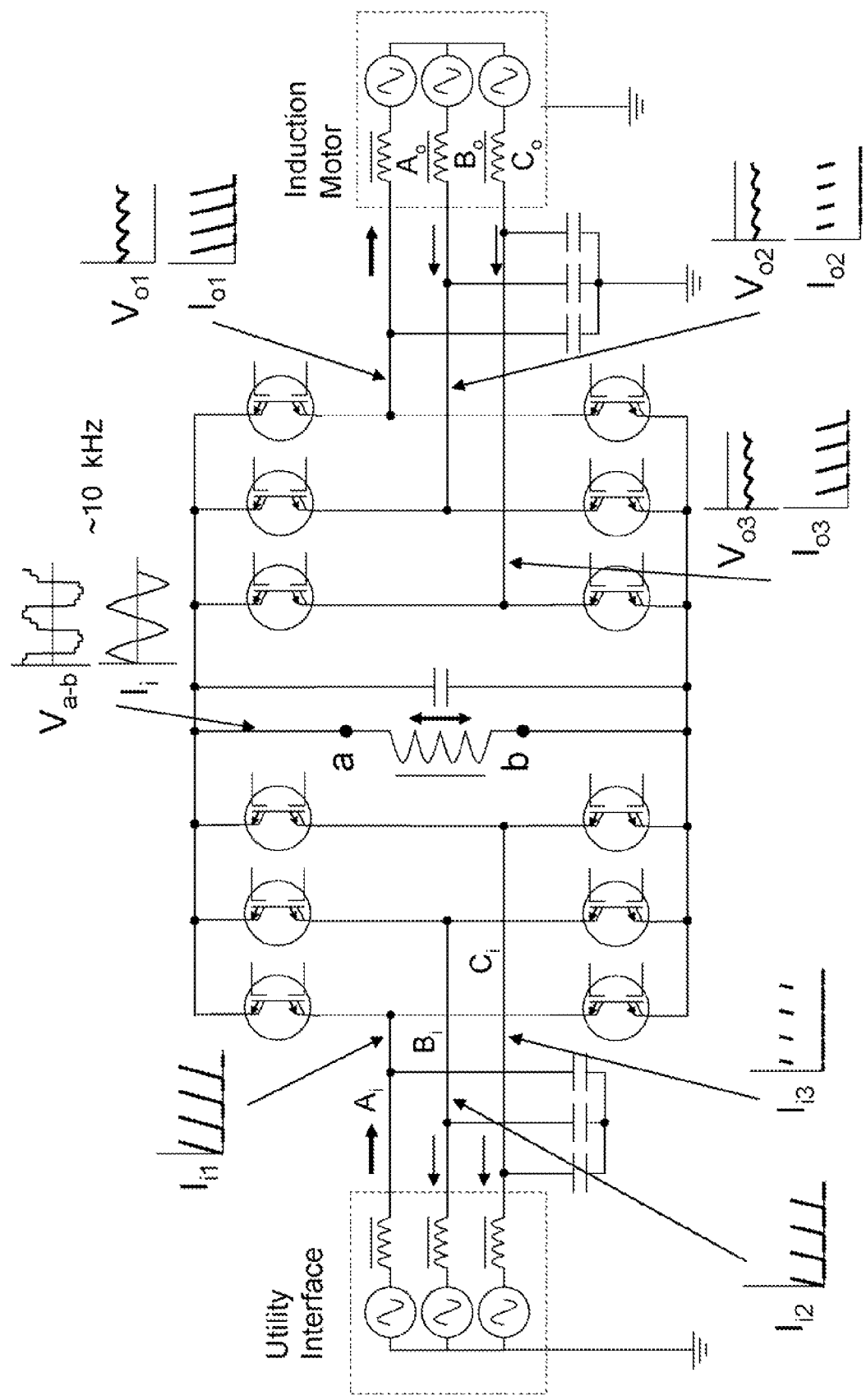
Figure 11 – Summary of Current Waveforms

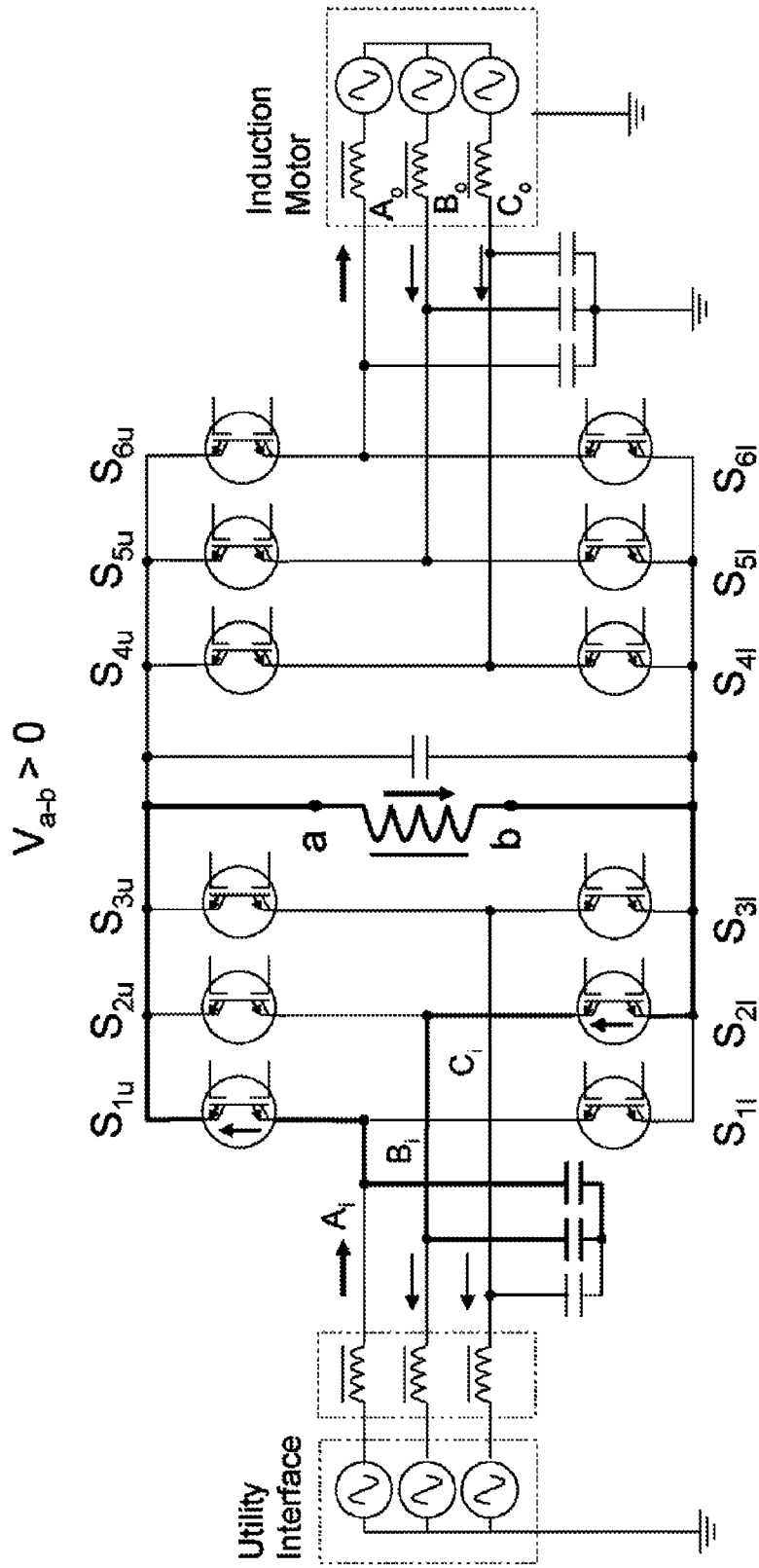
Figure 12a – Current Switching – Mode 1 of 8

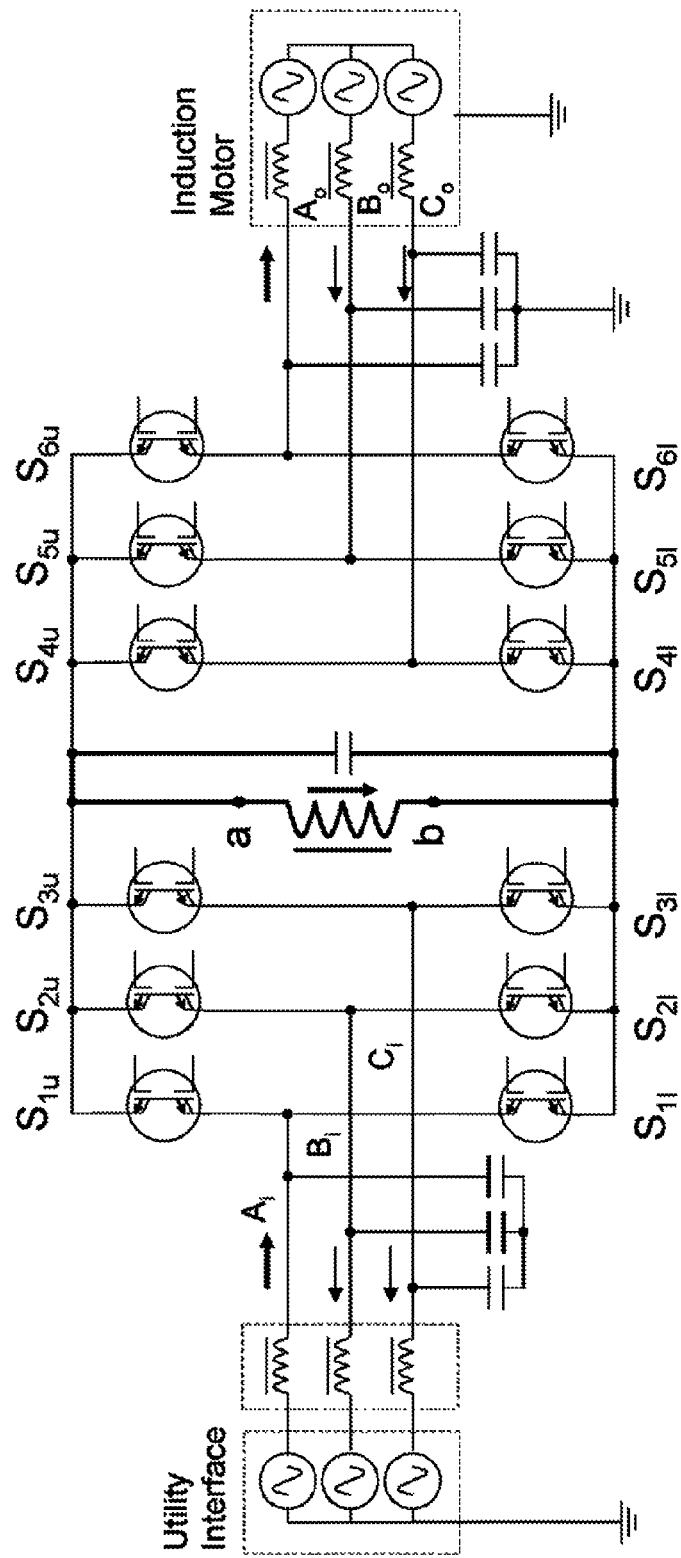
Figure 12b – Voltage Ramping – Between each of Modes 1 - 5

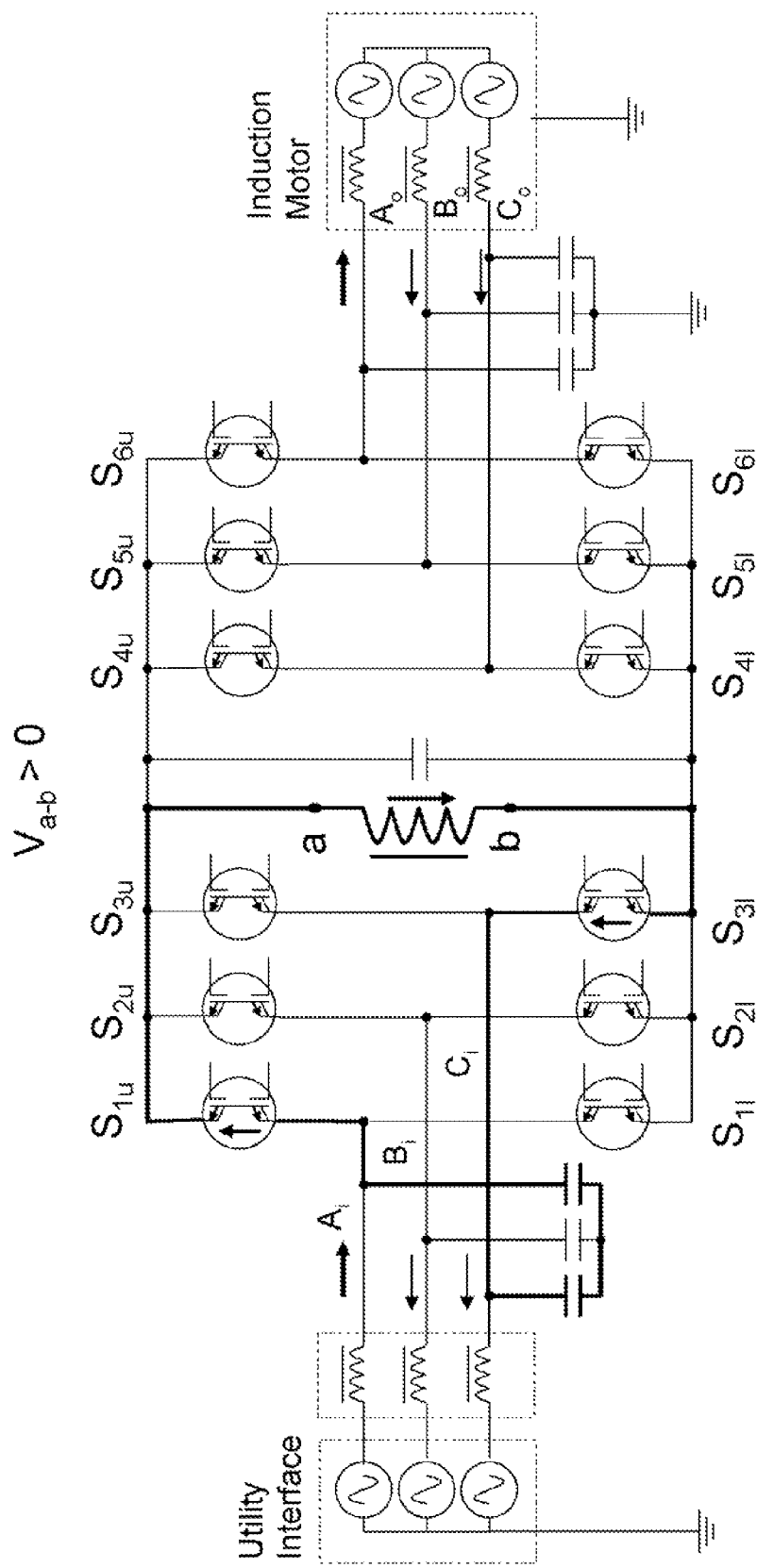
Figure 12c – Current Switching – Mode 2 of 8

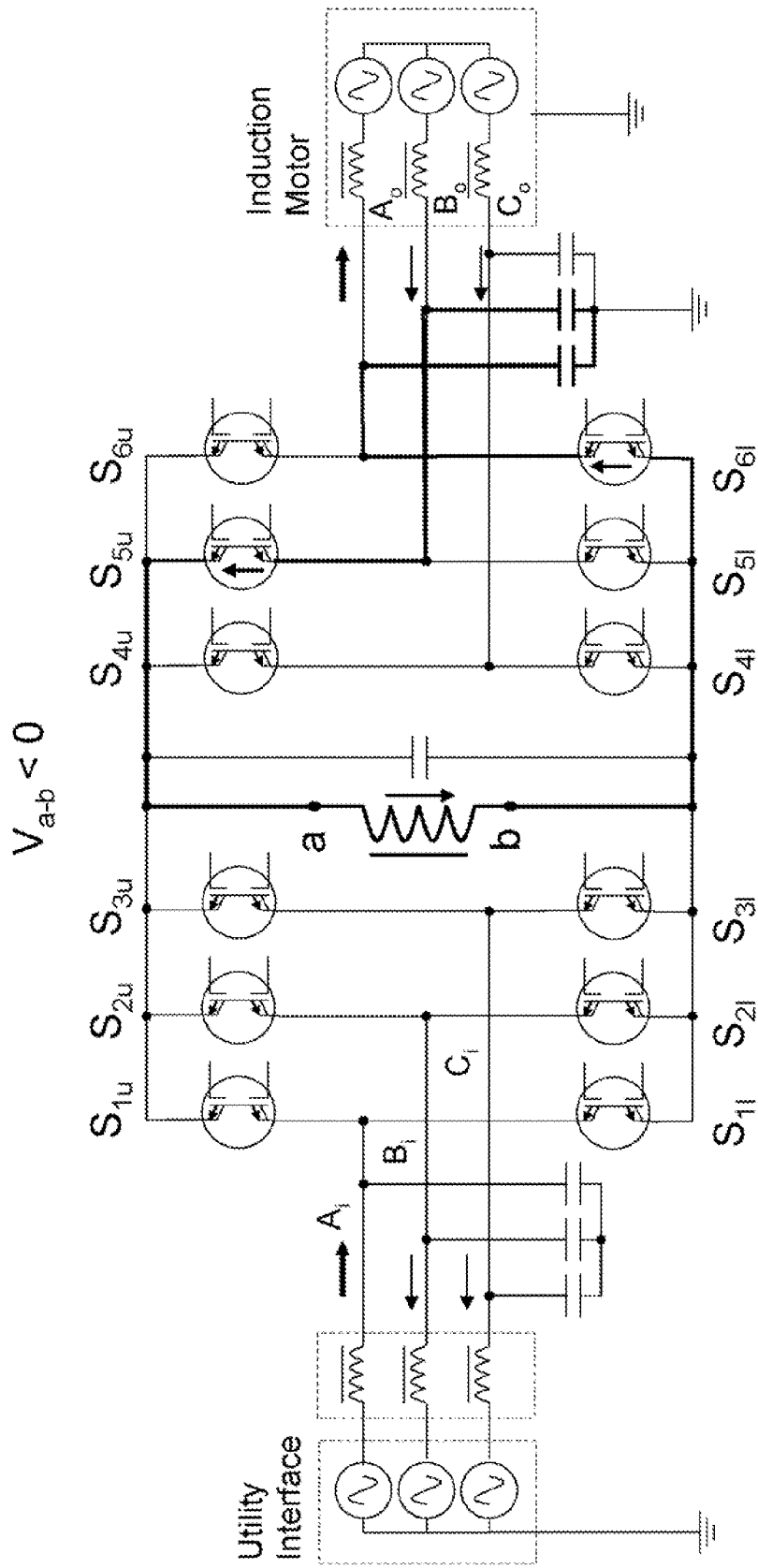
Figure 12d – Current Switching – Mode 3 of 8

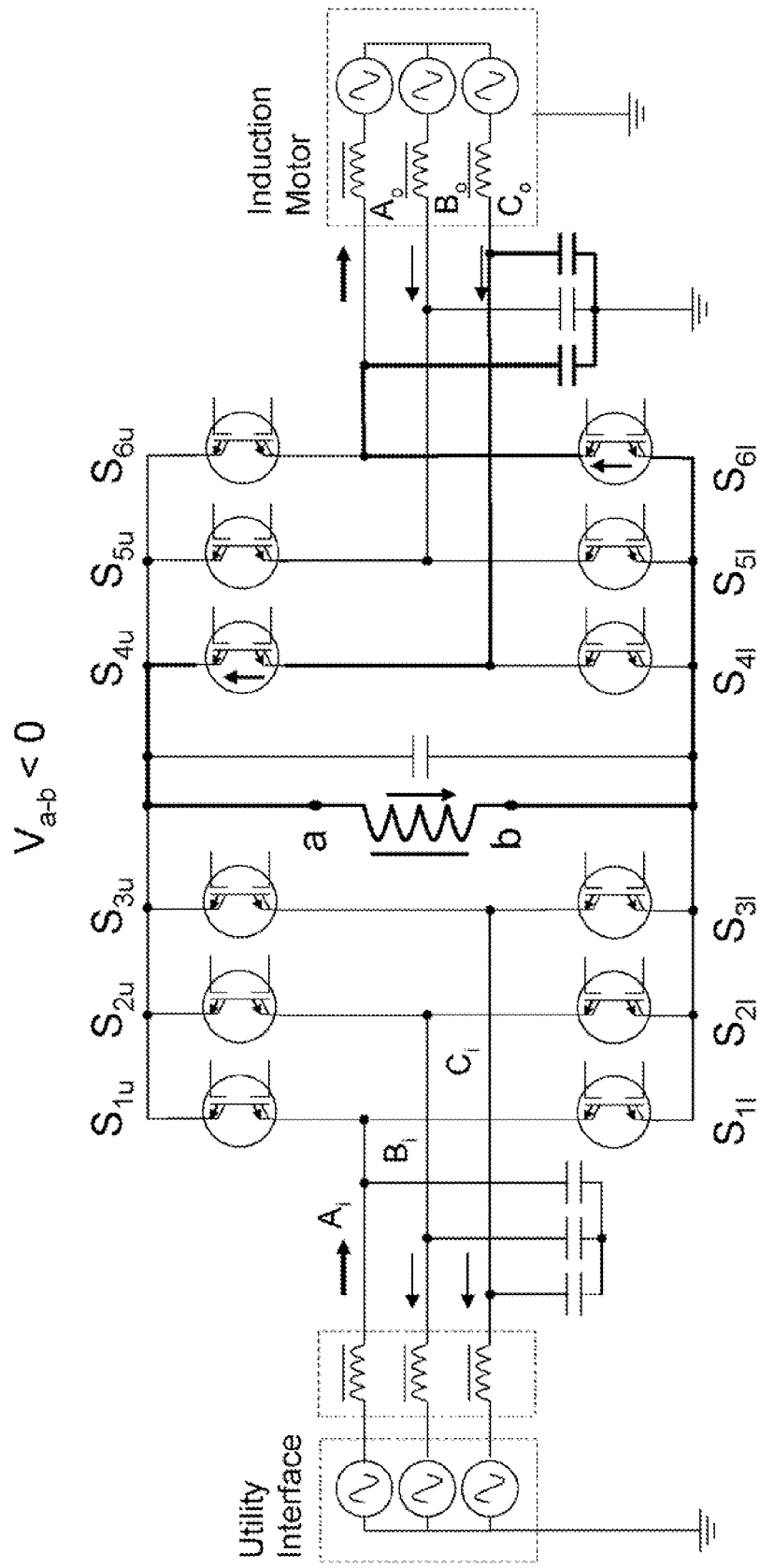
Figure 12e – Current Switching – Mode 4 of 8

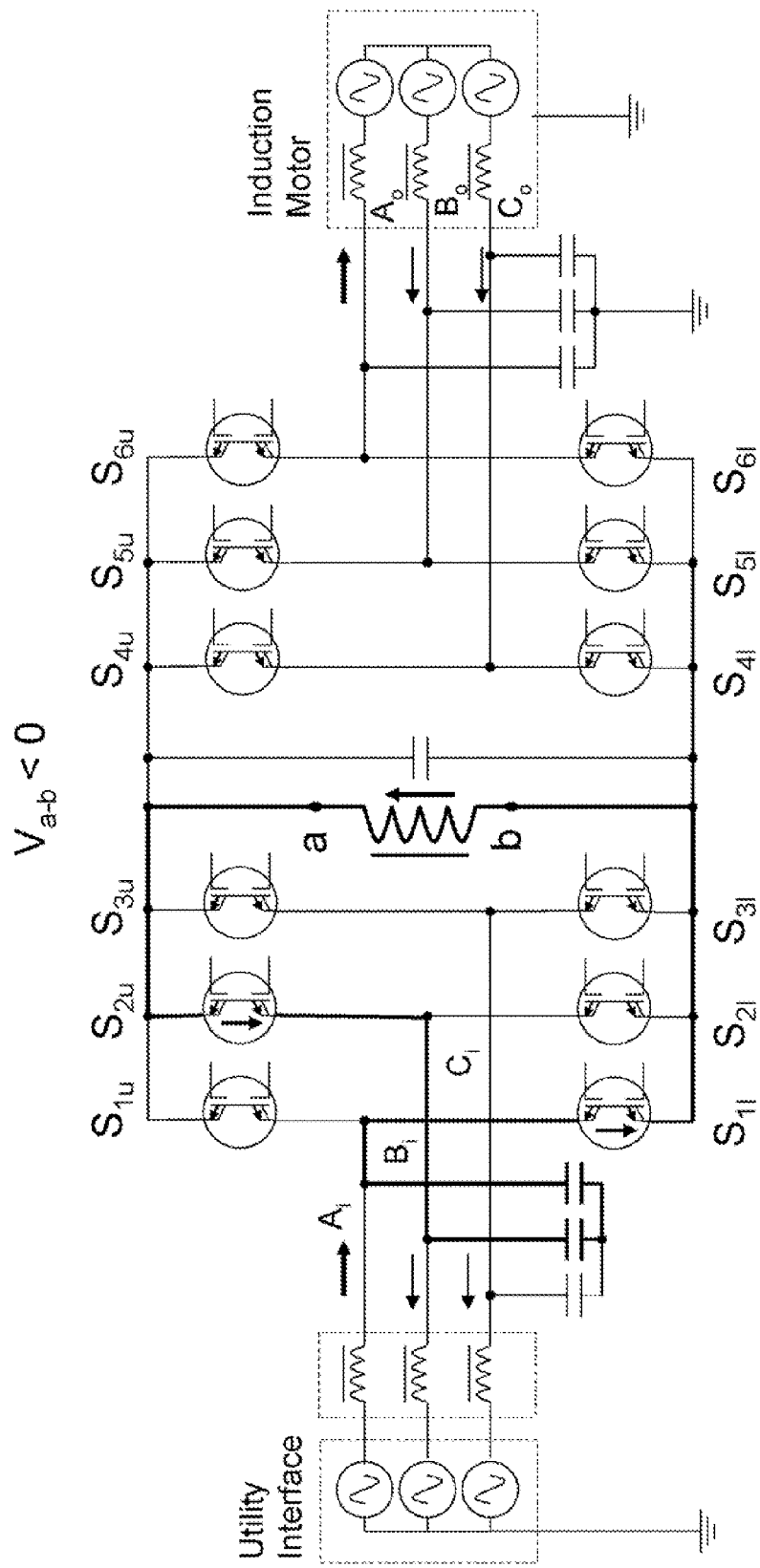
Figure 12f – Current Switching – Mode 5 of 8

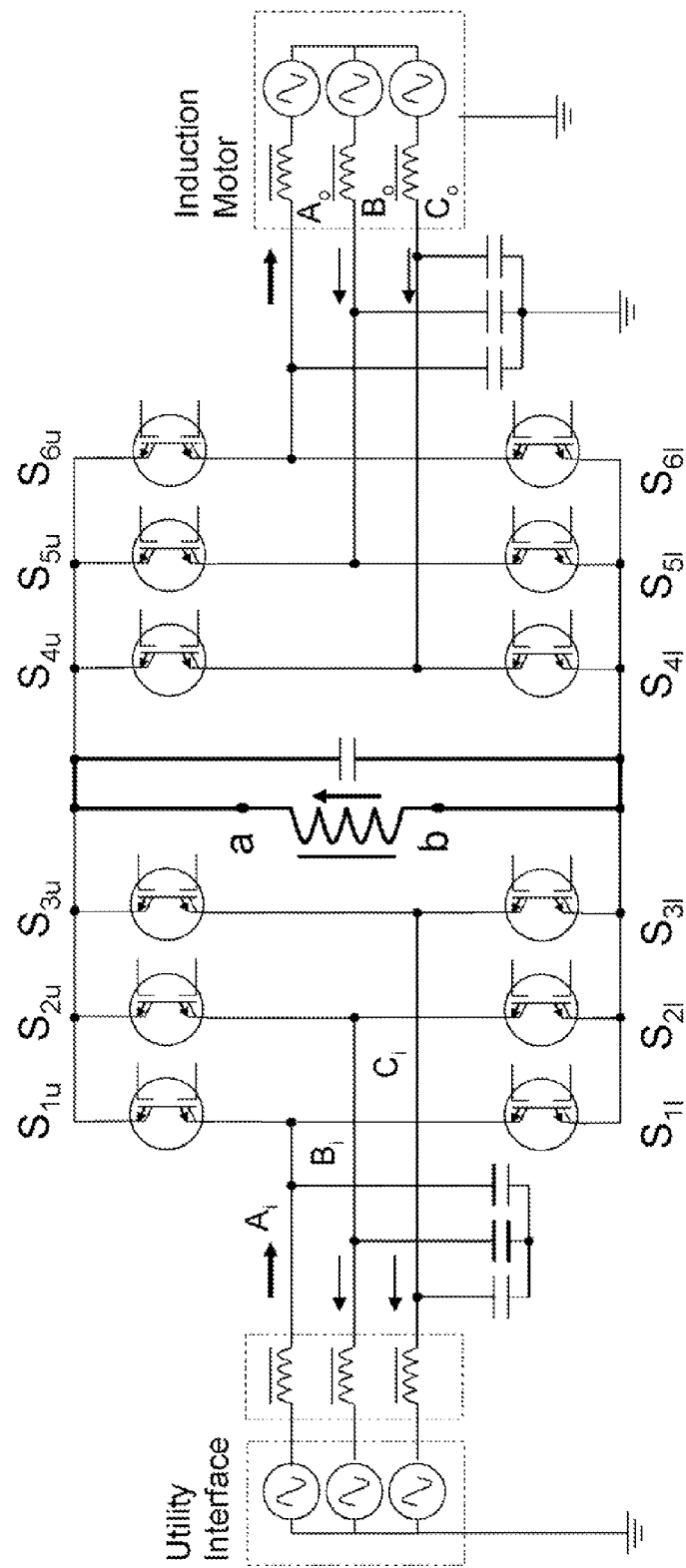
Figure 12g – Capacitor Ramping – Between each of Modes 5 - 1

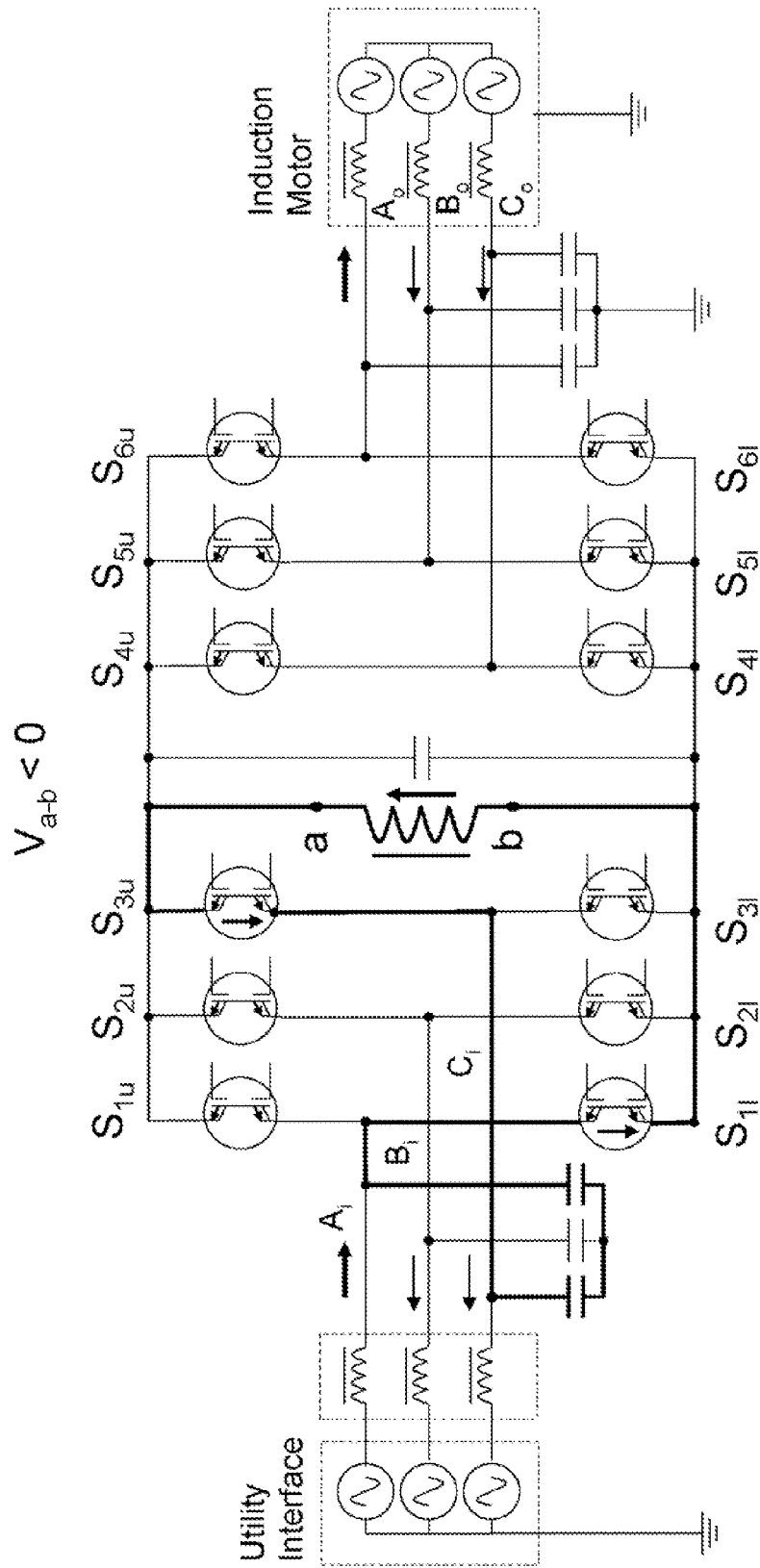
Figure 12h – Current Switching – Mode 6 of 8

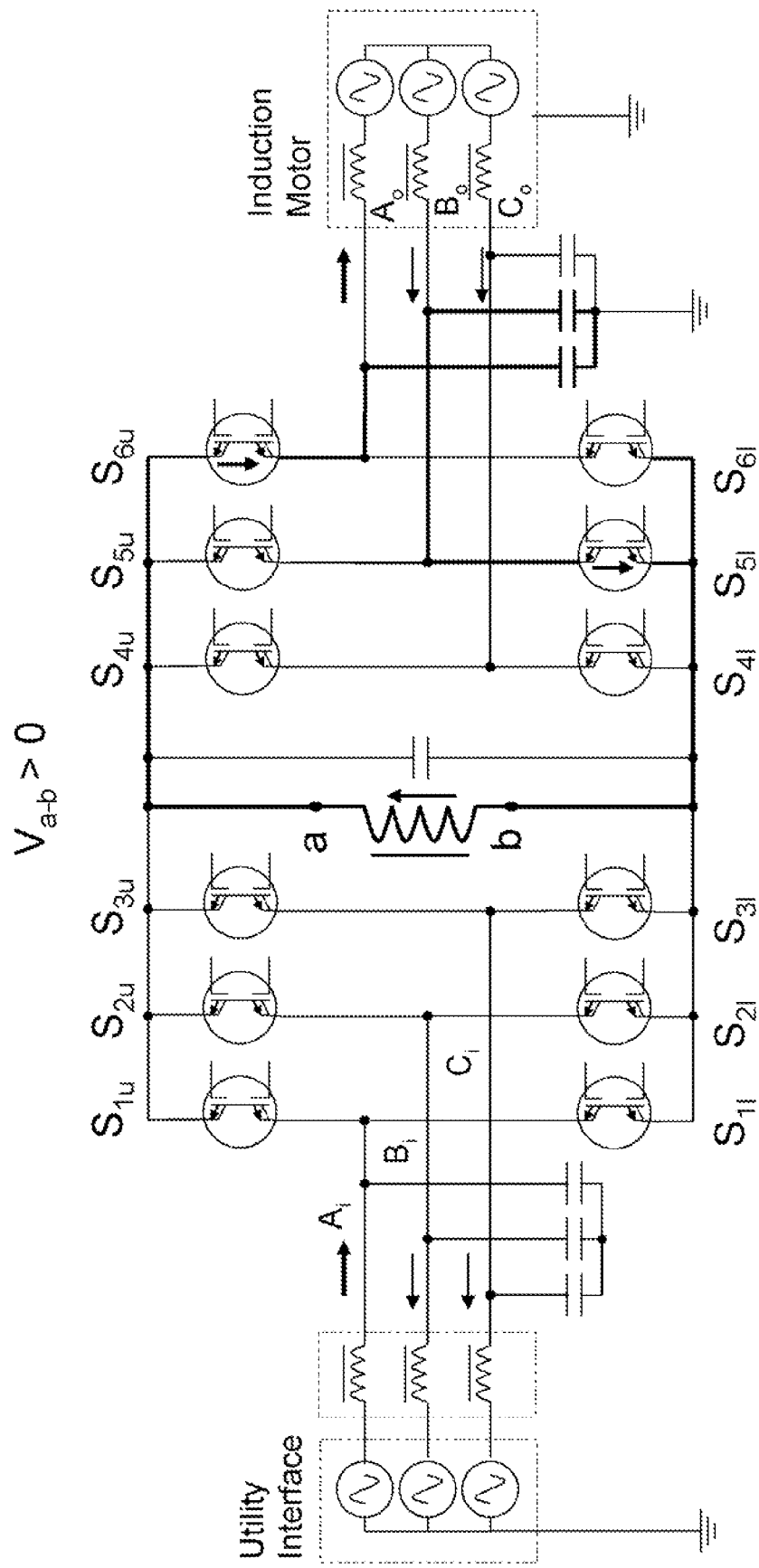
Figure 12i – Current Switching – Mode 7 of 8

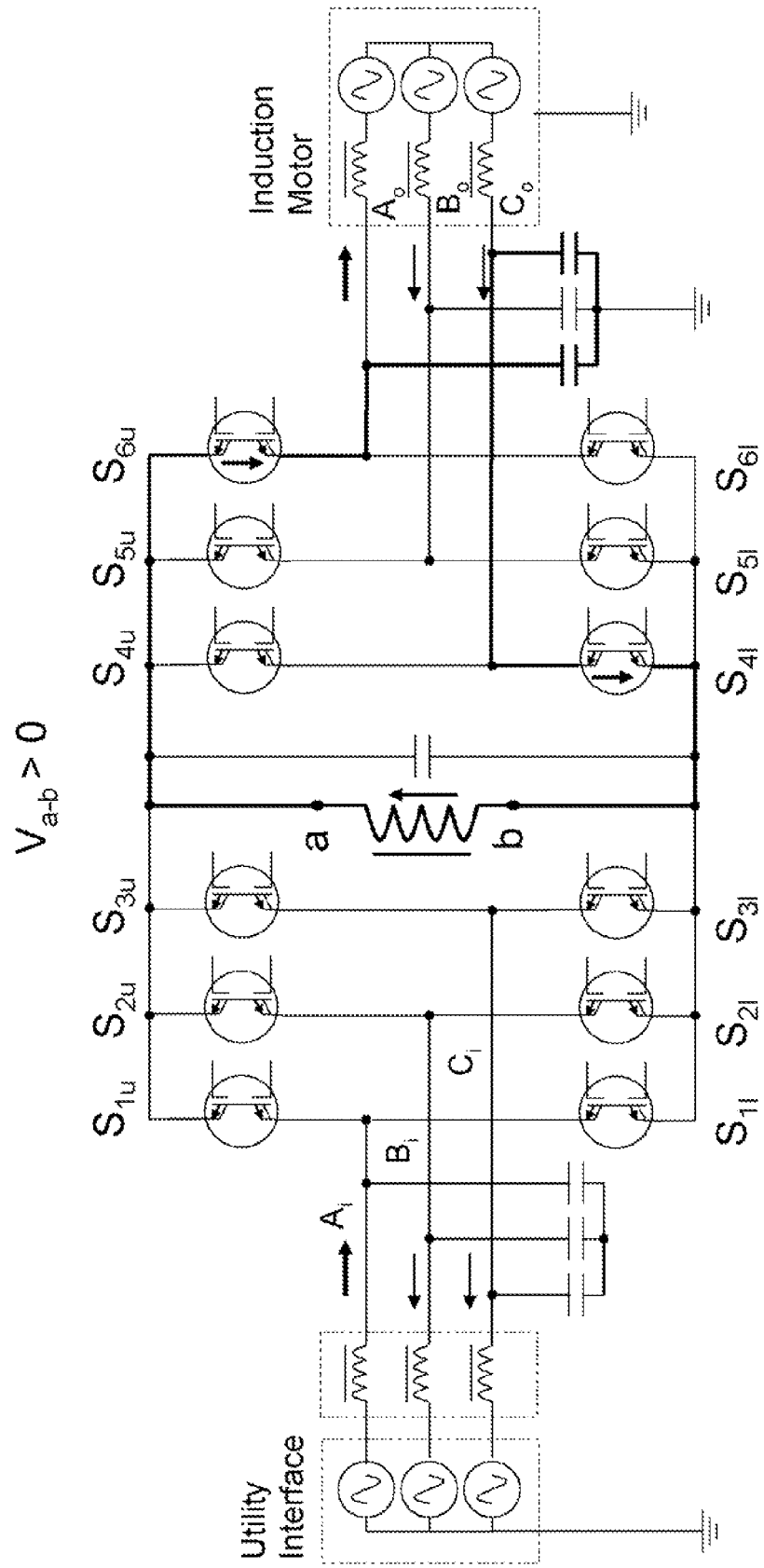
Figure 12j – Current Switching – Mode 8 of 8

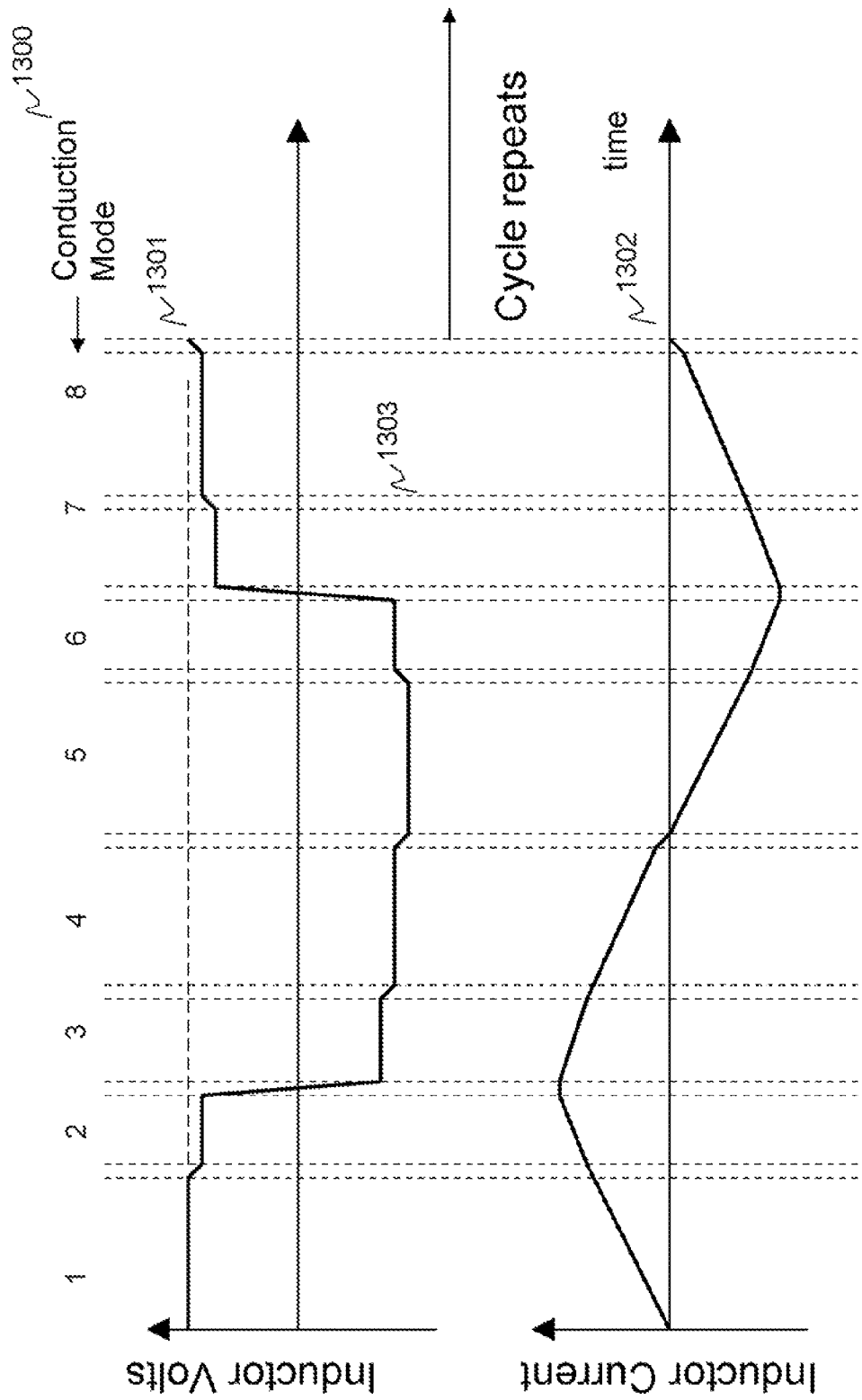
Figure 13 – For Figure 12 - Vout is slightly less than Vin

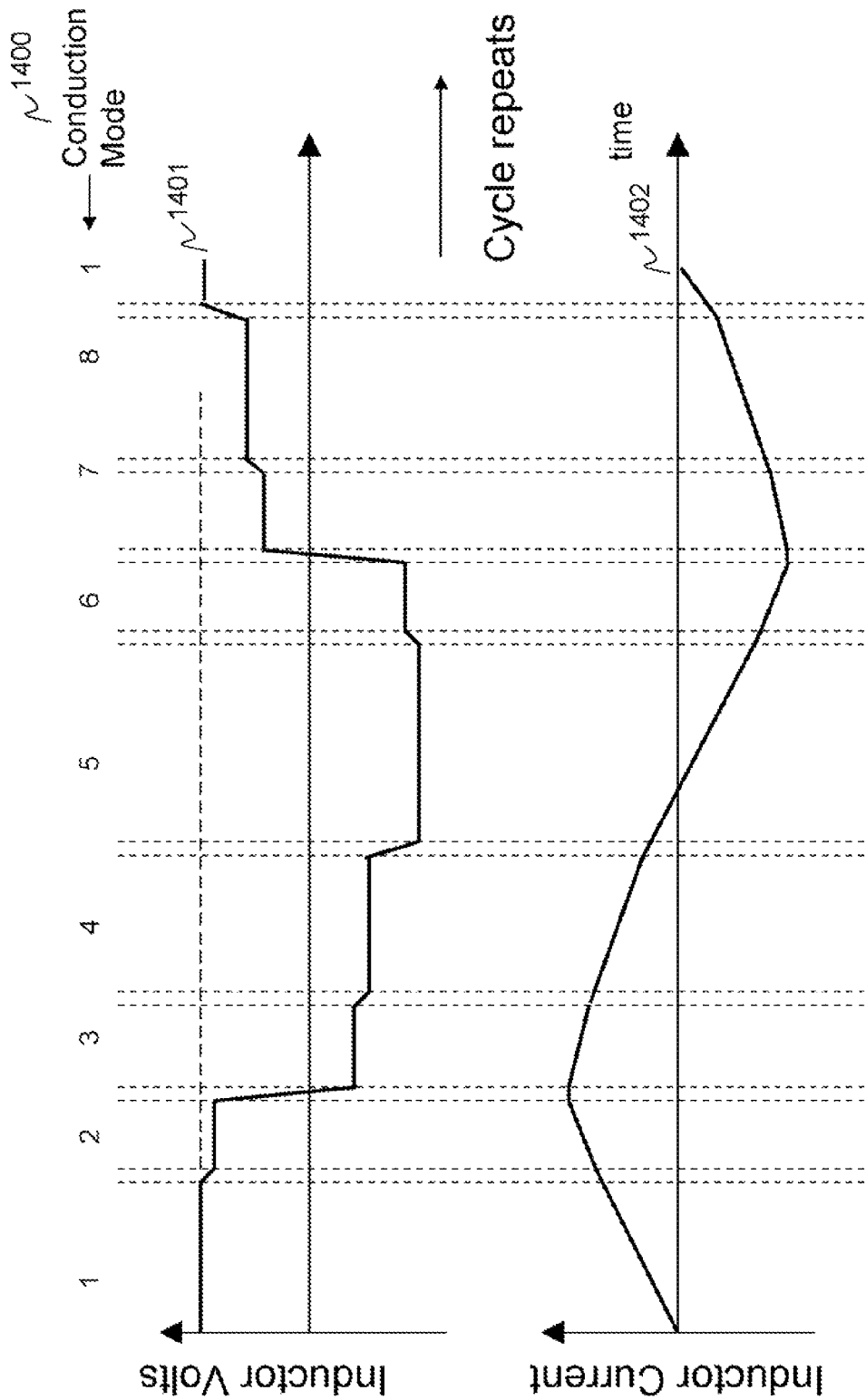
Figure 14 – Vout is ½ of Vin

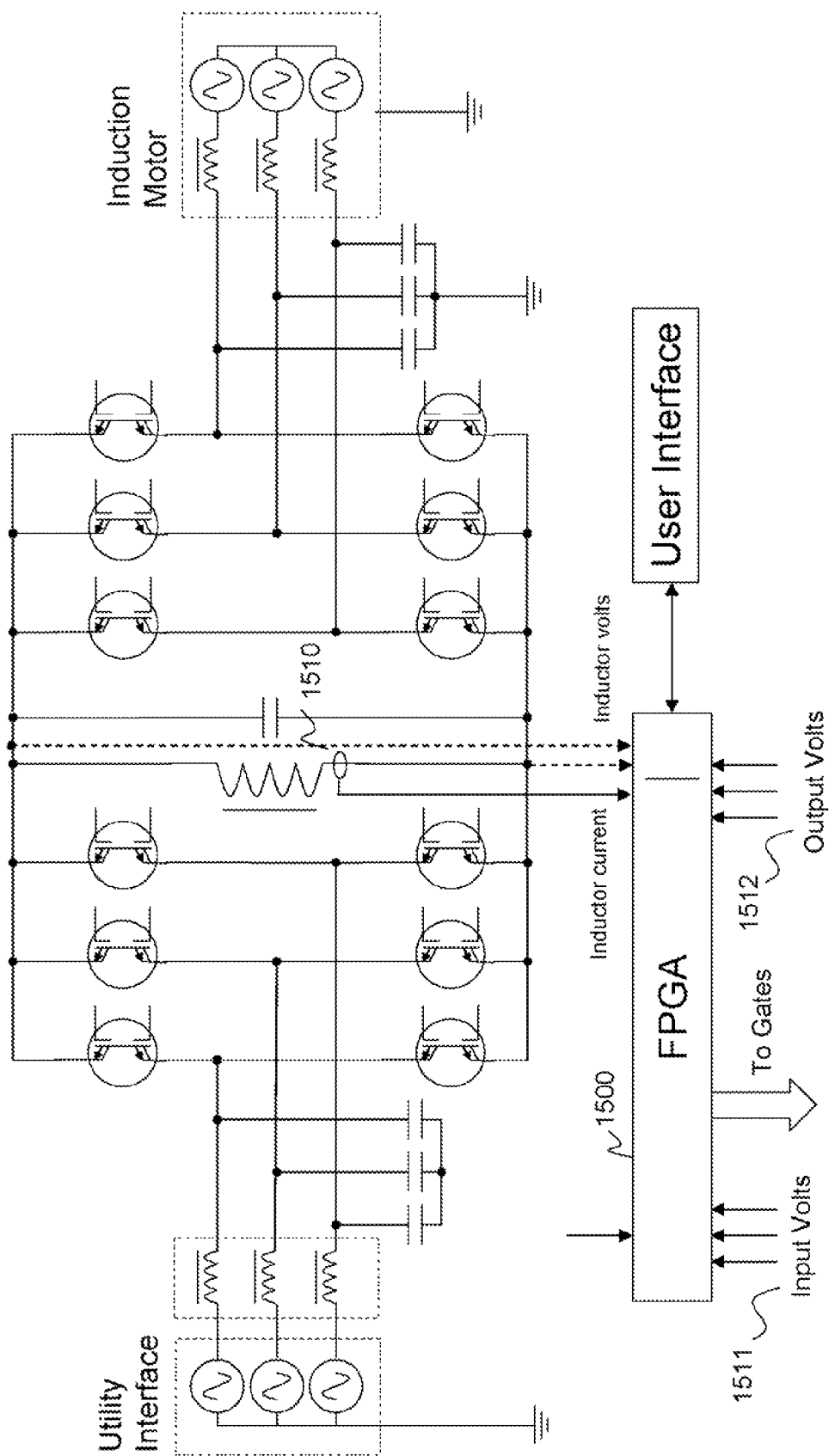
Figure 15 - Controls

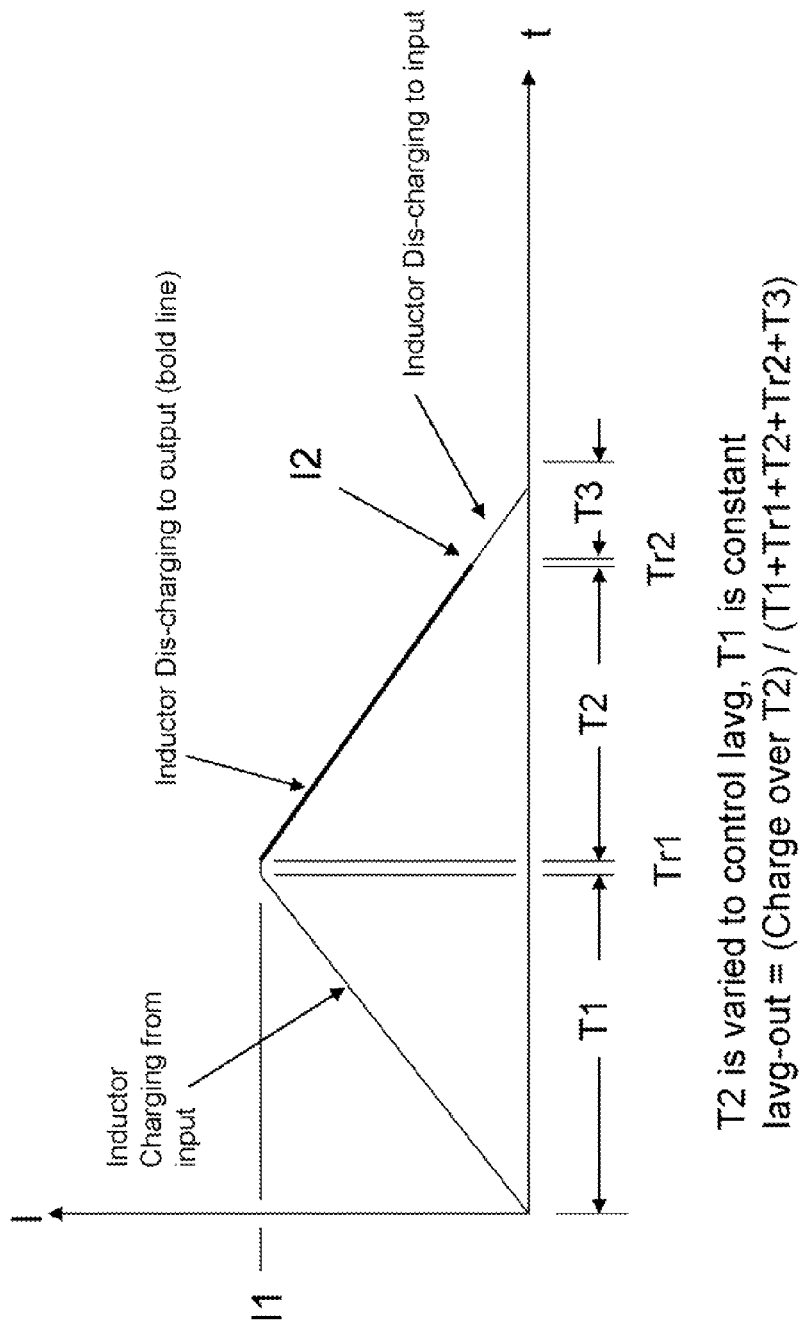
Figure 16 – Output Current – Case 1

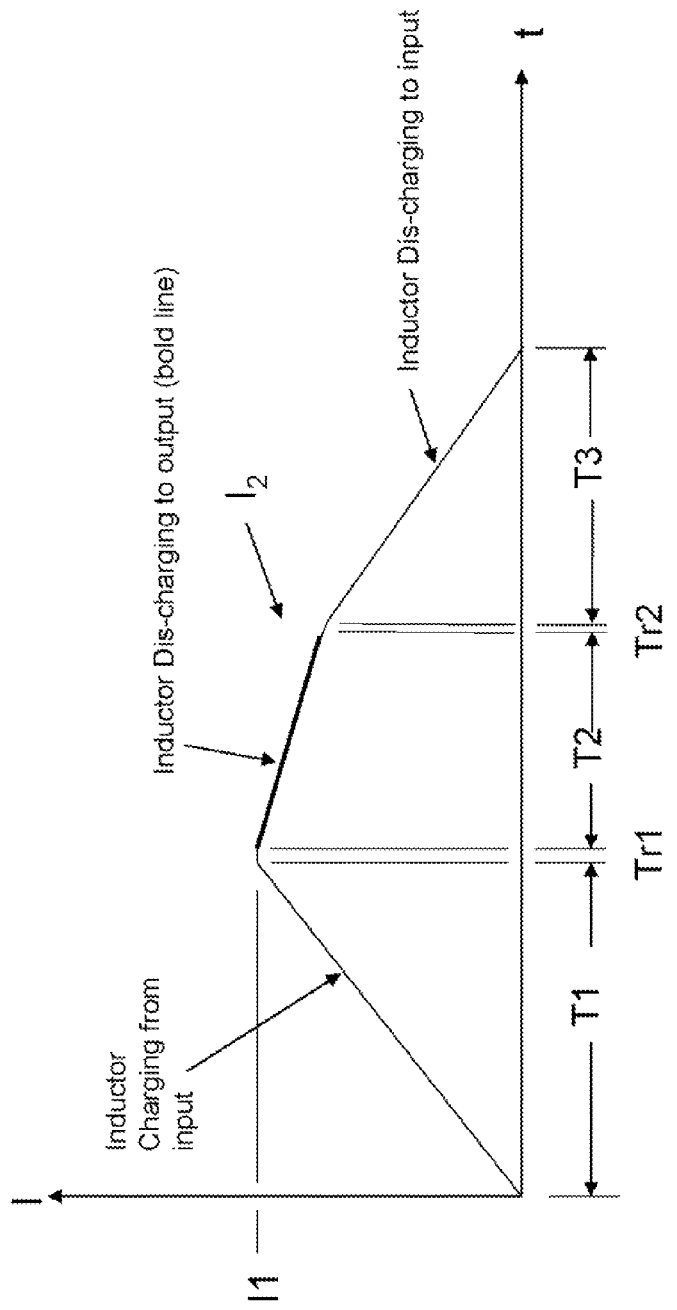
Figure 17 – Output Current – Case 2

| | | | | | |
|---|---|---|---|---|---|
| L | 140 | uH | Inductor | | |
| Vin | 650 | volts | Input Volts | | |
| Vout | 600 | volts | Output Volts | | |
| T1 | 23.6 | uS | Inductor Charge Time | | |
| dT | 2 | uS | Time Step | | |
| cap | 0.2 | uF | Parallel Capacitance | | |

| | |
|---|---|
| T2 | Discharge Time |
| I1 | Peak charge current |
| I2 | Current after discharge |
| T3 | Discharge Time to Input |
| Ttotal | total cycle time |
| Iavg-out | Average output current |
| f | inductor frequency |
| Tr1 | Capacitor ramp time after Ti1 |
| Tr2 | Capacitor ramp time after Ti2 |
| T1 | Inductor Charge time |

| T2 | I1 | I2 | T3 | Ttotal | Iavg-out | f | Tr1 | Tr2 | power |
|---|---|---|---|---|---|---|---|---|---|
| | T1*Vin/L | I1-T2*Vout/L | I2*L/Vin | T1+T2+T3+Tr1+Tr2 | (I1+I2)*T2/(2*Ttotal) | 1000000/(2*Ttotal) | (Vin+Vout)*cap/I1 | (Vin-Vout)*cap/I2 | Iavg*Vout |
| uS | Amps | Amps | uS | uS | Amps | Hz | uS | uS | watts |
| 0 | 109.5714286 | 109.5714286 | 23.6 | 49.57288136 | 0 | 10086.2 | 2.28161669 | 0.09126468 | 0 |
| 2 | 109.5714 | 101 | 21.753846 | 49.73447274 | 4.233912957 | 10053.4 | 2.28161669 | 0.099009901 | 2540.348 |
| 4 | 109.5714 | 92.42857143 | 19.907692 | 49.89750065 | 8.096597921 | 10020.5 | 2.28161669 | 0.108191654 | 4857.959 |
| 6 | 109.5714 | 83.85714286 | 18.061538 | 50.06240558 | 11.59120472 | 9987.53 | 2.28161669 | 0.119250426 | 6954.748 |
| 8 | 109.5714 | 75.28571429 | 16.215385 | 50.22982863 | 14.72090572 | 9954.24 | 2.28161669 | 0.132827324 | 8832.543 |
| 10 | 109.5714 | 66.71428571 | 14.369231 | 50.40074039 | 17.48840522 | 9920.49 | 2.28161669 | 0.149892934 | 10493.04 |
| 12 | 109.5714 | 58.14285714 | 12.523077 | 50.57668378 | 19.89623753 | 9885.98 | 2.28161669 | 0.171990172 | 11937.74 |
| 14 | 109.5714 | 49.57142857 | 10.676923 | 50.76026887 | 21.94629825 | 9850.22 | 2.28161669 | 0.201729107 | 13167.78 |
| 16 | 109.5714 | 41 | 8.8307692 | 50.95628836 | 23.63930866 | 9812.33 | 2.28161669 | 0.243902439 | 14183.59 |
| 18 | 109.5714 | 32.42857143 | 6.9846154 | 51.17460212 | 24.97332558 | 9770.47 | 2.28161669 | 0.308370044 | 14984 |
| 20 | 109.5714 | 23.85714286 | 5.1384615 | 51.4392399 | 25.93906358 | 9720.21 | 2.28161669 | 0.419161677 | 15563.44 |

Figure 18 – Spreadsheet to calculate Average Output Current and Power

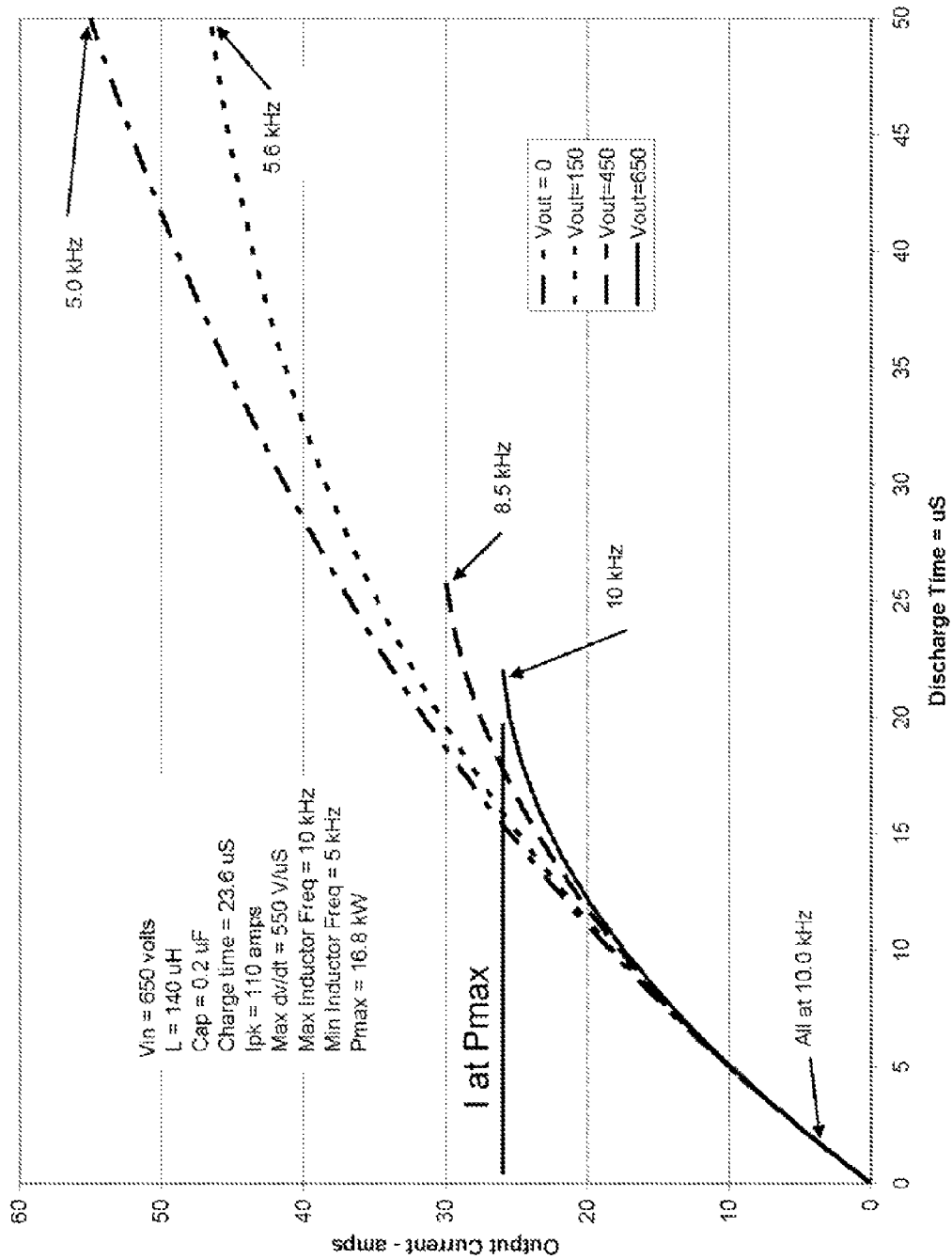
Figure 19 – Spreadsheet results - Motoring

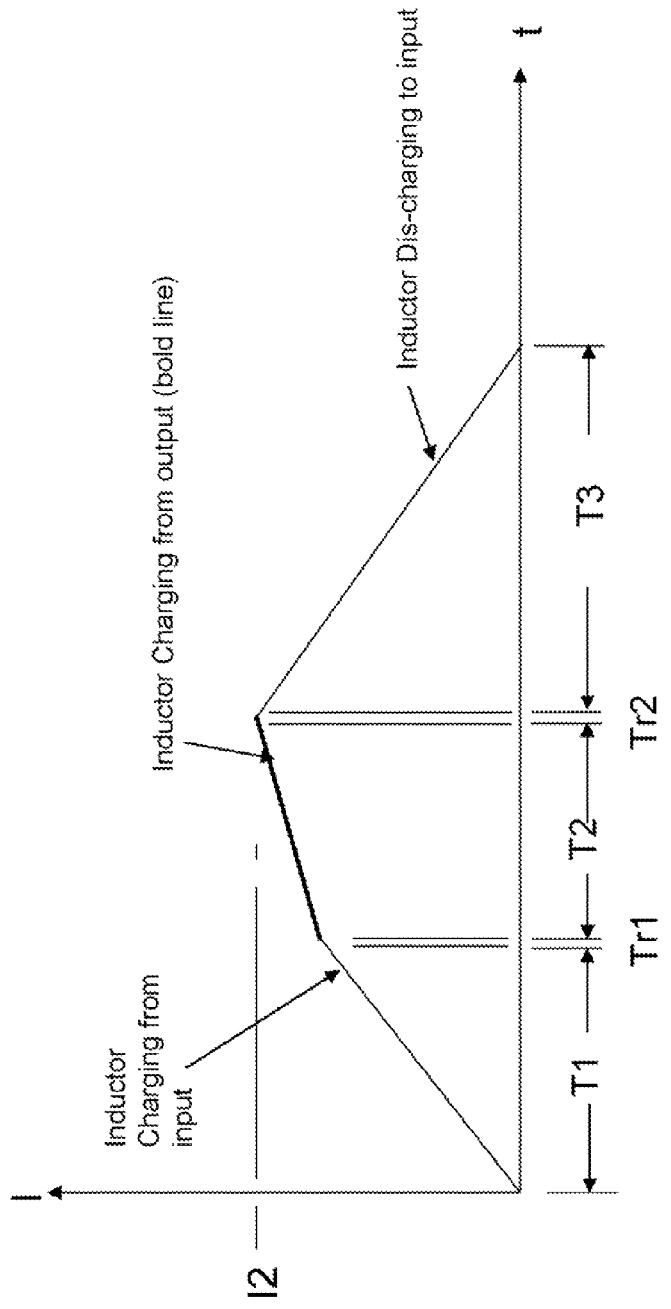
Figure 20 – Output Current – Case 3

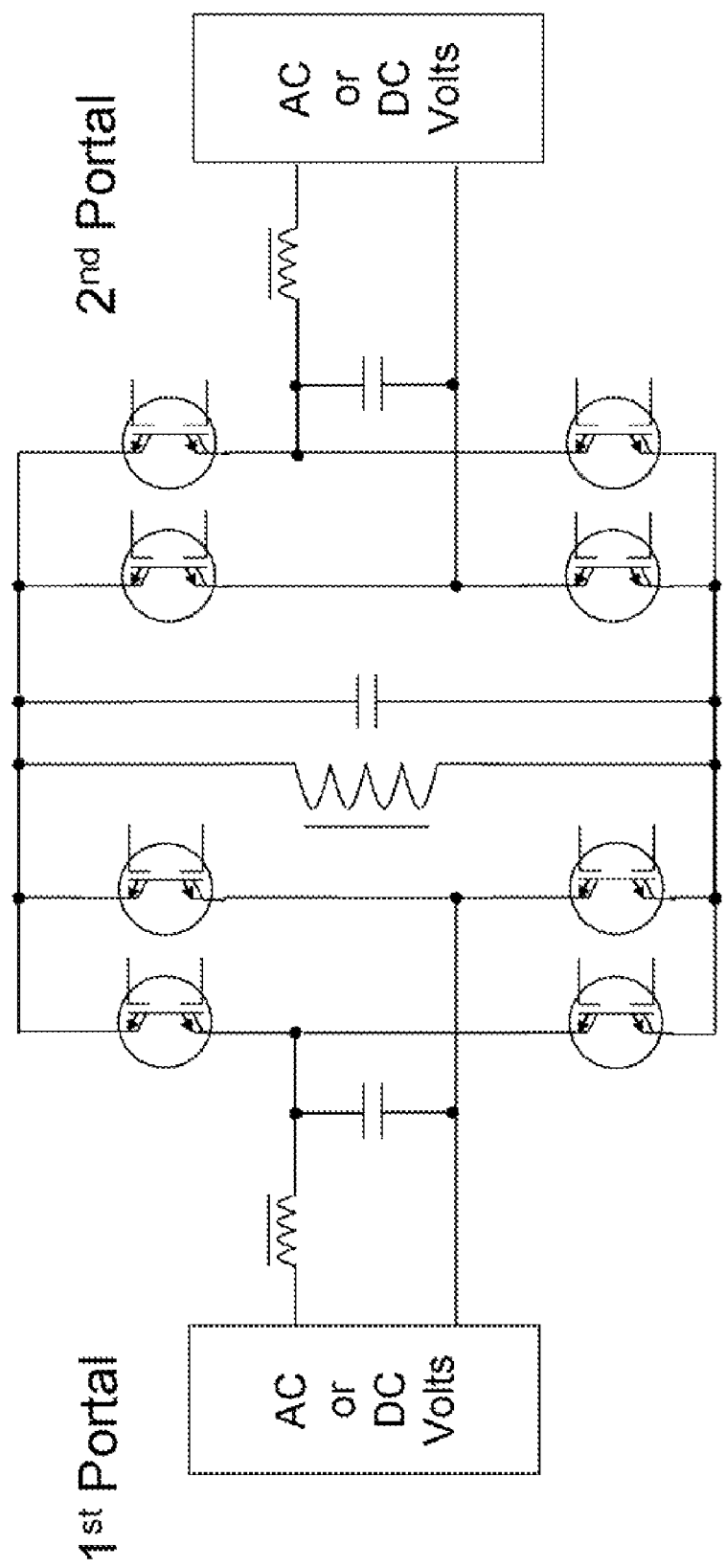
Figure 21 – DC or Single Phase AC

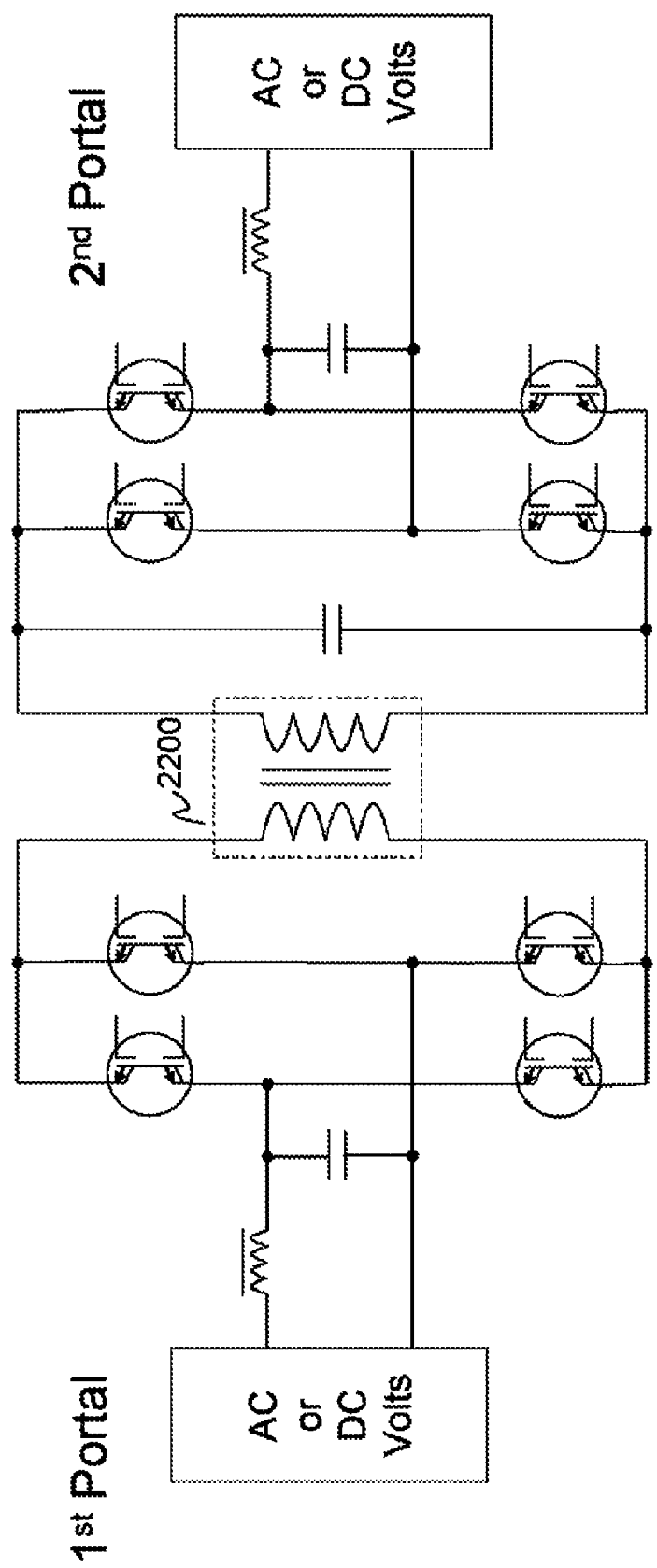
Figure 22 – Transformer/Inductor

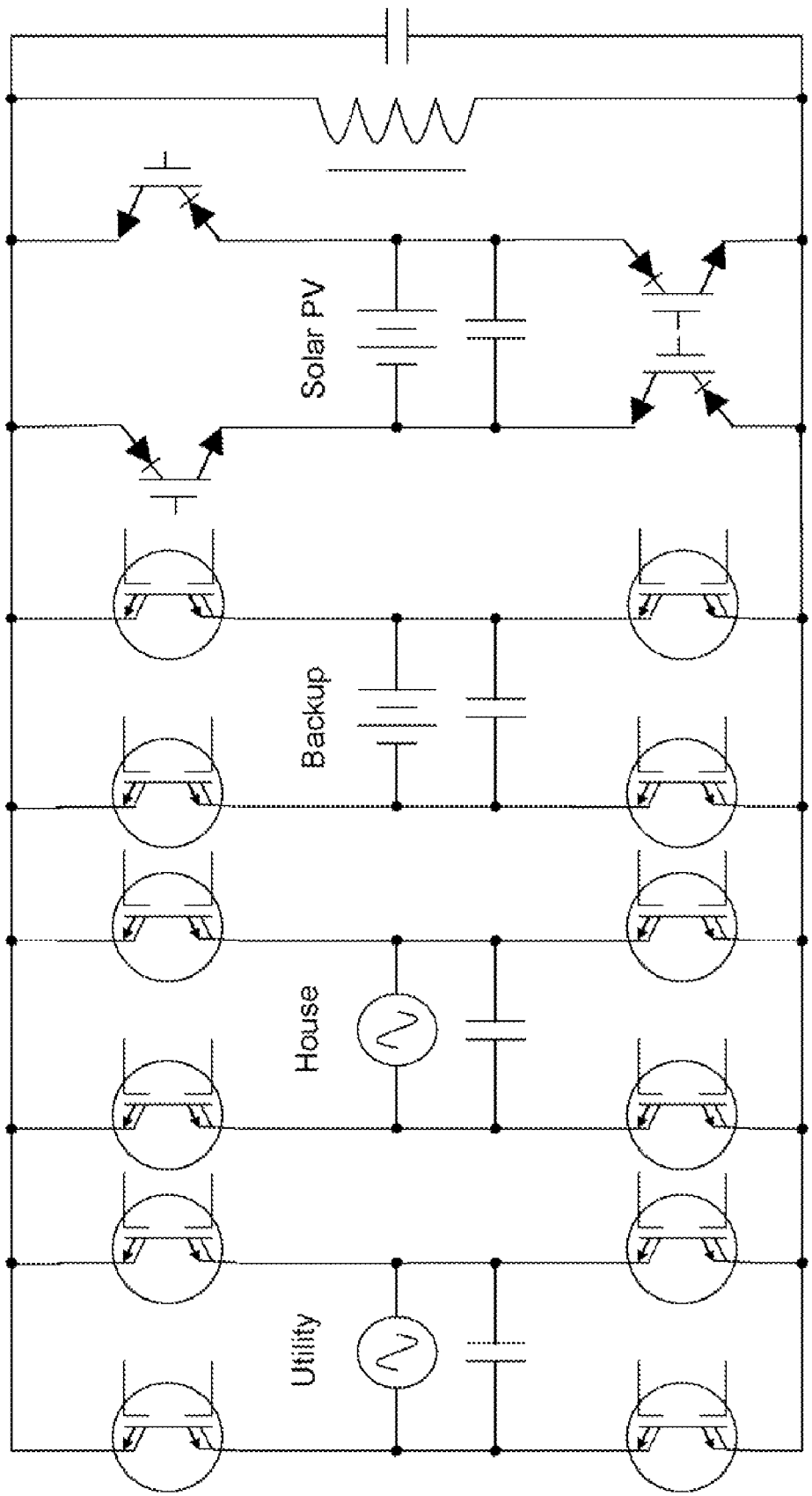
Figure 23 – Solar Power Converter

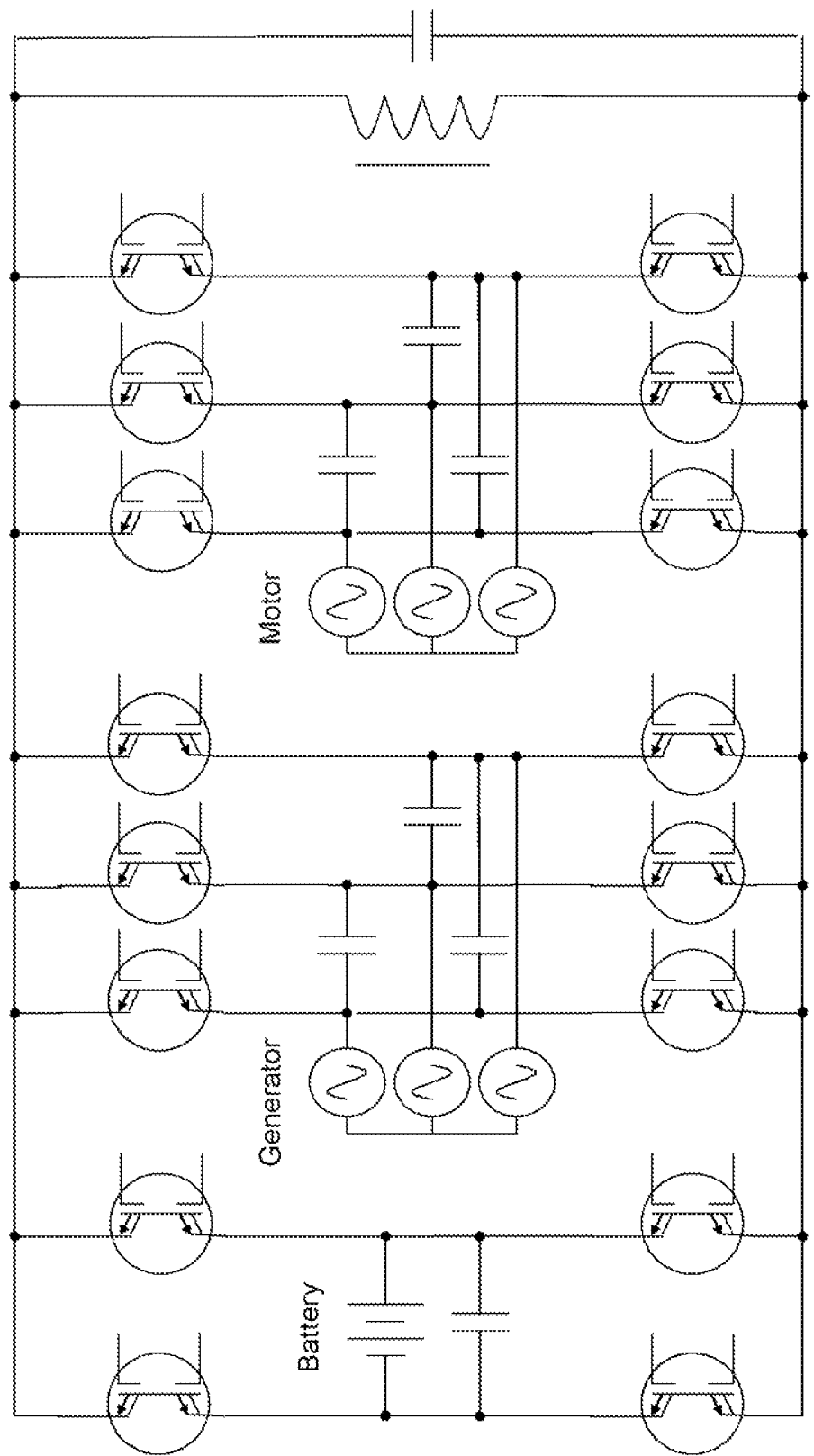
Figure 24 – Hybrid Vehicle Power Converter

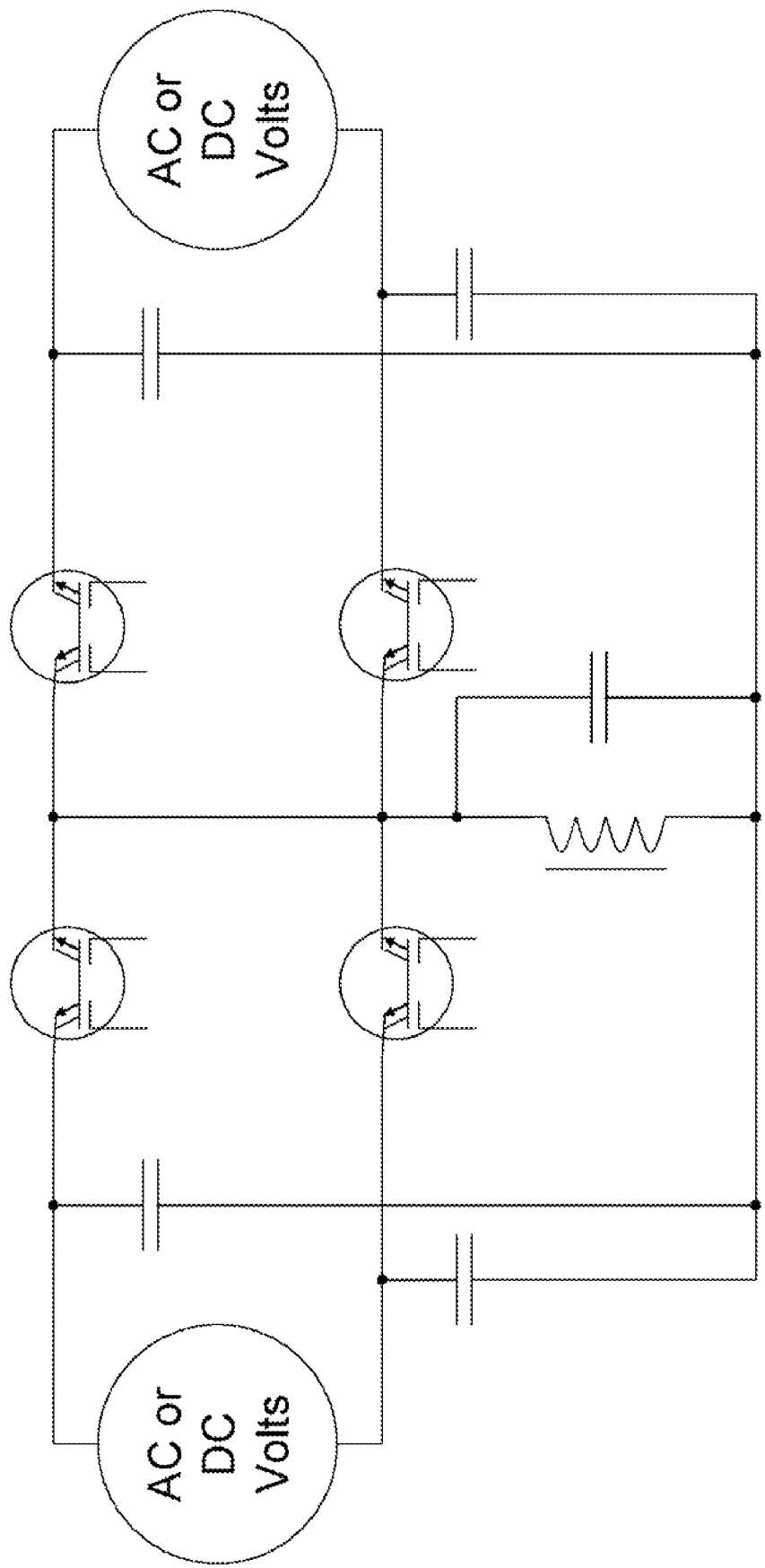
Figure 25 – Single Phase and/or DC Half Bridge

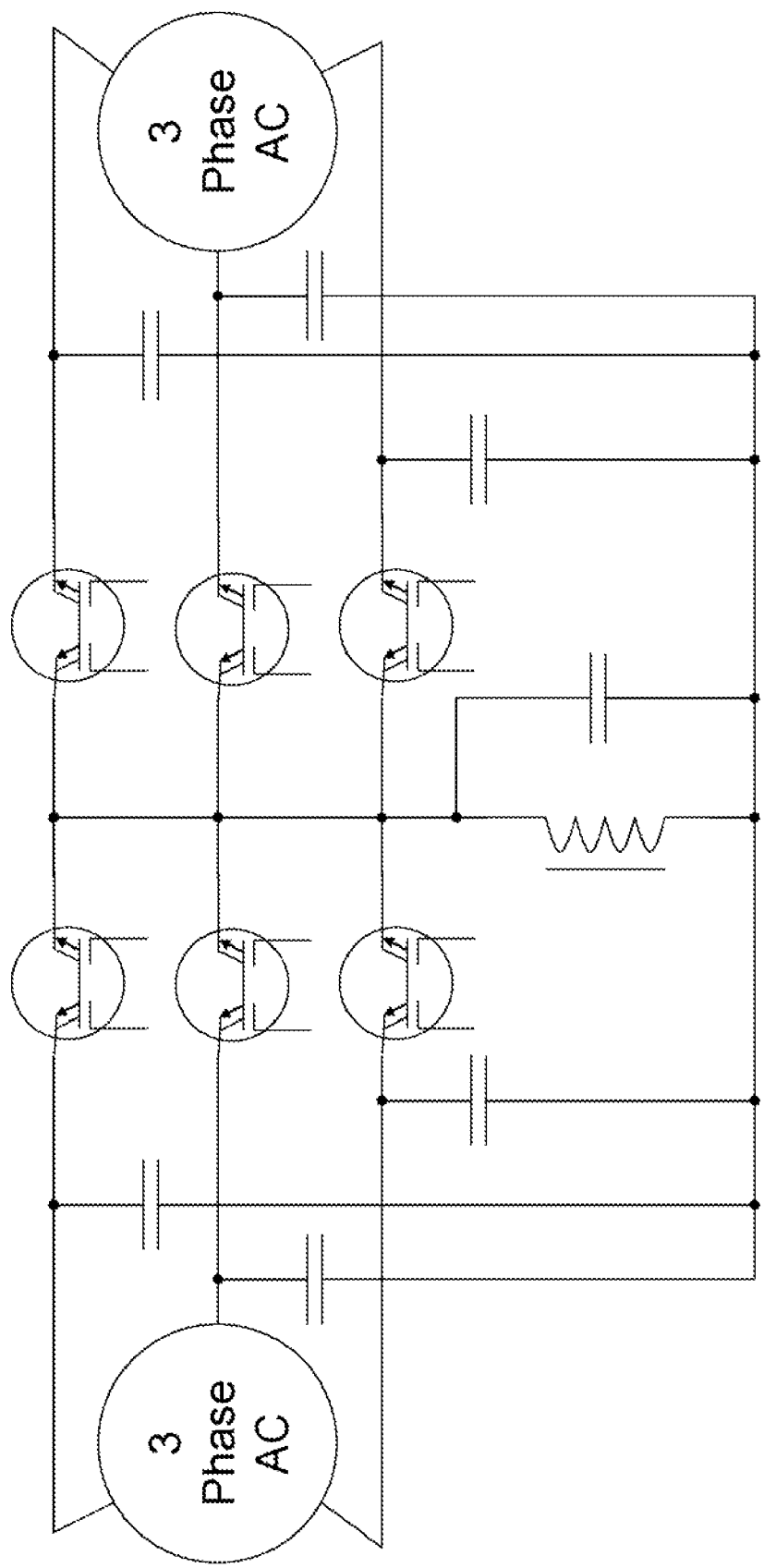
Figure 26 – Three Phase Half-Bridge

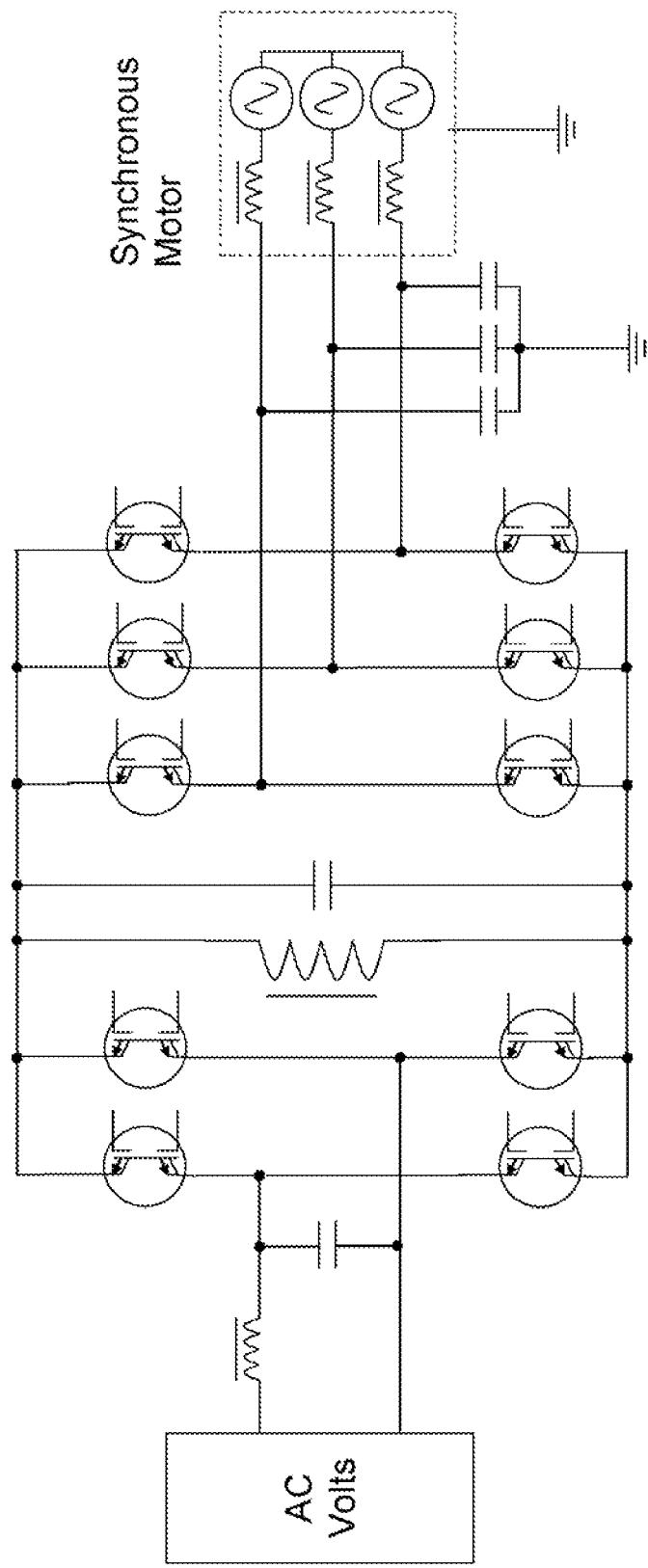
Figure 27 – Single Phase to Pulsing Three Phase

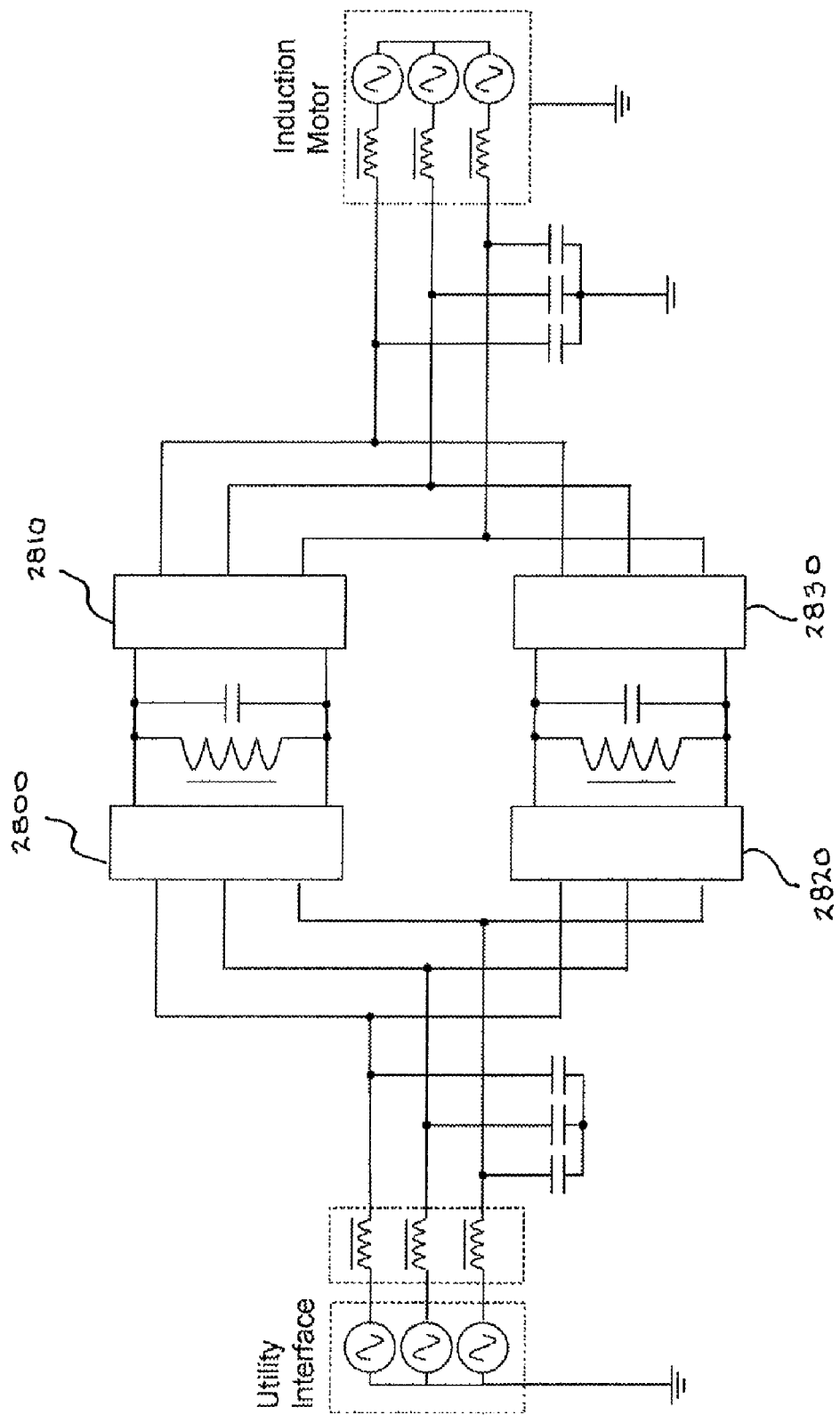
Figure 28 – Dual Power Module Configuration

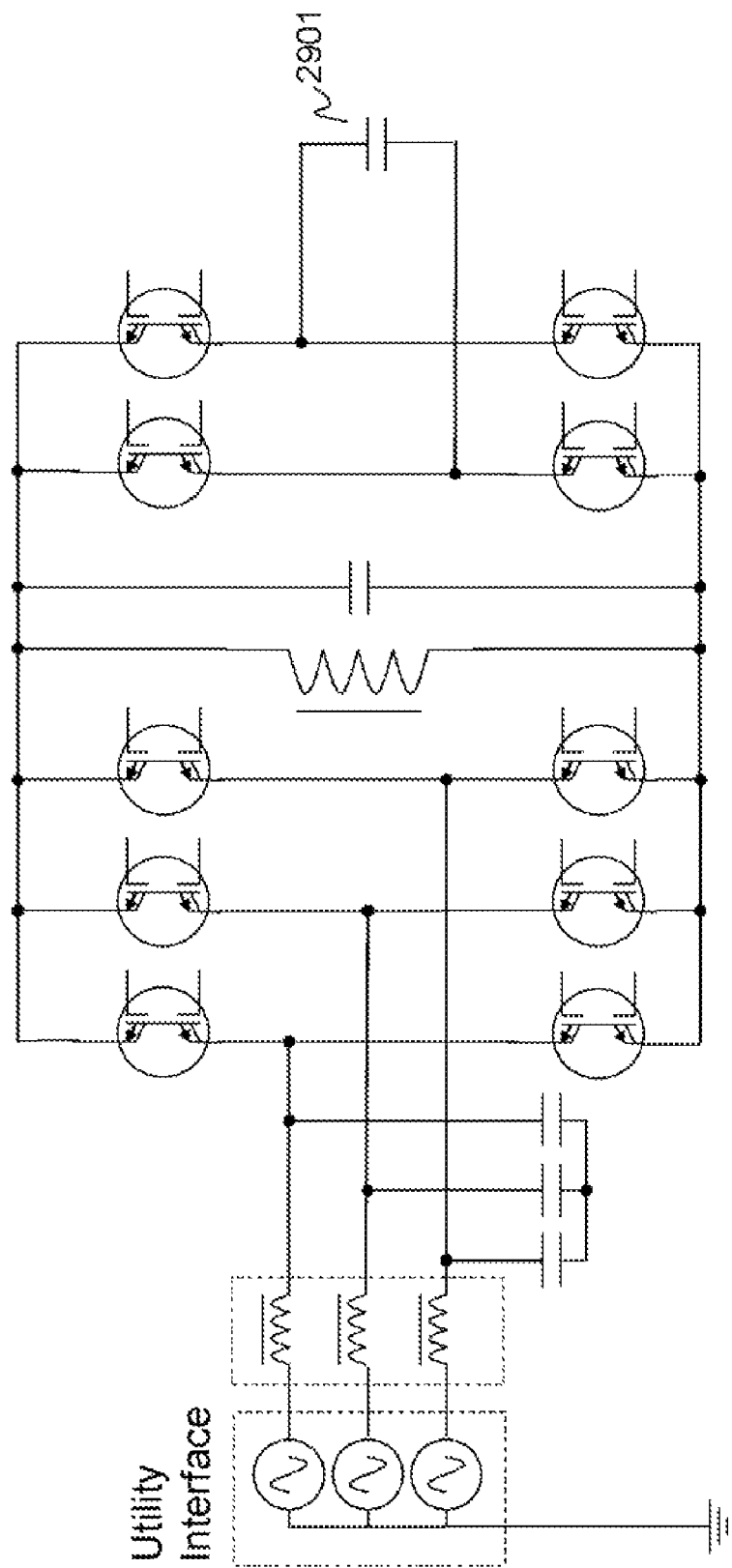
Figure 29 – Three Phase Line Conditioner

BUCK-BOOST POWER CONVERTER CIRCUITS, METHODS AND SYSTEMS

CROSS-REFERENCE TO OTHER APPLICATION

Priority is claimed from U.S. provisional application 60/811,191 filed Jun. 6, 2006, which is hereby incorporated by reference.

BACKGROUND AND SUMMARY OF THE INVENTIONS

The present application relates to electric power conversion, and more particularly to buck-boost converter circuits, methods and systems which can convert DC to DC, DC to AC, and AC-AC, and are suitable for applications including line power conditioners, battery chargers, hybrid vehicle power systems, solar power systems, motor drives, and utility power conversion.

Numerous techniques have been proposed for electronic conversion of electric power from one form into another. A technique in common commercial usage for operating three phase induction motors at variable frequency and voltage off of fixed frequency and voltage utility power is the AC-DC-AC technique of the input diode bridge. DC-link capacitor, and the output active switch bridge, under PWM control, is shown in FIG. 3. This motor drive technique ("standard drive") results in compact and low-cost motor drives, since no magnetic components are required and only six active switches are needed.

A number of difficulties exist with the standard drive, however. The input current, while nominally in phase with the input voltage, is typically drawn in pulses. These pulses cause increased electric losses in the entire electrical distribution system. The pulses also cause higher losses in the DC link capacitor. These losses reduce the efficiency of the drive, and also lessen the useful life of the DC link capacitor (commonly an Aluminum Electrolytic type), which has a limited life in an case. If the impedance of the source power is too low, the pulses may become so large as to be unmanageable, in which case it is necessary to add reactance in the input lines, which increases losses, size, cost, and weight of the drive. Also, the voltage available for the output section is reduced, which may lead to loss-producing harmonics or lower-than-design voltage on the output waveform when full power, full speed motor operation is called for.

Due to the fixed DC-link voltage, the output switches are typically operated with Pulse Width Modulation (PWM) to synthesize a quasi-sinusoidal current waveform into the motor, using the inductance of the motor to translate the high voltage switched waveform from the drive into a more sinusoidal shape for the current. While this does eliminate lower order harmonics, the resulting high frequency harmonics cause additional losses in the motor due to eddy current losses, additional IR (ohmic) heating, and dielectric, losses. These losses significantly increase the nominal losses of the motor, which reduces energy efficiency, resulting in higher motor temperatures, which reduces the useful life of the motor, and/or reduces the power available from the motor. Additionally, due to transmission line effects, the motor may be subject to voltages double the nominal peak-to-peak line voltage, which reduces the life of the motor by degrading its insulation. The applied motor voltages are also not balanced relative to ground, and may have sudden deviations from such balance, which can result in current flow through the motor bearings for grounded motor frames, causing bearing damage and reduced motor life. The sudden voltage swings at the motor input also cause Objectionable sound emissions from the motor.

The output switches used in this motor drive must be constructed for very fast operation and very high dV/dt in order to minimize losses during PWM switching. This requirement leads to selection of switches with drastically reduced carrier lifetimes and limited internal gain. This in turn decreases the conductance of each device, such that more silicon area is required for a given amount of current. Additionally, the switches must be constructed to provide current limiting in the event of output line faults, which imposes additional design compromises on the switches which further increase their cost and losses.

Another problem with the standard drive is that the DC link voltage must always be less than the average of the highest line-to-line input voltages, such that during periods of reduced input voltage (such as when other motors are started across-the-line), the DC link voltage is insufficient to drive the motor.

Yet another difficulty with the standard drive is its susceptibility to input voltage transients. Each of the input switches must be able to withstand the full, instantaneous, line-to-line input voltage, or at least the voltage after any input filters. Severe input transients, as may be caused by lightning strikes, may produce line-to-line voltages that exceed 2.3 times the normal peak line-to-line voltages, even with suitable input protection devices such as Metal Oxide Varistors. This requires that the switches be rated for accordingly high voltages (e.g. 1600 volts for a 460 VAC drive), which increases cost per ampere of drive.

The standard drive also cannot return power from the DC link to the input (regeneration), and therefore large braking resistors are required for an application in which the motor must be quickly stopped with a large inertial or gravitational load.

Modifications to the basic motor drive described above are available, as also shown in FIG. 3, but invariably result in much higher costs, size, weight and losses. For example, in order to reduce input current harmonics (distortion) and to allow for regeneration, the diode bridge may be replaced by an active switch bridge identical to the output switch bridge, which is accompanied by an input filter consisting of inductors and capacitors, all of which result in higher costs and drive losses. Also, as shown in FIG. 3, output filters ("sine filter") are available to change the output voltage waveform to a sinusoid, but again at the expense of greater cost, size, weight, and losses.

AC-AC line conditioners are constructed in a similar fashion to the standard drive with input and output filters and an active front end, and also suffer from the above mentioned problems.

Other motor AC-AC converters are known, such as the Matrix Converter, Current Source Converter, or various resonant AC and DC link converters, but these either require fast switching devices and substantial input and/or output filters, or large, lossy, and expensive reactive components, or, as in the case of the Matrix Converter, are incapable of providing an output voltage equal to the input voltage.

The term "converter" is sometimes used to refer specifically to DC-to-DC converters, as distinct from DC-AC "inverters" and AC-AC "cycloconverters." However, in the present application the word converter is used more generally, to refer to all of these types and more.

What is needed then is a converter technique which draws power from the utility lines with low harmonics and unit power factor, is capable of operating with full output voltage even with reduced input voltage, allows operations of its switches with low stress during turn-off and turn-on, is inherently immune to line faults, produces voltage and current output waveforms with low harmonics and no common mode offsets while accommodating all power factors over the full output frequency range, operates with high efficiency, and which does so at a reasonable cost in a compact, light-weight package.

DC-DC, DC-AC, and AC-AC Buck-Boost converters are shown in the patent and academic literature which have at least some of the aforementioned desirable attributes. The classic Buck-Boost converter operates the inductor with continuous current, and the inductor may have an input and output winding to form a transformer for isolation and/or voltage/current translation, in which case it is referred to as a Flyback Converter. There are many examples of this basic converter, all of which are necessarily hard switched and therefore do not have the soft-switched attribute, which leads to reduced converter efficiency and higher costs. An example of a hard switched 3 phase to 3 phase Buck-Boost converter is shown in FIG. 4, from K. Ngo, "Topology and Analysis in PWM Inversion, Rectification, and Cycloconversion," Dissertation, California Institute of Technology (1984).

One proposed DC-AC Buck-Boost converter (in U.S. Pat. No. 5,903,448) incorporates a bi-directional conduction/blocking switch in its output section to accommodate four quadrant operation, with AC output and bi-directional power transfer. The input, however, cannot be AC, and it uses hard switching.

Universal Power Converter

The present application discloses new approaches to power conversion. A link reactance is connected to switching bridges on both input and output sides, and driven into a full AC waveform.

In some preferred embodiments (but not necessarily in the link reactance is driven with a nonsinusoidal waveform, unlike resonant converters.

In some preferred embodiments (but not necessarily in all), capacitive reactances are used on both input and output sides.

In some preferred embodiments (but not necessarily in all), the switching bridges are constructed with bidirectional semiconductor devices, and operated in a soft-switched mode.

In some preferred embodiments (but not necessarily in all), the input switching bridge is operated to provide two drive phases, from different legs of a polyphase input, during each cycle of the link reactance. The output bridge is preferably operated analogously, to provide two output connection phases during each cycle of the reactance.

In some preferred embodiments (but not necessarily in all), the link reactance uses an inductor which is paralleled with a discrete capacitor, or which itself has a high parasitic capacitance.

The disclosed innovations, in various embodiments, provide one or more of at least the following advantages:
- a high-bandwidth active control ability—more so than resonant or voltage-source or current-source converters
- Design versatility
- Power efficiency
- Optimal use of device voltage ratings
- High power density converters
- High power quality (low input and output harmonics with minimal filtering)
- Voltage buck and boost capability
- Bi-directional, or multi-directional power transfer capability
- High frequency power transformer capability, allowing for compact active transformer and full galvanic isolation if desired.
- Input-Output isolation even without a transformer, allowing for output with no common-mode voltage
- Moderate parts count resulting from absence of auxiliary power circuits for snubbing
- High-bandwidth active control ability—more so than resonant or voltage-source or current-source converters

BRIEF DESCRIPTION OF THE DRAWINGS

The disclosed inventions will be described with reference to the accompanying drawings, which show important sample embodiments of the invention and which are incorporated in the specification hereof by reference. These drawings illustrate by way of example and not limitation.

FIG. 1 shows a sample embodiment as a Full-Bridge Buck-Boost Converter in a Three Phase AC Full Cycle Topology with Bi-directional Conducting and Blocking Switches (BCBS). Each BCBS is shown as appears in FIG. 2 of U.S. Pat. No. 5,977,569, also shown as switch 201 of FIG. 2. Input filter capacitors 130 are placed between the input phases and output filter capacitors 131 similarly attached between the output phases in order to closely approximate voltage sources and to smooth the current pulses produced by the switches and the inductor 120. Output filter capacitors are preferably attached in a grounded Y configuration as shown. An input line reactor 132 may be needed in some applications to isolate the voltage ripple on the input capacitors 130 from the utility 122.

FIGS. 2a-2d show four alternative versions of the basic Bi-directional Conducting and Blocking Switch (BCBS). FIG. 2a is an anti-parallel pair of commercially available Reverse-Blocking IGBTs (IXRH 40N120, 1200 Volt, 55 A). FIG. 2b is the switch cited in U.S. Pat. No. 5,977,569. FIG. 2c is an anti-parallel pair of commercially available IGBTs in series with diodes. FIG. 2d is an anti-parallel pair of commercially available GTOs. Many other BCBS switch configurations are possible. Each BCBS can block voltage and conduct current in either direction.

FIG. 3 shows Prior Art for the "Standard Drive", which is the most common low voltage motor drive type available, and is a voltage source pulse width modulated (PWM) topology. Also shown are various options to allow this drive to achieve more acceptable operation.

FIG. 4 shows a conventional hard-switched three phase to three phase AC buck-boost converter.

FIG. 5 shows a conventional soft-switched "partial resonant" three phase to three phase AC buck-boost converter, which has uni-directional switches, suffers from 1) a long quiescent resonant "swing back" time when no power is transferred, 2) greatly reduced frequency of operation as the voltage ratio between input and output is increased, and 3) inability to sink or source output current as the output voltage approaches zero.

FIG. 6 shows the inductor current and voltage waveforms for the converter, including the "swing back" of inductor voltage in time period M4.

FIG. 7 shows a prior art resonant link inverter that bears a superficial resemblance to this invention, but which in fact is completely different, as the voltage is sinusoidal and double the nominal input voltage, and the switches serve only to connect positive or negative link half-cycles to the input and output.

FIG. 8 show Prior Art of U.S. Pat. No. 7,057,905 which has some similarities to this invention in that it is a buck-boost converter which uses bi-directional switches. It is, however, basically a conventional, hard-switched, buck-boost converter which uses bi-directional switches to allow it operate with a DC component in the inductor in either direction.

FIG. 9 shows the input line voltages for the current switching example of FIGS. 11, 12 and 13, with the phase designations corresponding to those of FIG. 1.

FIG. 10 shows the output line voltages for the current switching example of FIGS. 11, 12 and 13, with the phase designations corresponding to those of FIG. 1.

FIG. 11 summarizes the line and inductor current waveforms for a few inductor cycles at and around the inductor cycle of FIGS. 12 and 13.

FIGS. 12a-12j show voltage and current waveforms on the inductor during a typical cycle while transferring power at full load from input to output, as occurs in FIG. 5 while operating the motor at full power, including full output voltage. FIGS. 12b and 12g are used to summarize inductor/capacitor voltage ramping current flow between modes, with 12b showing it for positive inductor current, and 12g for negative inductor current. When minimum voltage phase pairs are mentioned, that refers to phase pairs with opposing current, not necessarily the minimum voltage phase pair, as that is often a phase pair with current going in the same direction.

FIG. 13 shows voltage and current waveforms corresponding to the full power condition of FIG. 12, with the conduction mode numbers corresponding to the mode numbers of FIG. 12.

FIG. 14 is similar to FIG. 13, but shows inductor voltage and current for an output voltage of about half the full output voltage.

FIG. 15 shows an embodiment of the invention with the Full Bridge Three Phase Cycle Topology, with Controls and I/O Filtering, including a three phase input line reactor as needed to isolate the small but high frequency voltage ripple on the input filter capacitors from the utility.

FIG. 16 illustrates current and timing relationships for a DC or single phase AC converter with output voltage equal to the input voltage.

FIG. 17 shows the same current and timing relationships as FIG. 16, but with the output voltage ½ of the input voltage.

FIG. 18 is a spreadsheet, with equations as shown, that calculates the average output current for a given set of conditions, as the current discharge time is varied. These equations may be used in a control system to control switch timing to give a commanded output current.

FIG. 19 shows the results of the spreadsheet of FIG. 18 for the stated conditions with four output voltages as a function of output discharge time. Also noted on the curves are the inductor operating frequency.

FIG. 20 is a version of FIGS. 16 and 17 which shows inductor current and timing for a regeneration condition where the output voltage is ½ of the input.

FIG. 21 shows an embodiment of the invention with the DC or Single Phase portals. If one of the portals is DC, and is always a higher voltage than the other portal, one-way blocking switches may be used on that portal.

FIG. 22 shows an embodiment of the invention with a Transformer/Inductor, as is common with other Buck-Boost converters in the Flyback configuration. Any of the embodiments of this invention may use a transformer/inductor in place of the inductor if full isolation and/or voltage and current transforming is desired. Even without the transformer, just using the inductor, a degree of isolation is provided since the input and output lines are never directly connected together. If a transformer/inductor is used, the transformer must have at least some air gap, in order to produce a magnetizing inductance that does not saturate at the peak current that is used.

FIG. 23 shows an embodiment of the invention in a four portal application mixing single phase AC and multiple DC portals, as may be used to advantage in a Solar Power application. Other topologies must use at least two separate converters to handle this many portals. The switches attached to the solar power source need only be one way switches, since power the source is DC and power can only be transferred out of the device. The switches could even be non-reverse blocking if the DC output only source was always guaranteed to be higher voltage than all other voltage sources.

FIG. 24 shows an embodiment of the invention in a three portal application mixing three phase AC portals and a DC portal, as may be used to advantage in a Hybrid Electric Vehicle application.

FIG. 25 shows an embodiment as a Half-Bridge Buck-Boost Converter in a Single Phase AC or DC Topology with BCBS. The half bridge topology requires half as many switches, but also results in half the power transfer for equivalent switch ratings, and higher per unit ripple current in the input and output filters FIG. 26 show a sample embodiment in a Half-Bridge Buck-Boost Converter in a Three Phase AC Topology with BCBS. Again, the half bridge topology requires half as many switches, but also results in half the power transfer for equivalent switch ratings, and higher per unit ripple current in the input and output filters FIG. 27 shows a sample embodiment in a single phase to three phase synchronous motor drive.

FIG. 28 shows a sample embodiment with dual, parallel, "power modules", each of which consists of 12 bi-directional switches and a parallel inductor/capacitor. More than two power modules may of course be used for additional options in multiway conversion.

FIG. 29 shows an embodiment of this invention as a three phase Power Line Conditioner, in which role it may act as an Active Filter and/or supply or absorb reactive power to control the power factor on the utility lines.

DETAILED DESCRIPTION OF THE PREFERRED EMBODIMENTS

The numerous innovative teachings of the present application will be described with particular reference to presently preferred embodiments (by way of example, and not of limitation).

Contrast with Other Approaches

DC-DC Buck-Boost converters employing resonant techniques to achieve soft switching are also shown in the patent literature (examples are U.S. Pat. No. 4,616,300, issued Oct. 7, 1986; U.S. Pat. No. 6,404,654, issued Jun. 11, 2002). These are not capable of DC-AC or AC-AC operation, and are also limited in their DC-DC range, in that the output DC voltage must be larger than some minimum in order to achieve zero voltage turn-on of the power switch. In contrast to this prior art, the inventions described below have no restrictions on the relative voltages between the input and output portals, and power transfer is bi-directional.

A "partial-resonant" 3 phase AC-AC Buck-Boost converter is described in Kim et al., "New Bilateral Zero Voltage Switching AC/AC Converter Using High Frequency Partial-resonant Link", Korea Advanced Institute of Science and Technology, (IEEE 1990), and shown in FIG. 5, which uses uni-directional switches. This converter has many desirable attributes, including soft-switching, but has important differences from the inventive circuits and methods described below:
1) has significantly reduced utilization of the inductor/capacitor,
2) has higher per unit RMS current loading on the input/output capacitors,
3) has a lower operating frequency for a given turn-off condition which leads to larger, costlier, and less efficient I/O filtering,
4) cannot deliver or receive current to/from the output for sufficiently low output voltages and/or power factors,
5) and has no lower limit on the operating frequency as output power factor and/or output voltage approaches zero.

The lowered operating frequency can lead to destructive resonances with the required input filters. Input filters were not shown in this reference, but are normally required. As shown in FIG. 6 (also from the Kim et al. paper), time period M4, reduced inductor/capacitor utilization results from the resonant "swing back" time as the voltage on the inductor/capacitor resonantly swings from the output voltage back to the input voltage, and at full power typically requires 33% of the total power cycle, such that no power transfer occurs for 33% of the time. Thus, that converter achieves only one power transfer cycle for each cycle of the inductor, whereas the converter of FIG. 1 preferably has two power transfers per inductor cycle, as enabled by the use of bi-directional switches.

FIG. 7 shows another prior art converter, from Rajashekara et al., "Power Electronics", Chapter 30 in *The Electrical Engineering Handbook* (ed. R. Dorf 2000). That converter bears a superficial resemblance to the converter of FIG. 1, in that it has 12 bi-directional switches and a parallel inductor/capacitor; but the topology is different, and the mode of operation is totally different. The converter of FIG. 7 does not have I/O filter capacitors, and indeed cannot operate with such capacitors. The converter of FIG. 7 is actually a resonant link converter, such that the inductor/capacitor voltage and current is sinusoidal and resonant as shown in the figure. That converter must be isolated from voltage sources and sinks by inductance (e.g. line reactors, transformers, or motor inductance), since the voltages between its switches and said inductance rapidly swing over a range almost twice as high as the peak line-to-line voltages. (Various such high voltages are imposed on the input and output inductances by selectively enabling/disabling appropriate switch pairs for each half cycle of the inductor/capacitor, as indicated.) By contrast, the converter of FIG. 1 is not resonant, and the peak inductor voltage is just the peak line-to-line voltage. The converter of FIG. 1 could not be operated as the converter of FIG. 7, and the converter of FIG. 7 could not be operated as the invention of FIG. 1.

U.S. Pat. No. 7,057,905 shows a buck-boost power converter with bi-directional switches and a method of operating same. This is a conventional hard-switched buck-boost converter, in that it has no capacitance in parallel with the inductor and has only one power cycle per inductor cycle, except that the additional input switch capability allows it to operate with an inductor DC offset current in either direction. It may also apply both polarities to the inductor during a single power cycle to better control the operating frequency.

As compared with this invention, U.S. Pat. No. 7,057,905, operates with a DC bias current in the inductor, such that it cannot do two power cycles per inductor cycle as this invention can, and cannot therefore do soft switching. It is prohibited from doing so since, as shown in FIG. 8, it only has the two output switches 80 and 81, such that, in order to transfer current to the output in one direction, the inductor current must also be in that same direction. Thus, in order to produce current flow into the output capacitor 24, current must flow "upwards" through inductor 82. To replenish inductor energy transferred to the output, the inductor must be reconnected to the input with opposite polarity, which is a hard switched operation, necessitating the hard reverse turn-off of output switches 80 and 81 by turning on two appropriate input switches. This invention, in contrast, simply turns off the two output switches, which then causes the inductor voltage to increase to the input level, but with opposite polarity from the previous input connection, and excess inductor energy (if any) is returned back to the input, and then inductor current is reversed, after which inductor energy is again transferred to the output, but with opposite current flow, facilitated by additional bi-directional switches that connect the inductor to the output with opposite polarity, said switches not being present in U.S. Pat. No. 7,057,905. Additionally, since in this invention the inductor voltage is never forced from its "natural" direction, capacitance in parallel with the inductor is allowed to facilitate soft turn-off. Said soft switching of this invention allows this invention to operate with much higher switching frequencies with consequent large reductions in the reactive component sizes and losses.

The prior art of Buck-Boost resonant converters are not capable of operating, as this invention does, in the "Full Cycle" mode (described below), in which the inductor (or transformer) is operated with full alternating current, with no DC component in any windings. This mode of operation requires bi-directional (AC) switches, and produces two power transfers for each cycle of the inductor/capacitor, resulting in superior utilization of the inductor/capacitor and I/O filters, while also allowing current transfer at low output voltages or low power factors.

The shortcomings described above are not intended to be exhaustive, but rather among the many that tend to impair the effectiveness of previously known techniques for power conversion. Other noteworthy problems may also exist; however, those mentioned here are sufficient to demonstrate that methodologies appearing in the art have not been altogether satisfactory.

Highlights and Overview

The shortcomings listed above are reduced or eliminated by the disclosed techniques. These techniques are applicable to a vast number of applications, including but not limited to all DC-DC, DC-AC, and AC-AC power conversions.

The present application discloses power converters which are generally of the Buck-Boost family, but which use capacitance, either parasitic alone or with added discrete device(s), in parallel with the Buck-Boost inductor to achieve low turn-off switching stresses (i.e. "soft switching") on the semiconductor switches, allowing relatively slow and inexpensive switches to be used. In alternative disclosed embodiments, as discussed below, operation without such added capacitance is possible, at the expense of higher forward turn-off switching losses. The converter of FIG. 5 cannot operate without the parallel capacitor, as it would then become the classic hard-switched buck-boost converter of Ngo.

In FIG. 1, and various other disclosed embodiments, even with little or no parallel capacitance is used, switch turn on always occurs as the switch transitions from reverse to forward bias, allowing for low turn-on losses. Reverse recovery of the switches is accomplished with low rates of current decrease, and with low reverse recovery voltage, leading to near zero loss reverse recovery switching.

The embodiments described below are believed to be the first application of the Buck-Boost inductor in full Alternating Current (AC) mode, which is referred to herein as the "Full Cycle" mode and which results in two power transfers per inductor cycle. Buck-Boost converters, including those of the Ngo and Kim references cited above, have a DC bias in the inductor current, and only one power transfer per inductor cycle.

The disclosed inventions can also be used for DC-AC, AC-DC, AC-AC, or DC-DC conversion, with no limitation on the relative magnitudes of the voltages involved as long as the voltage rating of the switches is not exceeded. However, if the implementation is such that one portal is always a higher voltage than the other portal, then the switches connected to said higher portal need only be able to block voltage in one direction.

Full electrical isolation and/or greater voltage and current conversion may be achieved by using an inductor/transformer instead of the simple inductor. Note that the inductor/transformer will typically not have current in both sides at the same time, so its operation is more like a split inductor (as in a flyback converter) than like a simple transformer (as in a push-pull converter. Another significant different between buck-boost and push-pull is that the push-pull Output voltage is fixed as a multiple or fraction of the input voltage, as given by the turns ratio, while the buck-boost has no such limitation. A push-pull is quite unlike a buck-boost or flyback converter, in that the transformer is not operated as an energy-transfer inductor. In a buck-boost or flyback, input current pumps energy into a magnetic field, which is then drained to drive output current; thus the input and output currents flow at different times.

Inductor/transformer leakage inductance is typically a significant concern of buck-boost designs. This is typically dealt with by minimizing the leakage, and sometimes by adding circuit elements to deal with it. By contrast, the inventions described below can tolerate large parasitic capacitance, and thus inductors or transformers with very close windings can be specified, to minimize the leakage inductance. The standard hard switched buck-boost cannot tolerate parasitic capacitance, which makes it very difficult to minimize the leakage inductance for those configurations.

The innovative converter circuits, in various embodiments are constructed of semiconductor switches, an inductor, advantageously a capacitor in parallel with the inductor, and input and output filter capacitances. A control means, controlling the input switches, first connects the inductor, initially at zero current, to the input voltage, which may be DC or the highest line-to-line voltage AC pair in a three phase input, except at startup, in which case a near zero-voltage line pair is used. The control then turns off those switches when the current reaches a point, determined by the control to result in the desired rate of power transfer. The current then circulates between the inductor and capacitor, which results in a relatively low rate of voltage increase, such that the switches are substantially off before the voltage across them has risen significantly, resulting in low turn-off losses.

With DC or single phase AC input, no further current is drawn from the input. With 3 phase AC input, the control will again connect the inductor to the input lines, but this time to the line-to-line pair which has a lower voltage then the first pair. Turn on is accomplished as the relevant switches transition from reverse to forward bias. After drawing the appropriate amount of charge (which may be zero if the control determines that no current is to be drawn from the pair, as for example that the pair is at zero volts and input unity power factor is desired), the relevant switches are again turned off. Under most conditions, the voltage on the inductor will then reverse (with relatively low rates of voltage change due to the parallel capacitance). With 3 phase AC output, the control will turn on switches to allow current to flow from the inductor to the lowest voltage pair of lines which need current, after the relevant switches become forward biased, with the control turning off the switches after the appropriate amount of charge has been transferred. The inductor voltage then ramps up to the highest output line-to-line pair for 3 phase AC, or to the output voltage for single phase AC or DC. Again, switches are turned on to transfer energy (charge) to the output, transitioning from reverse to forward bias as the voltage ramps up. If the output voltage is larger then the highest input voltage, the current is allowed to drop to zero, which turns off the switch with a low rate of current reduction, which allows for the use of relatively slow reverse recovery characteristics. If the output voltage is less then the highest input voltage, the switches are turned off before current stops, so that the inductor voltage ramps up to the input voltage, such that zero-voltage turn on is maintained. Alternatively, the switches may be turned off before the point cited in the previous sentence, so as to limit the amount of current into the output. In this case, the excess energy due to current in the inductor is directed back into the input by turning on switches to direct current flow from the inductor into either the highest voltage pair in three phase, or the single phase AC or DC input.

In a three phase AC converter, the relative charge per cycle allocated to each input and output line pair is controlled to match the relative current levels on each line (phase). After the above scenario, when zero current is reached the inductor is reconnected to the input, but with a polarity reversed from the first connection, using switches that are complimentary to the switches used in the first half of the cycle. This connection can occur immediately after zero current (or shortly after zero current if the input voltage is less than the output voltage, to allow the capacitor voltage time to ramp back down), giving full utilization of the power transfer capability of the inductor. No resonant reversal is required as in the time period M4 of the Kim converter shown in FIGS. 5 and 6.

The disclosed embodiments are inherently capable of regeneration at any condition of output voltage, power factor, or frequency so in motor drive or wind power applications, the motor may act as a generator, returning power to the utility lines.

In an AC motor drive implementation, input and output filtering may be as little as line-to-neutral connected capacitors. Since switching losses are very low due to soft switching, the Buck-Boost inductor can be operated at a high inductor frequency (typically 5 to 20 kHz for low voltage drives), allowing for a single, relatively small, and low loss, magnetic device. The current pulse frequency is twice the inductor frequency. This high frequency also allows the input and output filter capacitors to be relatively small with low, high frequency ripple voltage, which in turns allows for small, low loss line reactors.

Input voltage "sags", as are common when other motors are connected across the line, are accommodated by temporarily drawing more current from the input to maintain a constant power draw and output voltage, utilizing the boost capability of this invention, avoiding expensive shutdowns or even loss of toque to the application.

The full filter between the converter and an attached voltage source (utility) or sink (motor, another utility, or load) includes the line capacitance (line-to-line or line-to-neutral, as in Y or Delta), and a series line inductance (or hue reactor as it's generally called). When driving a motor, the line reactance is just the inductance of the motor. I show this L-C filter in my preferred embodiments, and also mentioned it in my earlier claims. So it is a power filter, AND it does important conditioning for the converter.

The preferred converter benefits from having very low impedence voltage sources and sinks at the inputs and outputs. (This is a significant difference from the converter of FIG. 7, which has line reactance (inductors) at the I/O, not capacitance.) The link inductor current must be able to be very rapidly switched between the link capacitor and the I/O capacitors, and line reactance would prevent that from incurring, and in fact would likely destroy the switches. The physical construction of the converter should preferably be carefully done to minimize all such inductance which may impair link reactance switching.

The line capacitance itself does not have to be really any particular value, but for proper operation the change in voltage on the line capacitance while charging or discharging the link inductance should only be a small fraction of the initial voltage, let's say less than 10%. There are other restraints as well. For a 20 hp, 460 VAC prototype, 80 microF of line-to-neutral capacitance results in only a 1 to 2% ripple voltage. (This large capacitance was chosen in order to get the ripple current within the capacitor's current rating.) Capacitors could be made with lower uF for the same current rating, resulting in smaller, cheaper capacitors, and higher voltage ripple, but this is all that is available right now.

Another important consider is the resonant frequency formed by the L-C of the line reactance and the line capacitance (the I/O power filter). This frequency must be lower than the link power cycle frequency in order to not have that filter resonant with the voltage ripple on the line capacitance. For my 20 hp 460 VAC prototype, the link frequency is 10 kHz, so the link power cycle frequency is 20 kHz (2 power cycles per link voltage cycle), and the resonant frequency of the L-C I/O is lower than 2 kHz, so that works well.

So, to summarize, the capacitance needs to be large enough to reasonably stabilize the I/O voltage to allow the link inductor charge/discharge to occur properly, and the L-C resonant frequency needs to be less than twice the link voltage frequency, and generally at least 4 to 10 times lower.

It should also be noted that too much capacitance on line filter can lead to excess reactive power on the utility connection.

Further Detail

Referring initially to FIG. 1, illustrated is a schematic of a three phase converter 100 that embodies the present invention. The converter 100 is connected to a first and second power portals 122 and 123 each of which may source or sink power, and each with a port for each phase of the portal. It is the function of said converter 100 to transfer electric power between said portals while accommodating a wide range of voltages, current levels, power factors, and frequencies between the portals. Said first portal may be for example, a 460 VAC three phase utility connection, while said second portal may be a three phase induction motor which is to be operated at variable frequency and voltage so as to achieve variable speed operation of said motor. This invention may also accommodate additional portals on the same inductor, as may be desired to accommodate power transfer to and from other power sources ardor sinks, as shown in FIGS. 23 and 24.

Referring to FIG. 1, the converter 100 is comprised of a first set of electronic switches $S_{1u}$, $S_{2u}$, $S_{3u}$, $S_{4u}$, $S_{5u}$, and $S_{6u}$ that are connected between a first port 113 of a link inductor 120 and each phase, 124 through 129, of the input portal, and a second set of electronic switches $S_{1l}$, $S_{2l}$, $S_{3l}$, $S_{4l}$, $S_{5l}$, and $S_{6l}$ that are similarly connected between a second port 114 of link inductor 120 and each phase of the output portal. A link capacitor 121 is connected in parallel with the link inductor, forming the link reactance. Each of these switches is capable of conducting current and blocking current in both directions, and may be composed of the bi-directional IGBT 201 of FIG. 2, as shown in U.S. Pat. No. 5,977,569. Many other such bi-directional switch combinations are possible, such as anti-parallel reverse blocking IGBTs 200 of FIG. 2.

Most of these switch combinations contain two independently controlled gates, as shown with all the switches for FIG. 2, with each gate controlling current flow in one direction. In the following description, it is assumed that two gate switches are used in each switch, and that the only gate enabled in a switch is the gate which controls current in the direction which is desired in the subsequent operation of the switch. Thus, when each switch mentioned below is said to be enabled, said enabling occurs before conduction occurs, since that portion of the switch is reversed biased at the instant of being enabled, and does not conduct until it becomes forward biased as a result of the changing voltage on the parallel pair of inductor and capacitor. Any switch embodiment which has only one gate, such as a one-way switch embedded within a full wave bridge rectifier, must be enabled only when the voltage across it is very small, which requires precise and accurate timing that may be difficult to achieve in practice.

The converter 100 also has input and output capacitor filters 130 and 131, respectively, which smooth the current pulses produced by switching current into and out of inductor 120. Optionally, a line reactor 132 may be added to the input to isolate the voltage ripple on input capacitor filter 131 from the utility and other equipment that may be attached to the utility lines. Similarly, another line reactor, not shown, may be used on the output if required by the application.

For illustration purposes, assume that power is to be transferred in a full cycle of the inductor/capacitor from the first to the second portal, as is illustrated in FIG. 13. Also assume that, at the instant the power cycle begins as shown in FIG. 9, phases $A_i$ and $B_i$ have the highest line to line voltage of the first (input) portal, link inductor 120 has no current, and link capacitor 121 is charged to the same voltage as exists between phase $A_i$ and $B_i$. The controller FPGA 1500, shown in FIG. 15, now turns on switches $S_{1u}$, and $S_{2l}$, whereupon current begins to flow from phases $A_i$ and $B_i$ into link inductor 120, shown as Mode 1 of FIG. 12a. FIG. 13 shows the inductor current and voltage during the power cycle of FIG. 12, with the Conduction Mode sequence 1300 corresponding to the Conduction Modes of FIG. 12. The voltage on the link reactance remains almost constant during each mode interval, varying only by the small amount the phase voltage changes during that interval. After an appropriate current level has been reached, as determined by controller 1500 to achieve the desired level of power transfer and current distribution among the input phases, switch $S_{2l}$ is turned off. Current now circulates, as shown in FIG. 12b, between link inductor 120 and link capacitor 121, which is included in the circuit to slow the rate of voltage change, which in turn greatly reduces the energy dissipated in each switch as it turns off. In very high frequency embodiments of this invention, the capacitor 121 may consist solely of the parasitic capacitance of the inductor and/or other circuit elements.

To continue with the cycle, as shown as Mode 2 FIG. 6c and FIG. 13, switch $S_{3l}$ is next enabled, along with the previously enabled switch $S_{1u}$. As soon as the link reactance voltage drops to just less than the voltage across phases $A_i$ and $C_i$, which are assumed for this example to be at a lower line-to-line voltage than phases $A_i$ and $B_i$, as shown in FIG. 9, witches $S_{1u}$ and $S_{3l}$ become forward biased and start to further increase the current flow into the link inductor, and the current into link capacitor temporarily stops. The two "on" switches, $S_{1u}$ and $S_{3l}$, are turned off when the desired peak link inductor current is reached, said peak link inductor current determining the maximum energy per cycle that may be transferred to the output. The link inductor and link capacitor then again exchange current, as shown if FIG. 12b, with the result that the voltage on the link reactance changes sign, as shown in graph 1301, between modes 2 and 3 of FIG. 13. Now as shown in FIG. 12d, output switches $S_{5u}$ and $S_{6l}$ are enabled, and start conducting inductor current into the motor phases $A_o$ and $B_o$, which are assumed in this example to have the lowest line-to-line voltages at the present instance on the motor, as shown in FIG. 10. After a portion of the inductor's energy has been transferred to the load, as determined by the controller, switch $S_{5u}$ is turned off, and $S_{4u}$ is enabled, causing current to flow again into the link capacitor, which increases the link inductor voltage until it becomes slightly greater than the line-to-line voltage of phases $A_o$ and $C_o$, which are assumed in this example to have the highest line-to-line voltages on the motor, as shown in FIG. 10. As shown in FIG. 12e, most of the remaining link inductor energy is then transferred to this phase pair (into the motor), bringing the link inductor current down to a low level. Switches $S_{4u}$ and $S_{6l}$ are then turned off, causing the link inductor current again to be shunted into the link capacitor, raising the link reactance voltage to the slightly higher input line-to-line voltage on phases $A_i$ and $B_i$. Any excess link inductor energy is returned to the input. The link inductor current then reverses, and the above described link reactance current/voltage half-cycle repeats, but with switches that are complimentary to the first half-cycle, as is shown in FIGS. 6f to 6j, and in Conduction Mode sequence 1300, and graphs 1301 and 1302. FIG. 12g shows the link reactance current exchange during the inductor's negative current half-cycle, between conduction modes.

FIG. 11 summarizes the line and inductor current waveforms for a few link reactance cycles at and around the cycle of FIGS. 12 and 13.

Note that TWO power cycles occur during each link reactance cycle: with reference to FIGS. 12a-12i, power is pumped IN during modes 1 and 2, extracted OUT during modes 3 and 4, IN again during modes 5 and 6, and OUT again during modes 7 and 8. The use of multi-leg drive produces eight modes rather than four, but even if polyphase input and/or output is not used, the presence of TWO successive in and out cycles during one cycle of the inductor current is notable.

As shown in FIG. 12 and FIG. 13, Conduction Mode sequence 1300, and in graphs 1301 and 1302, the link reactance continues to alternate between being connected to appropriate phase pairs and not connected at all, with current and power transfer occurring while connected, and voltage ramping between phases while disconnected (as occurs between the closely spaced dashed vertical lines of which 1303 in FIG. 13 is one example.

In general, when the controller 1500 deems it necessary, each switch is enabled, as is known in the art, by raising the voltage of the gate 204 (FIG. 2) on switch 200 above the corresponding terminal 205, as an example. Furthermore, each switch is enabled (in the preferred two gate version of the switch) while the portion of the switch that is being enabled is zero or reverse biased, such that the switch does not start conduction until the changing link reactance voltage causes the switch to become forward biased. Single gate AC switches may be used, as with a one-way switch embedded in a four diode bridge rectifier, but achieving zero-voltage turn on is difficult, and conduction losses are higher.

In FIG. 15, current through the inductor is sensed by sensor 1510, and the FPGA 1500 integrates current flows to determine the current flowing in each phase (port) of the input and output portals. Phase voltage sensing circuits 1511 and 1512 allow the FPGA 1500 to control which switches to enable next, and when.

By contrast, note that the prior art structure of FIG. 8 has four bi-directional switches on the input, and two on the output, with a link inductor (no parallel capacitor) in between. That patent is a hard switched buck-boost, and, like all prior buck-boost converters, it has only 1 power transfer per link inductor cycle. Moreover, the link inductor has a DC current component, unlike the converter of FIG. 1 (which has NO average DC current, only AC).

FIG. 14 illustrates inductor current and voltage waveforms when the converter of FIG. 1 and FIG. 12 is operating with reduced output voltage. Link inductor 120 current from the input increases during modes 1 and 2 to a maximum level as for the full output voltage case of FIG. 13, but since the output voltage is half as high as for the full output voltage case, link inductor current decreases only half as quickly while discharging to the output phases in modes 3 and 4. This will generally supply the required output current before the link inductor current has fallen to zero or even near zero, such that there is a significant amount of energy left in the link inductor at the end of mode 4 in FIG. 14. This excess energy is returned to the input in mode 5 and 1. Mode 1 in FIG. 14 begins prior to the vertical axis. It can be seen that with zero output voltage, the current during modes 3 and 4 (and 7 and 8) will not decrease at all, so that all link inductor energy is returned to the input, allowing for the delivery of output current but with no power transfer, as is required for current delivered at zero volts.

The Kim converter cannot return this excessive inductor energy back to the input, as this requires bidirectional switches. Thus the Kim converter must wait until the inductor energy drops to a sufficiently low value, with the result that the link reactance frequency drops to a very low value as the output voltage approaches zero. This in turn can cause resonances with input and/or output filters. With zero voltage output, the Kim converter cannot function at all.

Note that the modes cited in Kim et al. differ somewhat from the modes cited here. This is due to two reasons. The first is that, for brevity, the "capacitor ramping", or "partial resonant" periods in this invention are not all numbered, as there are 8 of those periods. As indicated in FIGS. 12b and 12g, voltage ramping periods preferably occur between each successive pair of conduction modes. The second reason is that Kim et al. operate their converter such that it draws current from one input phase pair per power cycle, and likewise delivers current to one phase pair per power cycle. This results in only two conduction modes per link reactance cycle, since their converter only has one power cycle per link reactance cycle. By contrast, FIG. 12 shows current being drawn and delivered to both pairs of input and output phases, resulting in 4 modes for each direction of link inductor current during a power cycle, for a total of 8 conduction modes since there are two power cycles per link reactance cycle in the preferred embodiment. This distinction is not dependent on the topology, as either three phase converter may be operated in either 2 modes or 4 conduction modes per power cycle, but the preferred method of operation is with 4 conduction modes per power cycle, as that minimizes input and output harmonics. For single phase AC or DC, it is preferred to have only two conduction modes per power cycle, or four modes per link reactance cycle, as there is only one input and output pair in that case. For mixed situations, as in the embodiment of FIG.

24 which converts between DC or single phase AC and three phase AC, there may be 1 conduction mode for the DC interface, and 2 for the three phase AC, for 3 conduction modes per power cycle, or 6 modes per link reactance cycle. In any case, however, the two conduction modes per power half-cycle for three phase operation together give a similar power transfer effect as the singe conduction mode for single phase AC or DC.

Control algorithms may use this ability of recycling inductor energy to advantage in order to control current transfers, as is required by many converter control algorithms for vector or volts/Hz control. One such possible algorithm is explained in FIGS. 16 through 20. FIGS. 16, 17, and 20 show possible current profiles for the link inductor during a power cycle of positive current. This is for the case of only two conduction modes per power cycle, as this invention uses for single phase AC or DC. The power cycle for negative inductor current is the mirror image of the cycles shown, as there are two power cycles per inductor cycle. Timing intervals T1, T2, T3, Tr1, and Tr2 are shown. T1 is the time for the first conduction mode, when current is increasing from the input. T2 is the second conduction mode, in which the inductor is connected to the output, either decreasing in current for power transfer to the output (positive power) as in FIGS. 16 and 17, or increasing in current for power transfer from the output negative power) as in FIG. 20. T3 is the actually the first part of conduction mode 1 in which excess link inductor energy is either returned to the input during, positive power or delivered from output to input during negative power. Tr1 and Tr2 are the "partial resonant", or "capacitor ramping" times during which all switches are off and the voltage on the link reactance is ramping. For three phase operation, intervals T1 and T2 are sub-divided, with T1 consisting of two conduction modes for the two input phase pairs from which current is drawn, and likewise for T2 for deliver of current to the output phases. The relative times and inductor current levels determine the charge and therefore the relative current levels among the phases. For three phase operation with zero or near-zero power factor, T2 may subdivided into negative and positive energy transfer periods. Note that similar durations are used for ramping the converter in BOTH directions. However, the ramping durations can be different between input and output phases, as load draw varies due to extrinsic circumstances. The charge time from the input can be held constant, with the discharge time to the output varied to vary average output current (see FIG. 19). Excess link inductor energy (current) is returned to the input in T3. But all charge times and transitions on the link reactance are perfectly symmetric about the zero points of voltage and current (see FIG. 13).

For the single phase AC and DC operation of FIGS. 16 through 20, the average output current is given by the equation at the bottom of FIGS. 16, 17, and 20, with the "Charge over T2" given by the integral of the link inductor current over the time interval of T2. For positive power, the peak link inductor current I1 may be held constant, while T2 is varied, to control average output current (Iavg-out). An algorithm to calculate Iavg-out is shown in FIG. 18. For a given set of circuit parameters and input and output voltages, T2 (first column in FIG. 18) may be varied to control Iavg-out ($6^{th}$ column). Resulting other time intervals and power levels are also calculated. An input voltage of 650 volts and an output voltage of 600 volts is used for FIG. 19. FIG. 19 shows the results of the algorithm for other output voltages, with the 650 volt input, as a function of T2, in micro-seconds (uS). An average (filtered) output current level of 26 amps is shown for the 650 volt output curve with a T2 of 27 uS, for a power output of 16.8 kW. Note that the link reactance frequency remains constant at 10 kHz for the 650 volt output curve, regardless of T2 and Iavg-out. For the other curves, with lower output voltage, frequency drops for lower output voltage, but never drops below 5 kHz even for zero output volts. Also note that Iavg-out for 0 volts goes to 55 amps for T2 of 50 uS, which is more than double Iavg-out at maximum power, even though maximum inductor current remains constant at 110 amps. For lower converter losses when lower output currents are commanded, the controller 1500 may be programmed to reduce T1, thereby reducing the peak inductor current.

FIG. 19 also shows some specific drive parameters for the example 460 VAC, 20 hp drive. The link inductor is 140 µH, and may be constructed as an air core copper wound inductor, with thin, flat, ribbon wire so as to have a low ratio of AC to DC resistance from the skin effect, and wound like a roll of tape. This configuration optimizes the inductance to resistance ratio of the inductor, and results in relatively high parasitic capacitance. Such a design cannot be used by hard switched converters, as this high parasitic capacitance causes high losses, but with this invention the high parasitic capacitance is a benefit. The ramp, or parallel, link capacitance is comprised of two parallel AVX (FSV26B0104K-) 0.1 µF film capacitors capable of handling the RMS current load of about 25 amps. Peak inductor current is 110 amps. Commercially available reverse-blocking IGBT switches, IXYS part 40N120 55 A, 1200 V, arranged in anti-parallel pairs as shown in FIG. 2, 1200, may be used. In a standard hard switched application, such as a current source drive, this switch has relatively high turn-on and reverse recovery losses caused by the slow reverse recovery time of the device, but when used in this invention, both turn-on and reverse recovery losses are negligible even at a per device maximum switching frequency of 10 kHz and 110 amps peak current. High RMS current capacitors from AVX (FFV34I0406K) totaling, 80 µF line-to-neutral, may be used for the input and output capacitors. The Altera Cyclone III FPGA may be used for the controller, implementing the algorithms described above to control current flow, and using either vector or Volts/Hz to control a 20 hp motor. Isolated power supplies, gate drivers, and digital isolators allow the FPGA to control the on-off states of the IGBTs. Voltage and current sensing circuits, with analog-digital interfaces to the FPGA, allow for precise switch timing to control current flow.

As may be surmised by those skilled in the art, the current resulting from the above described operation of the converter is, in many applications, controlled by controller 1500 to result in a sinusoidal varying current from the input, normally in phase with the input voltage so as to produce a unity power factor on the input, and sinusoidally varying voltage and current on the motor, so as to operate the motor at the highest possible efficiency and/or performance.

In those cases where the motor is acting as a generator, as may occur when the frequency applied to the motor via the converter is rapidly decreased, the above described operating cycle is reversed, with current being drawn from the motor phases and injected into the input phases.

In general, the input and output frequencies are substantially less than the frequency at which the link reactance is operated. For 60 Hz input, a typical operating frequency of the link reactance may be 10 kHz for low voltage (230 to 690 VAC) drives and converters, and 1.5 kHz for medium voltage (2300 on up) drives and converters, with current pulse frequencies twice those frequencies, or higher if multiple, synchronized power in are used, as shown in FIG. 28. Input and Output frequencies may vary from zero (DC) to over well over 60 Hz, and may even be up to 20 kHz in audio amplifier applications.

The motor drive of FIG. 1 has the following characteristics—

Low harmonic, unity power factor current draw from the utility, regardless of output voltage. Current is drawn from each phase in high frequency pulses, similar to a current source converter, with input capacitors and optionally, line inductors, converting the pulsed current flow to sinusoidal current flow.

Ability to step up or step down voltage from input to output, allows full output voltage even in the presence of input voltage sags, as commonly occurs in industrial power systems.

Sinusoidal output voltage with small voltage ripple allows standard induction motors, as well as low reactance synchronous motors, to be used. Output capacitors filter the pulsed current. Ripple frequency is always high so as to avoid any resonance problems with input and/or output filters or reactances.

Ability to supply 200% or higher of nominal output current at low output voltages, indefinitely, as ma be advantageous for starting large inertial loads. With near zero output voltages, the converter is operated at about half of maximum frequency, with the inductor first fully charged by the input, then discharging at that full level into the output for twice the full voltage discharge period, then discharging to zero current back into the input, repealing that cycle but with reverse current. Peak currents remain the same, but output current is doubled.

Input-Output isolation, resulting in zero common mode voltages on the output. Since there is never a moment when the input and output lines are connected together, as happens continuously in voltage and current source drives, as well as matrix converters, the average output voltage remains at ground potential. This eliminates the need for isolation transformers.

Slow reverse recovery devices are usable. Rate of change of current during commutation is relatively slow, and applied reverse voltage after reverse recovery is also low, so the switches used may have rectifier diode like recovery characteristics. Reverse blocking IGBTs and GTOs are inherently slow to reverse recover, and so this invention is well suited for these devices.

Slower forward turn-off devices are usable. Turn-off dv/dt is relatively low due to the capacitance in parallel with the inductor.

Compact, lightweight, and efficient. Voltage source drives with input/output quality similar to this invention require multiple heavy and bulky power inductors, one on each of the input and output lines. Current source drives require a very large and heavy DC inductor in order to generate full output voltage. This invention only needs a single small, compact AC inductor and the relatively small and lightweight input and output filter capacitors and input line reactor. Total weight for a suitably filtered, commercially available voltage source drive for 40 hp is over 300 pounds, while the drive of this invention will weigh less than 30 lbs for 40 hp. Lack of large input/output filter inductors significantly improves the efficiency of this invention over conventional drives. No transformers are needed since input current harmonics are low and there is no common node output voltage.

Moderate parts count. Using bi-directional switches, only 12 power switches are needed for this invention. Using commercially available unidirectional switches with reverse blocking (reverse blocking IGBT or GTO) requires 24 switches. A 12 pulse input voltage source drive requires 24 switches (18 diodes and 6 active switches).

High bandwidth. Since the current amplitude is determined twice each cycle of the inductor, the current control bandwidth of this invention is inherently very high, making the invention suitable for high bandwidth servo applications and even high power audio amplifiers.

Another embodiment of this invention is shown in FIG. 21, which shows a single phase AC or DC to single phase AC or DC converter. Either or both input and output may be AC or DC, with no restrictions on the relative voltages. If a portal is DC and may only have power flow either into or out of said, portal, the switches applied to said portal ma be uni-directional. An example of this is shown with the photovoltaic array of FIG. 23, which can only source power.

FIG. 22 shows an embodiment of the invention as a Flyback Converter. The circuit of FIG. 21 has been modified, in that the link inductor is replaced with a transformer 2200 that has a magnetizing inductance that functions as the link inductor. Any embodiment of this invention may use such a transformer, which may be useful to provide full electrical isolation between portals, and/or to provide voltage and current translation between portals, as is advantageous, for example, when a first portal is a low voltage DC battery bank, and a second portal is 120 volts AC, or when the converter is used as an active transformer.

In the embodiments of this invention shown in FIGS. 23 and 24, the number of portals attached to the link reactance is more than two, simply by using more switches to connect in additional portals to the inductor. As applied in the solar power system of FIG. 23, this allows a single converter to direct power flow as needed between the portals, regardless of their polarity or magnitude. Thus, the solar photovoltaic array may be at full power, 400 volts output, and delivering 50% of its power to the battery bank at 320 volts, and the 50% to the house AC at 230 VAC. Prior art requires at least two converters to handle this situation, such as a DC-DC converter to transfer power from the solar PV array to the batteries, and a separate DC-AC converter (inverter) to transfer power from the battery bank to the house, with consequential higher cost and electrical losses. The switches shown attached to the photovoltaic power source need be only one-way since the source is DC and power can only flow out of the source, not in and out as with the battery.

In the power converter of FIG. 24, as could be used for a hybrid electric vehicle, a first portal is the vehicle's battery bank, a second portal is a variable voltage, variable speed generator run by the vehicle's engine, and a third portal is a motor for driving the wheels of the vehicle. A fourth portal, not shown, could be external single phase 230 VAC to charge the battery. Using this single converter, power may be exchanged in any direction among the various portals. For example, the motor/generator may be at full output power, with 50% of its power going to the battery, and 50% going to the wheel motor. Then the driver may depress the accelerator, at which time all of the generator power may be instantly applied to the wheel motor. Conversely, if the vehicle is braking, the full wheel motor power may be injected into the battery bank, with all of these modes using a single converter.

FIGS. 25 and 26 show half-bridge converter embodiments of this invention for single phase/DC and three phase AC applications, respectively. The half-bridge embodiment requires only 50% as many switches, but results in 50% of the power transfer capability, and gives a ripple current in the input and output filters which is about double that of the full bridge implementation for a given power level.

FIG. 27 shows a sample embodiment as a single phase to three phase synchronous motor drive, as may be used for driving a household air-conditioner compressor at variable speed, with unity power factor and low harmonics input. Delivered power is pulsating at twice the input power frequency.

FIG. 28 shows a sample embodiment with dual, parallel power modules, with each module constructed as per the converter of FIG. 1, excluding the I/O filtering. (Input modules 2800 and 2820 represent switch banks $S_{1u}$, $S_{2u}$, $S_{3u}$, $S_{1l}$, $S_{2l}$ and $S_{3l}$ per FIG. 1. Output modules 2810 and 2830 represent output modules $S_{4u}$, $S_{5u}$, $S_{6u}$, $S_{4l}$, $S_{5l}$ and $S_{6l}$ per FIG. 1.) This arrangement may be advantageously used whenever the converter drive requirements exceed that obtainable from a singe power module and/or when redundancy is desired for reliability reasons and/or to reduce I/O filter size, so as to reduce costs, losses, and to increase available bandwidth. The power modules are best operated in a manner similar to multiphase DC power supplies such that the link reactance frequencies are identical and the current pulses drawn and supplied to the input/output filters from each module are uniformly spaced in time. This provides for a more uniform current draw and supply, which may greatly reduce the per unit filtering requirement for the converter. For example, going from one to two power modules, operated with a phase difference of 90 degrees referenced to each of the modules inductor/capacitor, produces a similar RMS current in the I/O filter capacitors, while doubling the ripple frequency on those capacitors. This allows the same I/O filter capacitors to be used, but for twice the total power, so the per unit I/O filter capacitance is reduced by a factor 2. More importantly, since the ripple voltage is reduced by a factor of 2, and the frequency doubled, the input line reactance requirement is reduced by 4, allowing the total line reactor mass to drop by 2, thereby reducing per unit line reactance requirement by a factor of 4.

FIG. 29 shows an embodiment as a three phase Power Line Conditioner, in which role it may act as an Active Filter and/or supply or absorb reactive power to control the power factor on the utility lines. If a battery, with series inductor to smooth current flow, is placed in parallel with the output capacitor 2901, the converter may then operate as an Uninterruptible Power Supply (UPS).

According to various disclosed embodiments, there is provided: A Buck-Boost Converter, comprising: an energy-transfer reactance; a first bridge switch array comprising at least two bidirectional switching devices which are jointly connected to operatively connect at least one terminal of said reactance to a power input, with reversible polarity of connection; a second bridge switch array comprising at least two bidirectional switching devices which are jointly connected to operatively connect at least one terminal of said reactance to a power output, with reversible polarity of connection; wherein said first switch array drives said reactance with a nonsinusoidal voltage waveform.

According to various disclosed embodiments, there is provided: A Buck-Boost Converter, comprising: an energy-transfer reactance; first and second power portals, each with two or more ports by which electrical power is input from or output to said portals; first and second half-bridge switch arrays interposed between said reactance and a respective one of said portals, and each comprising one bidirectional switching device for each said port of each said power portal; wherein said switch arrays are each operatively connected to respective ones of said portals.

According to various disclosed embodiments, there is provided: A Full-Bridge Buck-Boost Converter, comprising: first and second full bridge switch arrays, each comprising at least four bidirectional switching devices; a substantially parallel inductor-capacitor combination symmetrically connected to be driven separately by either said switch array; one of said switch arrays being operatively connected to a power input, and the other thereof being operatively connected to supply a power output.

According to various disclosed embodiments, there is provided: A Buck-Boost Converter, comprising: first and second switch arrays, each comprising at least two bidirectional switching devices; a substantially parallel inductor-capacitor combination connected to each said switch array; wherein a first one of said switch arrays is operatively connected to a power input, and is operated to drive power into said inductor-capacitor combination with a non-sinusoidal waveform; and wherein a second one of said switch arrays is operated to extract power from said inductor-capacitor combination to an output.

According to various disclosed embodiments, there is provided: A Buck-Boost Converter, comprising: first and second switch arrays, each comprising at least two bidirectional switching devices; an energy-transfer reactance connected to each said switch array; wherein a first one of said switch arrays is connected through respective capacitive reactances to a polyphase power input, and operated to drive power into said reactance from multiple different legs of said power input in succession with a non-sinusoidal waveform; and wherein a second one of said switch arrays is operated to extract power from said reactance to an output.

According to various disclosed embodiments, there is provided: A power converter, comprising: an energy-transfer reactance comprising at least one inductor; an input switch array configured to drive AC current through said reactance; and an output network connected to extract energy from said reactance; wherein said input switch array performs at least two drive operations, in the same direction but from different sources, during a single half-cycle of said reactance.

According to various disclosed embodiments, there is provided: A power converter, comprising: an energy-transfer reactance comprising at least one inductor, and operating at a primary AC magnetic field frequency which is less than half of the reactance's resonant frequency; an input switch array configured to drive AC current through said reactance; and an output network switch array connected to extract energy from said reactance; wherein said input switch array performs at least two drive operations, in the same direction but from different sources, during a single half-cycle of said reactance.

According to various disclosed embodiments, there is provided: A power converter, comprising: an energy-transfer reactance comprising at least one inductor, and operating at a primary AC magnetic field frequency which is less than half of the reactance's resonant frequency; an input switch array configured to drive current through said reactance; and an output switch array to extract energy from said reactance; wherein said input switch array performs at least two different drive operations at different times during a single cycle of said reactance, and wherein said output switch array performs at least two different drive operations at different times during a single cycle of said reactance.

According to various disclosed embodiments, there is provided: A Buck-Boost Converter, comprising: an energy-transfer reactance comprising at least one inductor; an input switch array configured to drive AC current, with no average DC current, through said reactance; and an output network connected to extract energy from said reactance.

According to various disclosed embodiments, there is provided: A Buck-Boost Converter, comprising: an energy-transfer reactance comprising at least one inductor; a plurality of input switch arrays, each said array configured to drive AC current, with no average DC current, through said reactance; and a plurality of output switch arrays, each connected to extract energy from said reactance; said arrays having no more than two switches driving or extracting energy from said reactance at any given time; wherein said input switch arrays individually drive said reactance with a nonsinusoidal voltage waveform.

According to various disclosed embodiments, there is provided: A power conversion circuit, comprising an input stage which repeatedly, at various times, drives current into the parallel combination of an inductor and a capacitor, and immediately thereafter temporarily disconnects said parallel combination from external connections, to thereby transfer some energy from said inductor to said capacitor; wherein said action of driving current is performed in opposite senses and various times, and wherein said disconnecting operation is performed substantially identically for both directions of said step of driving current; and an output stage which extracts energy from said parallel combination, to thereby perform power conversion.

According to various disclosed embodiments, there is provided: A power conversion circuit, comprising: an input stage which repeatedly drives current into the parallel combination of an inductor and a capacitor, and immediately thereafter temporarily disconnects said parallel combination from external connections, to thereby transfer some energy from said inductor to said capacitor; wherein said input stage drives current in different senses at different times; and an output stage which repeatedly couples power out of said parallel combination, and immediately thereafter temporarily disconnects said parallel combination from external connections, to thereby transfer some energy from said inductor to said capacitor; wherein said output stage couples power out of said combination during two opposite directions of current therein; wherein said input and output stages both disconnect said parallel combination substantially identically for both directions of current in said combination.

According to various disclosed embodiments, there is provided: A Soft Switched Universal Full-Bridge Buck-Boost Converter, comprising: an inductor with a first and second port; a capacitor attached in parallel with said inductor; connections to a plurality of voltage sources or sinks (portals) of electric power each with a plurality of ports; a first set of electronic bi-directional switches that comprise said connections between said first port of the inductor and each said port of each said portal, with one said switch between the first port of the inductor and each port of each portal; a second set of electronic bi-directional switches that comprise said connections between said second port of the inductor and each port of each portal, with one switch between the second port of the inductor and each port of each portal; capacitive filtering means connected between each said port within each said portal; control means to coordinate said switches to connect said inductor to port pairs on each portal, with no more than two switches enabled at any given time; said control means further coordinating said switches to first store electrical energy in the inductor by enabling two switches on a given input portal to connect the inductor to said input portal, then disabling the switches after the proper amount of energy has been stored in the inductor; and said control means may enable further pairs of switches on the same or other input portals so as to further energize the inductor, and disable said switches after the appropriate inductor energizing is complete; said control means further enables another pair of switches on another, output, portal to transfer some or all, of the inductor energy into said output portal, and then disables said switches after the desired amount of charge has been transferred to said portal; said control means may enable further pairs of switches on the same or other output portals so as to further send charge into said output portals, and disable said switches after the desired amount of charge has been transferred to said portal; and if the inductor has excess energy after discharging into the last output portal, said control means then enables an appropriate switch pair to direct said excess energy back into the input portal; wherein said control means may modify the above sequence so as to achieve any required energy transfer among the ports and portals; said inductor magnetically storing electrical energy in the form of electric current, using said switches; energy transfer from one or more input portals to said inductor occurring, via current flow through two or more said ports of one or more said portals, with only one pair of ports; and cyclically repeating said energy and charge transfers.

According to various disclosed embodiments, there is provided: A Soft-switched Half-Bridge Buck-Boost Converter, comprising: first and second power portals, each with two or more ports by which electrical power is input from or output to said portals, first and second half-bridge switch arrays, each comprising one bidirectional switching device for each said port of each said power portal, an energy-transfer link reactance with one port connected to both said switch arrays, and with the other port connected to an actual or virtual ground, such that said actual or virtual ground maintains at a relatively constant voltage, each of said switch arrays being connected to a power portal with said portal possessing capacitive reactance between the legs of said portals configured so as to approximate a voltage source, with power transfer occurring between said portals via said energy-transfer reactance, said link energy-transfer reactance consisting of an link inductor and capacitance in parallel, said power transfer being accomplished in a first power cycle as one or more pairs of input portal legs are singularly or sequentially connected to said energy-transfer reactance to store energy via increased current flow and inductance into said link inductor, followed by one or more pairs of output portal legs singularly or sequentially connected to said energy-transfer reactance to remove energy via decreased current flow and inductance from said link inductor, with any excess energy in said link inductor subsequently returned back to one or more said input portal leg pairs, followed by a reversal of current within said link inductor and a repeat of the heretofore described energy transfer, to constitute a second power cycle, from input to output portal leg pairs, but with opposite but equal current flow in said link inductor and utilizing switches of said switch arrays which are complimentary to said switches used for said first cycle of said power transfer; said first and second power cycles comprising a single voltage cycle of the energy-transfer link reactance; said capacitance, in conjunction with said current reversal, producing soft-switching of said switches with low-voltage turn-off, zero voltage turn-on, and low reverse recovery losses; said bidirectional switching devices being capable of blocking voltage in either direction and conducting current in either direction; wherein said power transfer cycles are continuously repeated by said control means to produce said power transfer on a continuing basis; and wherein control means coordinate said switching actions to produce current and power transfer via said power cycles as required to produce desired output voltage and current, as may be used to drive single or polyphase motors at variable speed and voltage, or to drive any other electrical DC, single phase AC, polyphase AC, and/or multiple DC loads; said capacitance, in conjunction with said current reversal, producing soft-off-switching of said switches with low-voltage turn-off, as current is shunted from each turning-off switch into said substantially parallel capacitance, said switches having soft turn-on as diodes as the link reactance voltage causes control means enabled switches to transition from reverse to forward bias, said switches having soft reverse blocking turn-off as the link inductor current linearly decreases to zero after discharging into an output port.

According to various disclosed embodiments, there is provided: A Soft-switched Full-Bridge Buck-Boost Converter, comprising: first and second power portals, each with two or more ports by which electrical power is input from or output to said portals, first and second fill-bridge switch arrays, each comprising two bidirectional switching devices for each said port of each said power portal, a energy-transfer link reactance symmetrically connected to both said switch arrays, each of said switch arrays being connected to a power portal with said portal possessing capacitive reactance between the legs of said portals configured so as to approximate a voltage source, with power transfer between said portals via said energy-transfer reactance, Said link energy-transfer reactance consisting of an link inductor and capacitance in parallel, said power transfer being accomplished in a first power cycle as one or more pairs of input portal legs are singularly or sequentially connected to said energy-transfer reactance to store energy via increased current flow and inductance into said link inductor, followed by one or more pairs of output portal legs singularly or sequentially connected to said energy-transfer reactance to remove energy via decreased current flow and inductance from said link inductor, with any excess energy in said link inductor subsequently returned back to one or more said input portal leg pairs, followed by a reversal of current within said link inductor and a repeat of the heretofore described energy transfer, to constitute a second power cycle, from input to output portal leg pairs, but with opposite but equal current flow in said link inductor and utilizing switches of said switch arrays which are complimentary to said switches used for said first cycle of said power transfer; Said first and second power cycles comprise a single voltage cycle of the energy-transfer link reactance; Said bidirectional switching devices being capable of blocking voltage in either direction and conducting current in either direction; Said power transfer cycles being continuously repeated by said control means to produce said power transfer on a continuing basis; Said control means coordinating said switching actions to produce current and power transfer via said power cycles as required to produce desired output voltage and current, as may be used to drive single or polyphase motors at variable speed and voltage, or to drive any other electrical DC, single phase AC, polyphase AC, and/or multiple DC loads; Said capacitance, in conjunction with said current reversal, producing soft-off-switching of said switches with low-voltage turn-off, as current is shunted from each turning-off switch into said substantially parallel capacitance; Said switches having soft turn-on as diodes as the link reactance voltage causes control means enabled switches to transition from reverse to forward bias; Said switches having soft reverse blocking turn-off as the link inductor current linearly decreases to zero after discharging into an output port.

According to various disclosed embodiments, there is provided: An electric vehicle, comprising at least one motor, at least one electrical energy storage device, and a power converter as above.

According to various disclosed embodiments, there is provided: A solar energy system comprising at least one photovoltaic array, at least one electrical energy storage device, and a power converter as above.

According to various disclosed embodiments, there is provided: A motor system comprising a polyphase power line connection, a polyphase motor, and a power converter as above connected therebetween as a variable-frequency drive.

According to various disclosed embodiments, there is provided: A multiple power module soft-switched converter, comprising multiple converters as above connected in parallel between an input portal and an output portal, and commonly controlled to minimize harmonics in the current drawn from and delivered to said input and output portals.

According to various disclosed embodiments, there is provided: According to various disclosed embodiments, there is provided: A composite of n converters as above, connected at least partially in parallel, and operating at inductor phase angles separated by 180/n degrees; whereby the amount of input output filtering can be reduced.

According to various disclosed embodiments, there is provided: A method for operating a Buck-Boost Converter, comprising the actions of: (a) operating a first bridge switch array, comprising bidirectional switching devices, to operatively connect at least one terminal of a reactance to a power input, with polarity which reverses at different times; (b) operating a second bridge switch array, comprising bidirectional switching devices, to operatively connect at least one terminal of said reactance to a power output, with polarity which reverses at different times; wherein said actions (a) and (b) are never performed simultaneously.

According to various disclosed embodiments, there is provided: A method for operating a Buck-Boost Converter, comprising the actions of: operating a first bridge switch array, comprising bidirectional switching devices, to operatively connect at least one terminal of a substantially parallel inductor-capacitor combination to a power input, with polarity which reverses at different times; wherein said first switch array is operatively connected to a power input, and is operated to drive power into said inductor-capacitor combination with a non-sinusoidal waveform; and operating a second one of said switch arrays to extract power from said inductor-capacitor combination to an output.

According to various disclosed embodiments, there is provided: A method for operating a power converter, comprising the actions of: driving an energy-transfer reactance with a full AC waveform, at a base frequency which is less than half the resonant frequency of said reactance; coupling power into said reactance, on each cycle thereof, with two different drive phases, respectively supplied from two different legs of a polyphase power source; and coupling power out of said reactance, on each cycle thereof, with two different connection phases, respectively driving two different legs of a polyphase power output.

According to various disclosed embodiments, there is provided: A method for power conversion, comprising the actions of: driving, an energy-transfer reactance with a full AC waveform, at a base frequency which is less than half the resonant frequency of said reactance; coupling power into said reactance, on each cycle thereof, with two different drive phases, respectively supplied from two different legs of a polyphase power source; and extracting power from said reactance to an output.

According to various disclosed embodiments, there is provided: A Buck-Boost power conversion method, comprising: operating an input switch array configured to drive AC current through an energy-transfer reactance, at an average current magnitude which is more than 100 times as great as the average DC current within said reactance; said energy-transfer reactance comprising at least one inductor; and operating an output network to extract energy from said reactance.

According to various disclosed embodiments, there is provided: A method for operating a power conversion circuit, comprising the steps of repeatedly, at various times: driving current into the parallel combination of an inductor and a capacitor, and immediately thereafter temporarily disconnecting said parallel combination from external connections, to thereby transfer some energy from said inductor to said capacitor; wherein said action of driving current is performed in opposite senses and various times, and wherein said disconnecting operation is performed substantially identically for both directions of said step of driving current; and extracting energy from said parallel combination, to thereby perform power conversion.

According to various disclosed embodiments, there is provided: A method for operating a power conversion circuit, comprising the steps of repeatedly, at various times: a) driving current into the parallel combination of an inductor and a capacitor, and immediately thereafter temporarily disconnecting said parallel combination from external connections, to thereby transfer some energy from said inductor to said capacitor; b) coupling power out of said parallel combination, and immediately thereafter temporarily disconnecting said parallel combination from external connections, to thereby transfer some energy from said inductor to said capacitor; wherein said disconnecting operation, in said step a, is performed substantially identically for both directions of said step of driving current; and wherein said disconnecting operation, in said step b, is performed substantially identically for both directions of said step of driving current.

According to various disclosed embodiments, there is provided: Methods and systems for transforming electric power between two or more portals. Any or all portals can be DC, single phase AC, or multi-phase AC. Conversion is accomplished by a plurality of bi-directional conducting and blocking semiconductor switches which alternately connect an inductor and parallel capacitor between said portals, such that energy is transferred into the inductor from one or more input portals and/or phases, then the energy is transferred out of the inductor to one or more output portals and/or phases, with said parallel capacitor facilitating "soft" turn-off, and with any excess inductor energy being returned back to the input. Soft turn-on and reverse recovery is also facilitated. Said bi-directional switches allow for two power transfers per inductor/capacitor cycle, thereby maximizing inductor/capacitor utilization as well as providing for optimum converter operation with high input/output voltage ratios. Control means coordinate the switches to accomplish the desired power transfers.

Modifications and Variations

As will be recognized by those skilled in the art, the innovative concepts described in the present application can be modified and varied over a tremendous range of applications, and accordingly the scope of patented subject matter is not limited by any of the specific exemplary teachings given. It is intended to embrace all such alternatives, modifications and variations that fall within the spirit and broad scope of the appended claims.

While the proceeding Figures illustrate exemplary embodiments of a converter. Buck-Boost converter and methods of operation therefore, other circuits (including variations of the foregoing circuits) and methods of operation therefore are well within the broad scope of the present invention. For a better understanding of power electronics including Buck-Boost converter technologies, see *Principles of Power Electronics*, by Kassakian, M. Schlecht, Addison-Wesley Publishing Company (1991). The aforementioned reference is herein incorporated by reference.

The disclosed converter circuits are advantageously applicable to a wide variety of systems, including for example:

Electric vehicles, in which electrical interconversion is required among some or all of a traction motor, a battery, an energy source (engine or fuel cell), and an external charging connection. The source impedances and load impedances of all these elements can be very different from each other, and can vary widely over time with different load conditions or hysteretic history. Moreover, the traction motor itself can be operated, using the disclosed converter technology, as a variable-frequency AC drive.

Photovoltaic systems, as discussed above, are another attractive application. Here too electrical interconversion is required among some or all of a photovoltaic array, a battery array, a utility input, an energy source (engine or fuel cell), unknown line loads (appliances), and possibly an external power filter with significant stored energy. In this application reactive power compensation may also be desired.

Variable-frequency motor drive is an attractive and extremely broad class of applications. Note that online systems according to the present application can also be used for reactive power compensation, and/or to implement soft shutdown using a stored energy source. Online systems according to the present application can also be easily reconfigured for a very wide variety of source or power line voltages and frequencies, possibly with a change of inductor and/or a change of switches. Motor-generator traction applications can particularly benefit from less stringent requirements on generator power quality.

HVDC transmission is another attractive class of applications. In this case the reduced requirements for switch ratings are particularly attractive.

Large arc and plasma drive applications are also very attractive. In such cases the load often has a negative marginal impedance, and active current control is very useful. In many applications, such as arc furnaces, the impedance of the load may change substantially as a process progresses, and the agile control capabilities of the disclosed system configurations can be very advantageous here.

In general, the very high bandwidth active control ability of the disclosed inventions are useful in a wide range of systems. The disclosed converter architectures are much better, in this respect, than current-source converters, and even than voltage-source converters.

Additional general background, which helps to show variations and implementations, may be found in the following publications, all of which are hereby incorporated by reference:

U.S. Pat. Nos. 5,903,448, 4,616,300, 6,404,654, 5,977,569, and 7,057,905;

Ngo, "Topology and Analysis in PWM Inversion, Rectification, and Cycloconversion" Dissertation (1984);

Kim and Cho, "New Bilateral Zero Voltage Switching AC/AC Converter Using High Frequency Partial-resonant Link", IEEE (1990);

K. Rajashekara et al., "Power Electronics", Chapter 30 of *The Electrical Engineering Handbook* (ed. R. Dorf 2000); M. Kassakian, *Principles of Power Electronics*, (1991).

M. Brown, Practical Switching Power Supply Design (1990);

Cheron: Soft Commutation (1992);

Facts Worth Knowing about Frequency Converters 2ed. (Dantoss) (1992);

Gottlieb, Irving: Power Supplies, Switching Regulators, Inverters, and Converters (2.ed. 1994);

Hughes: Electric Motors and Drives 2ed. (1993)'

Kenjo: Power Electronics for the Microprocessor Age 2ed. (1994);

Kislovski et al.: Dynamic Analysis of Switching-Mode DC/DC Converters (1991);

Lenk: Simplified Design of Switching Power Supplies (1995);

McLyman, C. W. T.: Designing Magnetic Components for High Frequency DC-DC Converters (1993);

Mohan: Power Electronics: Converters, Applications, and Design 2ed. (1995);

Nave, Mark: Power Line Filter Design for Switched-Mode Power Supplies (1991);

Schwarz: Design of industrial Electric Motor Drives (1991);

Shah, Rajesh J.: Simplifying Power Supply Tech (1995);

Tihanyi, Laszlo: Electromagnetic Compatibility in Power Electronics (1995);

Wu, Keng. C.: Pulse Width Modulated DC-DC Converters (1997).

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle.

The claims as filed are intended to be as comprehensive as possible, and NO subject matter is intentionally relinquished, dedicated, or abandoned.

What is claimed is:

1. A power conversion circuit, comprising:
   an input stage which repeatedly, at various times, drives current into the parallel combination of an inductor and a capacitor, and immediately thereafter temporarily disconnects, on every inductor cycle, said parallel combination from all external connections, to thereby transfer some energy from said inductor to said capacitor;
   wherein said action of driving current is performed in opposite senses and various times, and wherein said disconnecting operation is performed substantially identically for both directions of said step of driving current; and
   an output stage which extracts energy from said parallel combination to thereby perform power conversion.

2. The converter of claim 1, wherein said input stage comprises a full-bridge array of switches.

3. The converter of claim 1, wherein said input and output stages each comprise a full bridge array of switches, and are symmetrically connected to said parallel combination of the inductor and the capacitor.

4. The converter of claim 1, wherein said input and output stages each selectably connect said parallel combination of the inductor and the capacitor to a low-impedance voltage source/sink.

5. The converter of claim 1, wherein said parallel combination of the inductor and the capacitor comprises a transformer.

6. A power conversion circuit, comprising:
   an input stage which repeatedly drives current into the parallel combination of an inductor and a capacitor, and immediately thereafter temporarily disconnects, on every inductor cycle, said parallel combination from all external connections, to thereby transfer some energy from said inductor to said capacitor; wherein said input stage drives current in different senses at different times; and
   an output stage which repeatedly couples power out of said parallel combination, and immediately thereafter temporarily disconnects, on every inductor cycle, said parallel combination from all external connections, to thereby transfer some energy from said inductor to said capacitor; wherein said output stage couples power out of said combination during two opposite directions of current therein;
   wherein said input and output stages both disconnect said parallel combination substantially identically for both directions of current in said combination.

7. The circuit of claim 6, wherein each said driving action is performed using multiple different drive pulses from different legs of a polyphase power line.

* * * * *